(12) United States Patent
Dillon et al.

(10) Patent No.: US 10,644,978 B2
(45) Date of Patent: May 5, 2020

(54) LATENCY INCREASE ESTIMATED RATE LIMITER ADJUSTMENT

(71) Applicant: Hughes Network Systems, LLC, Germantown, MD (US)

(72) Inventors: Douglas Dillon, Germantown, MD (US); Arun Athrey Chandrasekaran, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 143 days.

(21) Appl. No.: 15/820,820

(22) Filed: Nov. 22, 2017

(65) Prior Publication Data
US 2019/0158371 A1 May 23, 2019

(51) Int. Cl.
*H04L 12/26* (2006.01)
*H04L 12/46* (2006.01)
(Continued)

(52) U.S. Cl.
CPC ........ *H04L 43/087* (2013.01); *H04L 12/4641* (2013.01); *H04L 47/196* (2013.01); *H04L 47/215* (2013.01); *H04L 47/22* (2013.01); *H04L 47/24* (2013.01); *H04L 47/25* (2013.01); *H04L 47/27* (2013.01); *H04L 47/283* (2013.01); *H04L 47/14* (2013.01); *H04L 63/0428* (2013.01)

(58) Field of Classification Search
CPC . H04L 43/087; H04L 12/4641; H04L 47/196; H04L 47/215; H04L 47/22; H04L 47/24; H04L 47/25; H04L 47/27; H04L 47/283; H04L 47/14; H04L 63/0428
See application file for complete search history.

(56) References Cited

U.S. PATENT DOCUMENTS

2014/0369195 A1* 12/2014 Marchenko ............. H04L 47/25
370/235

FOREIGN PATENT DOCUMENTS

WO WO-2015021343 A1 * 2/2015 ......... H04L 12/4633
WO WO-2016128931 A1 * 8/2016 ......... H04L 43/0852

OTHER PUBLICATIONS

Roychoudhuri et al., "Real-time packet loss prediction based on end-to-end delay variation," IEEE Transactions on Network and Service Management, IEEE, US, vol. 1, No. 1, Nov. 1, 2005, pp. 29-38.

(Continued)

*Primary Examiner* — Benjamin M Thieu
(74) *Attorney, Agent, or Firm* — Sheppard, Mullin, Richter & Hampton LLP

(57) ABSTRACT

The technology described herein is directed to configuring the rate limiters of network devices based on latency measurements. The rate limiters are configured based on latency measurements such that the network traffic is transmitted and/or received at a maximum possible rate while minimizing/preventing the loss of traffic prioritization. To this end, a latency increase, estimated rate decrease algorithm may be implemented whereby the percentage rate reduction of a rate limiter is based on the rate of increase in inbound latency or outbound latency measured over a predetermined period of time (e.g., over a predetermined number of latency measurements). Depending on the change of inbound latency or outbound latency of traffic on the network, a receive rate limiter or a transmit rate limiter of an edge device may be dynamically adjusted.

19 Claims, 22 Drawing Sheets

(51) Int. Cl.
*H04L 12/801* (2013.01)
*H04L 12/815* (2013.01)
*H04L 12/851* (2013.01)
*H04L 12/807* (2013.01)
*H04L 12/819* (2013.01)
*H04L 12/841* (2013.01)
*H04L 12/825* (2013.01)
*H04L 29/06* (2006.01)

(56) References Cited

OTHER PUBLICATIONS

International Search Report and Written Opinion dated Mar. 6, 2019 for International Application No. PCT/US2018/062131, filed Nov. 20, 2018.

* cited by examiner

LATENCY INCREASE ESTIMATED RATE LIMITER ADJUSTMENT

BACKGROUND

Over a broadband network, such as a private enterprise broadband network or a public broadband network (e.g., the Internet), various kinds of traffic are processed with varying quality of service requirements. Such varying quality of service requirements in turn drive traffic prioritization requirements to ensure that data for applications requiring a higher quality of service receive priority treatment in order to deliver a certain minimum level of performance to the data flow. For example, a required bit rate, delay, jitter, packet dropping probability and/or bit error rate may be necessary for an application to operate at an acceptable performance level. This is especially true for real-time streaming applications, such as voice over IP, online gaming, and IP television applications, which typically require a fixed bit rate and are delay sensitive. Depending on the type of network, however, delivering the necessary quality of service requirements poses significant challenges.

In high performance broadband communications networks, certain protocols or services can be offered that support the quality of service requirements of high priority, real-time traffic applications. For example, multiprotocol label switching (MPLS) is a current service offering in such high performance networks (e.g., in T1/E1, ATM Frame Relay and DSL networks), which supports quality of service requirements of such applications. MPLS directs data from one network node to the next based on short path labels, rather than long network addresses (e.g., the Internet), avoiding complex lookups in routing tables. MPLS services generally are significantly more expensive than the more typical consumer and small business Internet services, and thus can be cost prohibitive. Alternatively, constant or guaranteed minimum bit rate services are also available, and can solve quality of service requirements of real-time applications, but such services are similarly cost prohibitive.

The general protocols of the Internet, on the other hand, provide for more affordable broadband communications services, but are far less reliable. Unlike single-owner networks, the Internet is a series of exchange points interconnecting private networks, owned and managed by a number of different network service providers, and thus the behavior of the Internet is unpredictable. Further, conventional Internet routers and local area network (LAN) switches operate on a best effort basis, which generally does not support quality of service. Under a best effort delivery service, the network does not provide any guarantees for timing and order of data packet delivery, or any guarantees of data packet delivery at all—and thus do not generally provide any guaranteed quality of service or priority levels. In a best effort network, generally, all users obtain best effort service, meaning that they obtain unspecified variable bit rate and delivery time, depending on the current traffic load. The lack of reliability permits various error conditions, such as data corruption, packet loss and duplication, as well as out-of-order packet delivery. Since routing is dynamic for every packet and the network maintains no state of the path of prior packets, it is possible that some packets are routed on a longer path to their destination, resulting in improper sequencing at the receiver. Such networks, therefore, are generally unreliable for real-time applications, such as voice over IP.

In packet-switched networks (such as the Internet), quality of service is affected by various factors, such as: (1) low throughput, whereby, due to varying load from other users sharing the same network resources (e.g., congestion), the bit rate provided to a certain data stream may be too low if all data streams get the same scheduling priority; (2) dropped packets, whereby a router may fail to deliver packets (e.g., where the packet is corrupted or the routers buffers are full); (3) bit errors, whereby a packet may be corrupted by noise or interference; (4) latency, whereby a packet is delayed in reaching its destination (e.g., based on long queues or long routes due to congestion); (5) jitter, whereby packets from one source/application reach the destination with different delays, which delays can vary unpredictably and cause jitter; and (6) out-of-order packet delivery, whereby related packets from a single source/application are routed through a network over different paths and thus experience differing levels of delay resulting in the packets arriving at the destination in a different order from which they were sent (which requires special additional protocols responsible for rearranging out-of-order packets).

Further, a typical broadband connection communicates with a public network (e.g., the Internet) through an access network. The access network typically has a headend that uses a cable modem termination system (CMTS) to communicate data traffic from the Internet to various cable subscribers. The CMTS connects to the cable modem(s) of subscriber(s) over the described last-mile link using a coaxial cable interface. The cable modem (if not an integrated modem/router) connects to a router, such as a virtual private network (VPN) router, and to various devices (e.g., desktops, mobile devices, laptops, televisions, etc.) communicating with the router. Additionally, the communications network can communicate with a host (e.g., over the Internet), which can communicate with a VPN gateway which can communicate with a data center. In the communications network, therefore, devices communicating with the VPN router can also communicate securely with devices associated with the data center.

With such broadband connections, congestion in the data flow can occur at the router or the gateway, for example. One approach for dealing with significant congestion is to perform what is referred to as a random early drop, which is a dropping of data packets. However, dropping of data packets, while possibly relieving congestion, can affect the quality of service for data transmission and reception.

In the cable network environment, for example, when there is a congestion of data traffic in a downstream direction from the Internet to the CMTS, the data traffic will typically back up in the CMTS. Similarly, when there is congestion of data traffic in an upstream direction from subscriber devices to a cable modem, the data traffic will typically back up in the cable modem. When the data traffic backs up, the data traffic typically is routed to a queue, and if the latency is significant enough, the queue can overflow and drop data packets.

What is needed, therefore, is an approach that achieves improved network performance (e.g., latency, jitter, throughput) through ordinary-grade (e.g., consumer-grade) broadband connections over conventional broadband networks, facilitating support of application-level quality of service traffic requirements (e.g., traffic requirements of real-time service applications, such as voice-over-IP (VOIP) services) through such ordinary-grade broadband connections over conventional broadband networks.

SUMMARY

Embodiments of the technology disclosed herein are directed to configuring the rate limiters of network devices based on latency measurements such that network traffic is transmitted and/or received at a maximum possible rate while minimizing/preventing the loss of traffic prioritization.

In one embodiment, a method includes: periodically measuring outbound latency of communications over a network from a first networked device to a second networked device, where one or more outbound latency measurements are made; storing the one or more outbound latency measurements and a time corresponding to each of the one or more outbound latency measurements; determining a proportion by which to decrease a target transmission rate of the first networked device based on at least a rate of outbound latency increase determined using a most recent outbound latency measurement and the stored one or more outbound latency measurements and corresponding times; and decreasing the target transmission rate of the first networked device by the determined proportion. Based on the decreased target transmission rate, bandwidth allocation to a plurality of traffic streams having different priorities of service may be adjusted on the first networked device. In some implementations, this method may be performed using a router or integrated router-modem.

In some implementations, the method additionally includes: determining that the most recent outbound latency measurement exceeds a threshold; and in response to determining that the most recent outbound latency measurement exceeds the threshold, performing the operation of determining an amount by which to decrease a target transmission rate of the first networked device. The threshold may be based on a moving average of a plurality of outbound latency measurements. For example, the moving average may be an exponential moving average of outbound latency measurements.

In some implementations, the method additionally includes: creating an object having a queue of predetermined size for storing a number of most recent outbound latency measurements and a time corresponding to each of the most recent outbound latency measurements. In these implementations, the one or more outbound latency measurements may be stored in the queue.

In particular implementations, the method further includes: updating the created object based on a new outbound latency measurement, wherein updating the object includes: determining if the object's queue is full; if the object's queue is full, removing an entry from the queue corresponding to an oldest outbound latency measurement stored in the queue; and adding the new outbound latency measurement and its associated time as a new entry into the queue.

In particular implementations, determining a proportion by which to decrease a target transmission rate of the first networked device based on at least a rate of outbound latency, includes: for each of the entries of the created object's queue, calculating a rate of outbound latency increase from the outbound latency measurement of the entry to the most recent outbound latency measurement; and returning a maximum of the calculated rates of outbound latency increase. The rate of outbound latency increase may be calculated for each of the entries using: $(L_0-L_N)/(T_0-T_N)$, where $L_0$ is the most recent outbound latency measurement, $L_N$ is the outbound latency measurement associated with the queued entry, $T_0$ is the time of the most recent outbound latency measurement, and $T_N$ is the time of the outbound latency measurement associated with the queued entry.

In some implementations, periodically measuring outbound latency of communications over a network from the first networked device to the second networked device, includes: synchronizing a system clock of the first networked device with a system clock of the second networked device; determining, using the system clock of the first networked device, when a data packet was transmitted by the first networked device to the second networked device; and determining, using the system clock of the second networked device, when the data packet was received by the second networked device.

In implementations, the first networked device is a router communicatively coupled to a broadband modem, the router configured to forward packets to the modem for transmission over the network. For example, the router may be communicatively coupled to the second networked device over a tunnel.

In one embodiment, a method includes: periodically measuring inbound latency of communications over a network to a first networked device from a second networked device, where one or more inbound latency measurements are made; storing the one or more inbound latency measurements and a time corresponding to each of the one or more inbound latency measurements; determining a proportion by which to decrease a target receive rate of the first networked device based on at least a rate of inbound latency increase determined using a most recent inbound latency measurement and the stored one or more inbound latency measurements and corresponding times; and decreasing the target receive rate of the first networked device by the determined proportion.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
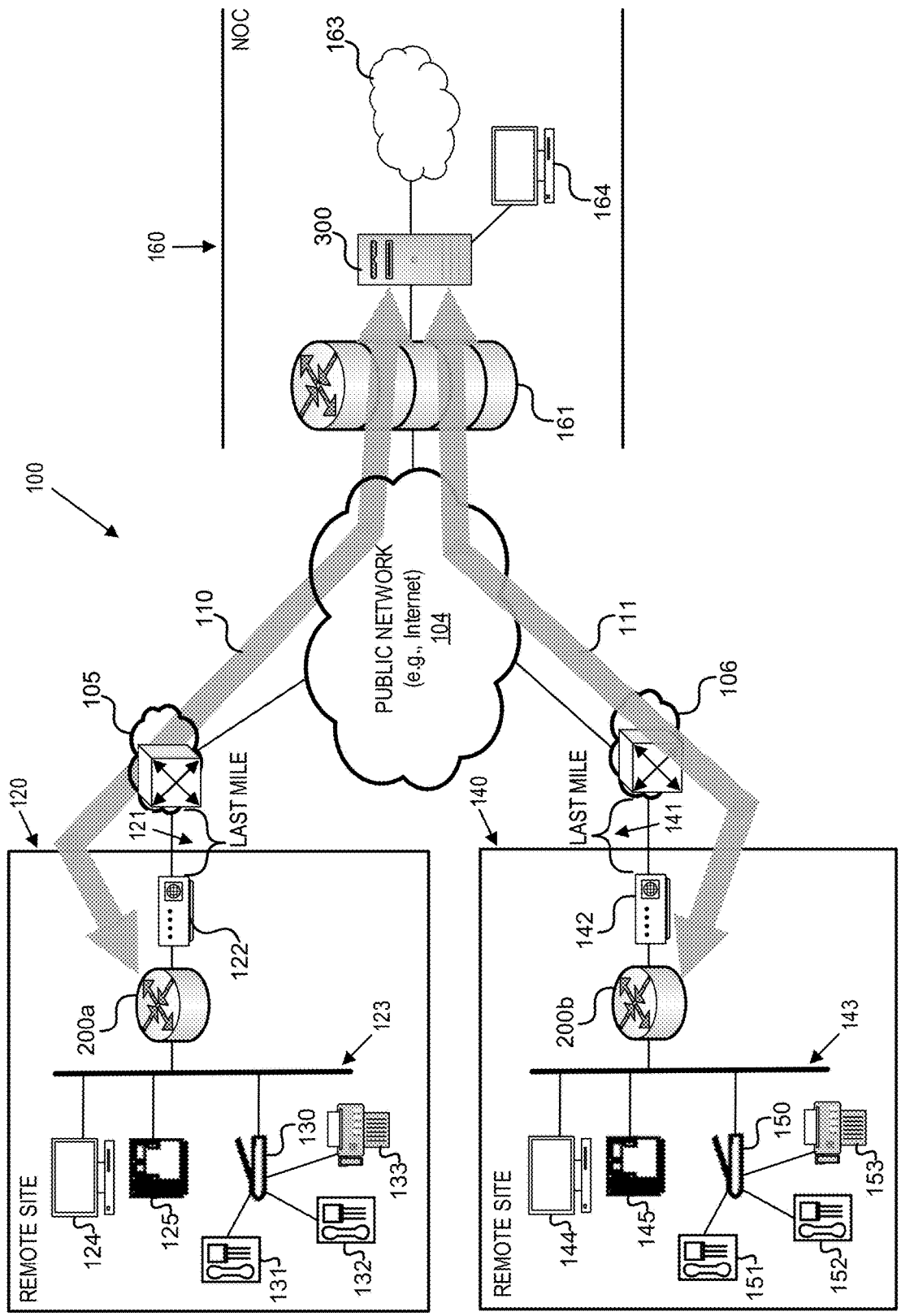
FIG. 1 illustrates a virtual private network system, in accordance with example embodiments.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As used herein, the term "one-way latency" generally refers to the amount of time it takes for a packet of data to travel over a network from a transmitter to a receiver.

As used herein, the term "inbound latency" generally refers to a one-way latency of data received by a device over a network. For example, when measured with respect to a VPN router, the inbound latency may refer to the time it takes a VPN router to receive a data packet transmitted by a peer device (e.g., another router) over a broadband network. As used herein, the term "outbound latency" generally refers to a one-way latency of data transmitted by a device over a network. For example, when measured with respect to a VPN router, the outbound latency may refer to the time it takes a data packet to be transmitted from a VPN router to a peer device (e.g., another router) over a broadband network.

As alluded to above, in conventional broadband networks, edge devices (e.g., routers or modems with integrated routers) may be configured with priority queues to prioritize higher quality of service traffic (e.g., live streaming traffic). In such networks, the edge device may utilize an upstream rate limiter that controls the available transmit rate and a downstream rate limiter that controls the available receive rate to match the available network bandwidth such that the data from priority queues does not pile up within devices on the network (e.g., modem). For example, an upstream rate limiter may set a data rate from a branch office to a data center. Conversely, a downstream rate limiter may set a data rate from a data center to a branch office. As such, by appropriately setting the rate limiters, when the priority queue prioritizes traffic, it is the actual priority the traffic gets. If on the other hand, the traffic were to pile up within equipment on the network (e.g., transmit or receive rates exceed available bandwidth), traffic would go first in and first out (FIFO) of that equipment without a distinction in the QOS of the traffic. As traffic piles up within devices on the network, and exits FIFO, the prioritization effect of QOS is thus lost.

Embodiments of the technology disclosed herein are directed to configuring the rate limiters of these edge devices based on latency measurements such that network traffic is transmitted and/or received at a maximum possible rate while minimizing/preventing the loss of traffic prioritization. To this end, embodiments described herein are directed to applying a latency increase, estimated rate decrease (LI-ERD) algorithm whereby the percentage rate reduction of a rate limiter is based on the rate of increase in inbound latency or outbound latency measured over a predetermined period of time (e.g., over a predetermined number of latency measurements). As such, depending on the change of inbound latency or outbound latency of traffic on the network, a receive rate limiter or a transmit rate limiter of an edge device may be dynamically adjusted. For example, traffic flow may be adjusted for broadband traffic received via peered and/or peerless tunnels over a network connection.

FIG. 1 illustrates a virtual private network (VPN) system in which example embodiments may be implemented. Virtual Private Networks (VPNs) are frequently used to connect an enterprise network to one or more remote sites. A VPN permits the establishment of an encrypted data connection between a central site and remote sites using a public network (e.g., the Internet) as an intermediary data link. A VPN allows devices within a remote site to seamlessly interact with devices in the central site or another remote site, as if they were locally situated. A VPN router may be used to establish such a connection between a network at the remote site, and the central site, by providing secure broadband access to the end-users over a terrestrial broadband network. The VPN router traditionally connects to a VPN gateway at a Network Operations Center (NOC) through a third party Network Access Provider (NAP) network via a modem such as cable, Digital Subscriber Line (DSL), T1, wireless, etc. The type of modem, a component-off-the-shelf (COTS) device, installed at the remote site depends on, e.g., the customer requirements, cost, and service availability from various vendors in different geographical regions.

Available network bandwidth can vary over time in a broadband network.

For example, a cable service plan offered at the last mile to a customer site (i.e., along the link connecting a cable modem to a CMTS) can provide variable amounts available bandwidth depending on the traffic being used by other users accessing the last mile. This is because of the nature of cable networks, whereby multiple cable modems (e.g., cable modems associated with different customer sites in the same neighborhood) may share the same cable line with the CMTS along the last mile. For example, although a customer site may be subscribed to a downlink/uplink speed of 300 Mbps/100 Mbps, if other customer sites along the same last mile simultaneously transmit and/or receive bandwidth-intensive traffic, the customer site may temporarily only have, for example, 50 Mbps/20 Mbps, of available bandwidth.

As another example, a DSL service plan offered at the last mile of each enterprise site (i.e., the link connecting a DSL modem to a DSL Access Multiplexer (DSLAM)) can vary even within a single customer network, or even for a single site over time, say, due to modem retraining. For example, a customer network could have three service plans deployed in the network with different downlink/uplink speeds, such as (1.5 Mbps/384 Kbps), (1.5 Mbps/128 Kbps), or (768 Kbps/128 Kbps), for different remote sites in the customer network. In this context, downlink/downstream may refer to a transmission direction from the VPN gateway/DSLAM to the VPN router. Uplink/upstream may refer to the transmission direction from the VPN router to the DSLAMNPN gateway. This variation in the offered service plans may be due to varying circuit characteristics and the pricing from different DSL vendors in different geographical regions. To avoid over-driving a last-mile link, the effective throughput limits in each transmission direction should be established and obeyed. Otherwise, the overloaded last-mile link may cause increased latency and/or packet loss.

End-user traffic may consist of: (1) real-time traffic such as voice, (2) interactive traffic such as web browsing and Point-Of-Sale (POS) transactions, and (3) bulk traffic such as FTP. When a VPN peer is given a mix of all types of traffic, real-time traffic gets the most preferential treatment followed by the interactive traffic. In order to provide QOS in such a system, it is well known to those skilled in the art that traffic needs to be classified and prioritized. However, since the last mile in a dedicated local loop network such as DSL operates at significantly lower link speeds compared to the rest of the network, it is important for VPN routers to limit the data throughput in order to ensure that uplink throughput does not exceed the uplink speed of the modem. Otherwise, data would pile up in a first-in-first-out (FIFO) fashion in VPN routers, causing increased latency for all packets and, if persistent, causing buffer overflows and packet losses. The net effect would be poor QOS despite the traffic classification and prioritization.

Since the real-time and interactive traffic is bidirectional, it therefore becomes equally important to limit the per-site throughput at the VPN gateway in the downlink direction to ensure that downlink throughput does not exceed the downlink speed at the last mile for the particular site. Otherwise, data would pile up in the DSLAM causing similar increased latency and, if persistent, packet loss. In summary, an end-to-end throughput limit configuration setup that matches the last mile link speeds is essential to guarantee QOS. However, since the last-mile link speeds are site-specific and time-varying, a priori throughput limit configuration at a VPN router, and at a VPN gateway, to match uplink and downlink speed of each remote site, respectively, is not practical in a large enterprise network. Typically, the throughput limits for a VPN router and a VPN gateway, if set, are set to default one-size-fits-all values to match the maximum available link speeds in the network. However, this approach can present problems. For example, a default per-site setting can be employed where the downlink throughput limit is set to 1.5 Mbps at the VPN gateway and the uplink throughput limit is set to 384 Kbps at the VPN router. In this case, a DSL modem having only a 768 Kbps downlink limit and a 128 Kbps uplink limit could be overdriven.

Therefore, one effect of congestion in data packet flow is initially not packet loss but is a change in the latency. And a significant consideration as to improving quality of service is that congestion typically results in packet loss. And another consideration is what an individual network user does as to data packet flow, such as a user on a broadband network, is usually not significant enough to drive the network into congestion. For example, assume the data flow that can be accommodated at a time, such as by a modem in a network is 50,000 bytes, and the transmit rate or the receive rate is 1.6 megabits per second, which is approximately 200K bytes per second. As such, when the queue fills up, such as at 250 milliseconds, for example, there will be 250 milliseconds of delay, and beyond that amount of delay the queue will overflow, resulting in data packets being dropped and being thrown away. Lower amounts of delay, for example, such as in the 30 millisecond range, can cause some fluctuations, such as jitter, but typically do not result in significant packet loss. One approach to addressing packet loss is to configure the speed or rate of the router to a set rate, so that the router will typically not process data packets faster than the configured speed, the rate typically being set in view of the storage capacity of an associated queue. However, such method can be limited in its ability to dynamically adjust to changes in flow rate, as well as be limited in dealing with priority levels of data packets.

Further, an advantageous method and apparatus of enhancing quality of service as to reducing packet loss and promoting priority traffic flow is described in U.S. patent application Ser. No. 13/428,323 (the '323 Application). In such system and method, for example, rather than configuring the rate or speed of the router to a set rate, the rate is read to dynamically set the rate to enhance quality of service. For example, the VPN router asks the DSL modem how fast it is going, and the DSL modem tells the VPN router its rate, and then the VPN router tells the VPN gateway how fast to go, so as to reduce the likelihood of overflowing the queue and to enhance control of the data flow, to enable the data packets in the traffic flow to have a substantially consistent latency. Further, such a system and method, of reading the rate (as described in the '323 Application) can enable a VPN router to query its DSL modem periodically for its link speeds and use the learned uplink speed to limit the throughput in the uplink direction, in combination with a system and method to convey the learned downlink speed to a VPN gateway to limit the throughput for each site in the downlink direction to match its downlink speed. Therefore, reading the rate works effectively and efficiently to dynamically adjust the rate of traffic flow with DSL modems that can advise the router of its rate.

In view of the foregoing, in a broadband VPN network, for example, the speed of the links after the last mile (i.e., backbone links) typically are so much faster than the speed of an individual broadband connection speed that: (1) responding to congestion in the backbone of the network by a single remote site does not materially change the congestion; and (2) congestion in the backbone of the network is primarily experienced as packet loss and not by significant changes in latency. As such, taking steps to respond to congestion is important as to enhancing quality of service, for network connections, such as broadband connections.

With reference to FIG. 1, the VPN system 100 includes a Network Operations Center (NOC) 160 and one or more remote sites. For the purpose of illustration, FIG. 1 depicts two remote sites 120 and 140. However, it will be appreciated that VPN system 100 can be configured with a single remote site or with more than two remote sites. The NOC 160 includes a router 161, a VPN gateway 300, an enterprise network 163, and a network manager apparatus 164. Router 161 routes data between the public network 104 (e.g., the Internet) and VPN gateway 300, which in turn, provides VPN access to enterprise network 163. The network manager apparatus 164 is connected to VPN gateway 300 via a management interface (e.g., dedicated network interface), and configures and monitors VPN routers 200a and 200b, and VPN gateway 300, as will be later described.

The remote site 120 includes a VPN router 200a, a Digital Subscriber Line (DSL) modem 122, and a local area network (LAN) 123. The LAN 123 interconnects VPN router 200a with various devices, such as a computer 124, a Point of Sale (POS) transaction machine 125, and an Analog Telephone Adapter (ATA) 130. The ATA 130 is a component that provides Voice over IP (VoIP) services with the enterprise network 163 (i.e., between remote site 120 and enterprise network 163). The ATA 130 allows connectivity of phone-related components, such as telephones 131 and 132, a fax machine 133, or any other components which connect over a phone line.

The DSL modem 122 provides connectivity between VPN router 200a and a Network Access Provider (NAP) network 105. The NAP network 105 includes various components, for example, a DSL Access Multiplexer (DSLAM), for connecting remote site 120 to the public network 104. DSL modem 122 is connected with NAP network 105 over a data link 121, which is commonly referred to as the last-mile link between NOC 160 and remote site 120. That is, in a DSL connection, the last-mile link is the link connecting the DSL modem to the DSLAM. In this case, last-mile link 121 is a 1.5 Mbps downlink, 384 Kbps uplink connection.

Thus, a tunnel 110 (e.g., an Internet Protocol Security (IPSEC) tunnel) is formed between NOC 160 and remote site 120, using the data connections therebetween. That is, data transmissions from remote site 120 to NOC 160 are encapsulated into IPSEC packets by VPN router 200a. The IPSEC packets are sent over the public network 104 and received by VPN gateway 300 at NOC 160, which de-encapsulates the IPSEC packets to obtain the data transmission. At the same time, data transmissions from NOC 160 to remote site 120 are also encapsulated into IPSEC packets, by VPN gateway 300. The IPSEC packets are sent over the public network 104 and received by VPN router 200a, which de-encapsulates the IP SEC packets to obtain the data transmission.

The remote site 140 includes a VPN router 200b, DSL modem 142, and a LAN 143. The LAN interconnects VPN router 200b with various devices, such as a computer 144, a POS transaction machine 145, and an ATA 150. The ATA 150 allows connectivity of phone-related components, such as telephones 151 and 152, a fax machine 153, or any other components which connect over a phone line. The DSL modem 142 provides connectivity between VPN router 200b and a NAP network 106. The NAP network 106 contains various components, for example, a DSLAM, for connecting remote site 140 to the public network 104. The DSL modem 142 can be connected with NAP network 106 over a data link 141, which is referred to as the last-mile link between NOC 160 and remote site 140. In this case, last-mile link 141 is a 768 Kbps downlink, 128 Kbps uplink connection. Thus, a tunnel 111 (e.g., an Internet Protocol Security (IPSEC) tunnel) is formed between NOC 160 and remote site 140, using the data connections therebetween.

The packets sent over tunnels 110 and 111 can be configured as standard Internet protocol (IP) packets according to a transmission control protocol (TCP) or a user datagram protocol (UDP). Additionally, according to example embodiments, the system 100 may incorporate a TCP Performance Enhancement Proxy (PEP). By way of example, the VPN routers 200a, 200b and the VPN gateway 300 may employ a TCP PEP that utilizes an optimized backbone protocol, referred to as the Terrestrial-Broadband Backbone Protocol (TBP), to carry TCP traffic across the terrestrial broadband network. The TBP automatically measures and adjusts to available capacity providing performance gains over native TCP across such DSL, EVDO, T1 and other networks (e.g., when operating over networks where there is congestion in the network beyond the last mile). TBP more effectively recovers from packet loss than native TCP. The enhanced PEP solution has TCP connections run with a maximum segment size (MSS) that can be efficiently carried by the underlying transport and which avoids packet fragmentation. When compared with native TCP, TBP makes TCP traffic operate with more consistent, and with better performance across broadband networks with congested last, middle and/or public network (e.g., Internet) hops.

Figure 2:
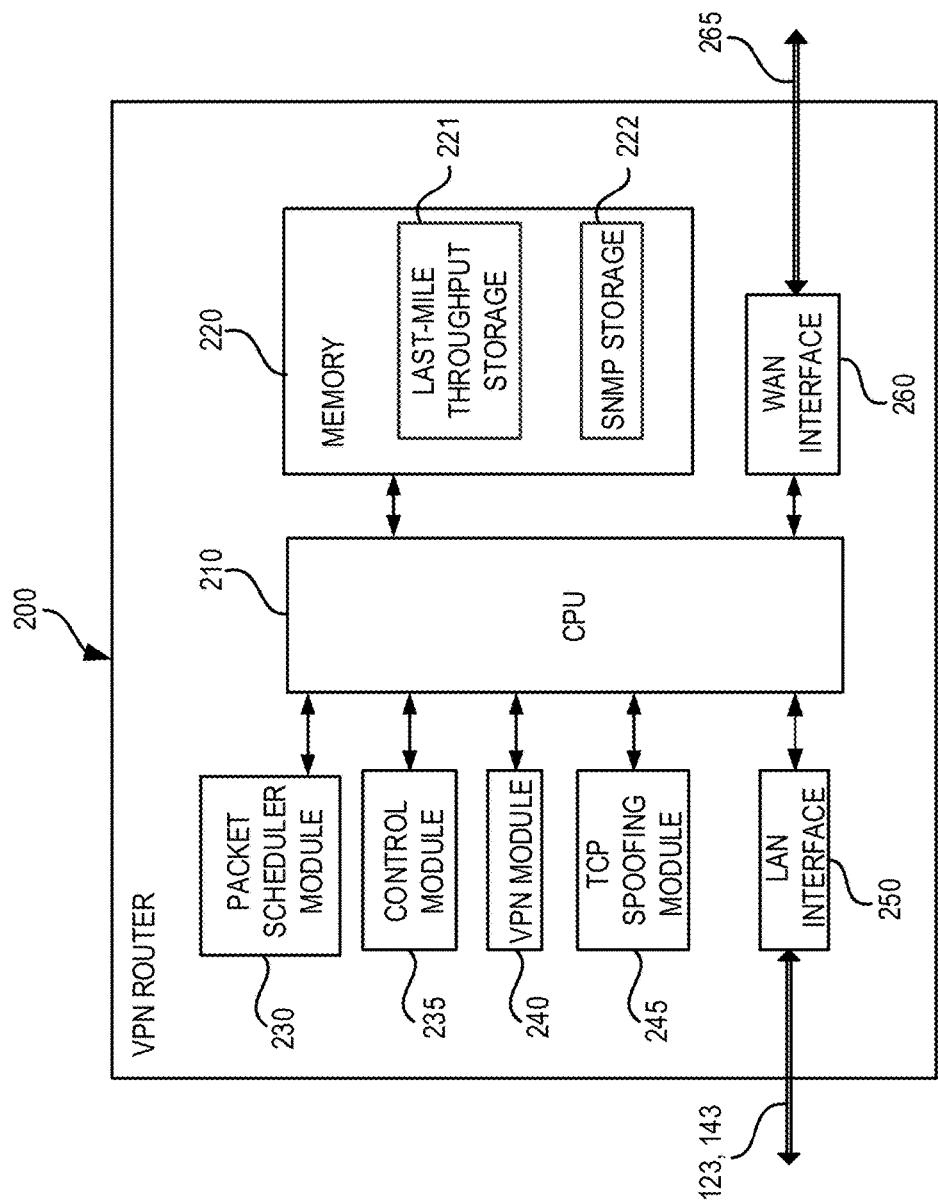
FIG. 2 illustrates a virtual private network router, in accordance with various example embodiments.

FIG. 2 illustrates an example VPN router 200, such as the VPN routers 200a and 200b of the remote sites 120 and 140 (as depicted in FIG. 1). The VPN router 200 includes a CPU 210 and a memory 220. The memory 220 can include both flash memory and RAM, but can alternatively or additionally include other data storage such as ROM or hard disk. In certain embodiments, the memory 220 can include last-mile throughput storage 221 and SNMP storage 222. The last-mile throughput storage 221 can be utilized for storing the throughput characteristics of DSL modem 122, 142 and the calculated throughput limits of corresponding VPN router 200 and SNMP storage 222 is for storing SNMP content. The SNMP storage 222 can stores status/statistics information relating to polled SNMP variables of devices attached via LAN interface (e.g., ATA) or WAN interface (e.g., DSL modem 122, 142), which are periodically monitored by VPN router 200.

The VPN router 200 can also include a LAN interface 250 and a wide area network (WAN) interface 260. The LAN interface 250 is connected to the LAN 123, 143, such as an Ethernet network. As discussed above, the LAN 123, 143 is attached to networked devices including computer 124, 144, POS transaction machine 125, 145, and ATA 130, 150. However, it is appreciated that networked devices are not limited to such, but can also include, mobile devices such as smartphones, printers, scanners, copiers, VoIP devices, or any other network-enabled electronic device. These devices send and receive data over LAN 123, 143. Alternatively, it will be understood that any form of data connectivity other than a LAN can be used, as long as data is transferred between VPN routers 200a, 200b and the devices. The WAN interface 260 is connected to a data link 265, which connects VPN routers 200a, 200b with DSL modems 122, 142, respectively, as depicted in FIG. 1.

The VPN router 200 further includes a packet scheduler module 230, a control module 235, a VPN module 240 and a TCP spoofing module 245. The packet scheduler module 230 shapes outgoing traffic to be sent by VPN router 200, to optimize the uplink throughput over last-mile link 121, 141. These data packets are packets destined for the enterprise network 163, primarily sent by devices on LAN 123, 143. The control module 235 controls the operation of VPN router 200, including various calculations such as the calculation or determination of throughput speed(s). VPN module 240 performs VPN functions according to, e.g., the IPSEC protocol. That is, VPN module 240 encapsulates and encrypts outgoing VPN packets, which are ultimately sent from VPN router 200 to VPN gateway 300 using WAN interface 260, and de-encapsulates and decrypts incoming VPN packets received from VPN gateway 300 by VPN router 200 using WAN interface 260. The TCP spoofing module 245 handles the TCP spoofing protocols. In various embodiments, the control module 235 carries out all functions performed by the VPN router 200. In further embodiments, other modules could be incorporated to carry out functions performed by the VPN router 200.

Figure 3:
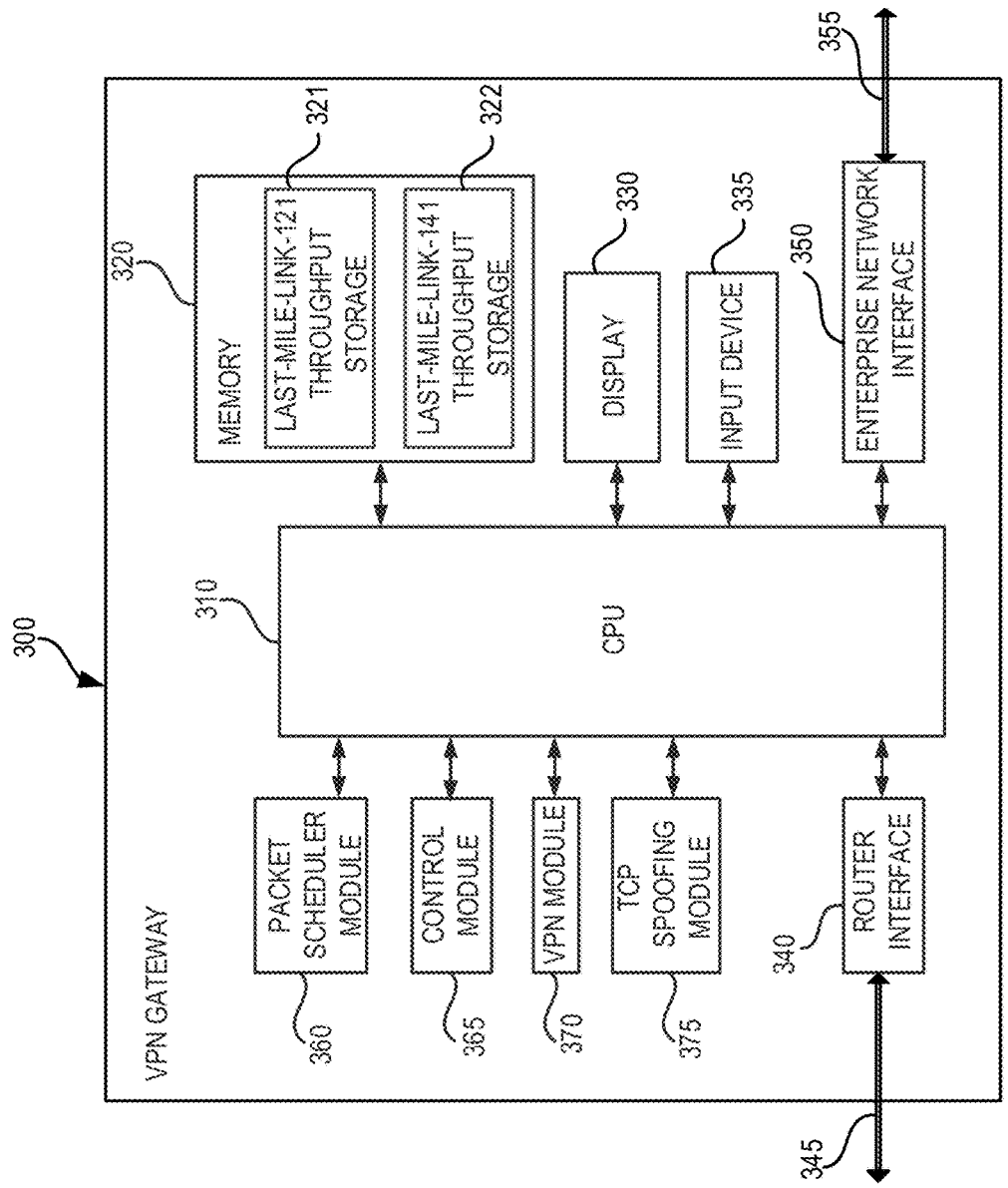
FIG. 3 illustrates a virtual private network gateway, in accordance with example embodiments.

FIG. 3 illustrates a VPN gateway 300, in accordance with example embodiments. The VPN gateway 300 includes a CPU 310 and a memory 320. The memory 320 includes last-mile-link-121 throughput storage 321 and last-mile-link-141 throughput storage 322. The storage 321 stores information relating to the throughput of last-mile link 121, while storage 322 stores information relating to the throughput of last-mile link 141. The VPN gateway 300 receives data from VPN router 200 for storing in storage 321 and 322, respectively, as will be later explained.

According to example embodiments, the memory 320 includes storage sections or modules associated with the number of remote sites involved in the VPN system. For example, with respect to the network 100, the memory 320 includes storage modules for the last mile links 121, 141—the last-mile-link-121 throughout storage 321 and the last-mile-link-141 throughput storage 322. As will be appreciated, such memory storage may be implemented in different memory components, in storage segments of a single memory, stored in a single memory based on indexing, etc.

The VPN gateway 300 also includes a display 330 for displaying information to a user, and an input device 335 for a user to input information. The display 330 can include, for instance, a OLED, LED, or LCD monitor, but is not limited to such. Input device 335 can include a keyboard and/or a mouse, but is not limited to such. The VPN gateway 300 also includes a router interface 340 and an enterprise network interface 350. The router interface 340 connects VPN gateway 300 with router 161 using data link 345. The enterprise network interface 350 connects VPN gateway 300 with enterprise network 163 using data link 355. The data link 355 can be a network connection, but is not limited to such.

The VPN gateway 300 further includes a packet scheduler module 360, a control module 365, a VPN module 370 and a TCP spoofing module 375. The packet scheduler module 360 shapes outgoing traffic to be sent by VPN gateway 300 to VPN router 200 to optimize the downlink throughput over last-mile link 121, 141. These data packets are packets destined for remote site 120, 140, primarily sent by devices on enterprise network 163. The control module 365 controls the operation of VPN gateway 300, including various calculations or determinations, such as the calculation or determination of throughput speeds. The VPN module 370 performs VPN functions according to, e.g., the IPSEC protocol. That is, the VPN module 370 encapsulates and encrypts outgoing VPN packets, which is ultimately sent from VPN gateway 300 to VPN router 200 using router interface 340, and de-encapsulates and decrypts incoming VPN packets received from VPN router 200 by VPN gateway 300 using router interface 340. The TCP spoofing module 375 handles the TCP spoofing protocols. In certain embodiments, the control module 365 carries out all functions performed by the VPN gateway 300. In other various embodiments, other modules or controllers can be configured to carry out functions performed by the VPN gateway 300.

As depicted in FIG. 1, the remote sites 120 and 140 have different DSL service plans connecting to the same VPN gateway in NOC 160, for example. It is can be important to restrict the throughput limit in each direction (i.e., downlink and uplink) through last-mile links 121 and 141 of remote sites 120 and 140, respectively, to make sure that each throughput does not exceed the maximum speeds of DSL modems 122 and 142. That is, the VPN router 200 may ensure that their respective uplink throughputs do not exceed the uplink speeds of DSL modems 122 and 142, respectively. At the same time, the VPN gateway 300 may ensure that the downlink throughputs to remote sites 120 and 140 do not exceed the downlink speeds of DSL modems 122 and 142, respectively. Throughput may be restricted so that packets are not lost due to buffer overflow, or delayed significantly by queuing up in the DSL modem and DSLAM. Accordingly, in accordance with example embodiments, periodically determining network latency parameters, and dynamically adjusting rates of data flow in the transmit and receive directions based on such determined latency parameters, significantly enhances network quality of service for data transmission and reception and minimizes packet loss in a cost efficient and effective manner.

For example, based on periodically determined network latency parameters, transmit and receive rates may be dynamically set and adjusted as between a router and a peer device over a peered network tunnel interfacing the router and the peer device. Further, also based on periodically determined network latency parameters, data traffic receive rates may be dynamically set and adjusted for data traffic received over a peerless network tunnel, such as by regulating the rate of establishment of new network connections for receipt of such peerless data traffic, by setting and adjusting window sizes to control rate at which peerless hosts send the data packets, by performing packet tossing (e.g., methodically dropping packets to signal the peerless hosts to slow down packet transmissions), and by injecting extra latency in network transmissions.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components.

Figure 4:
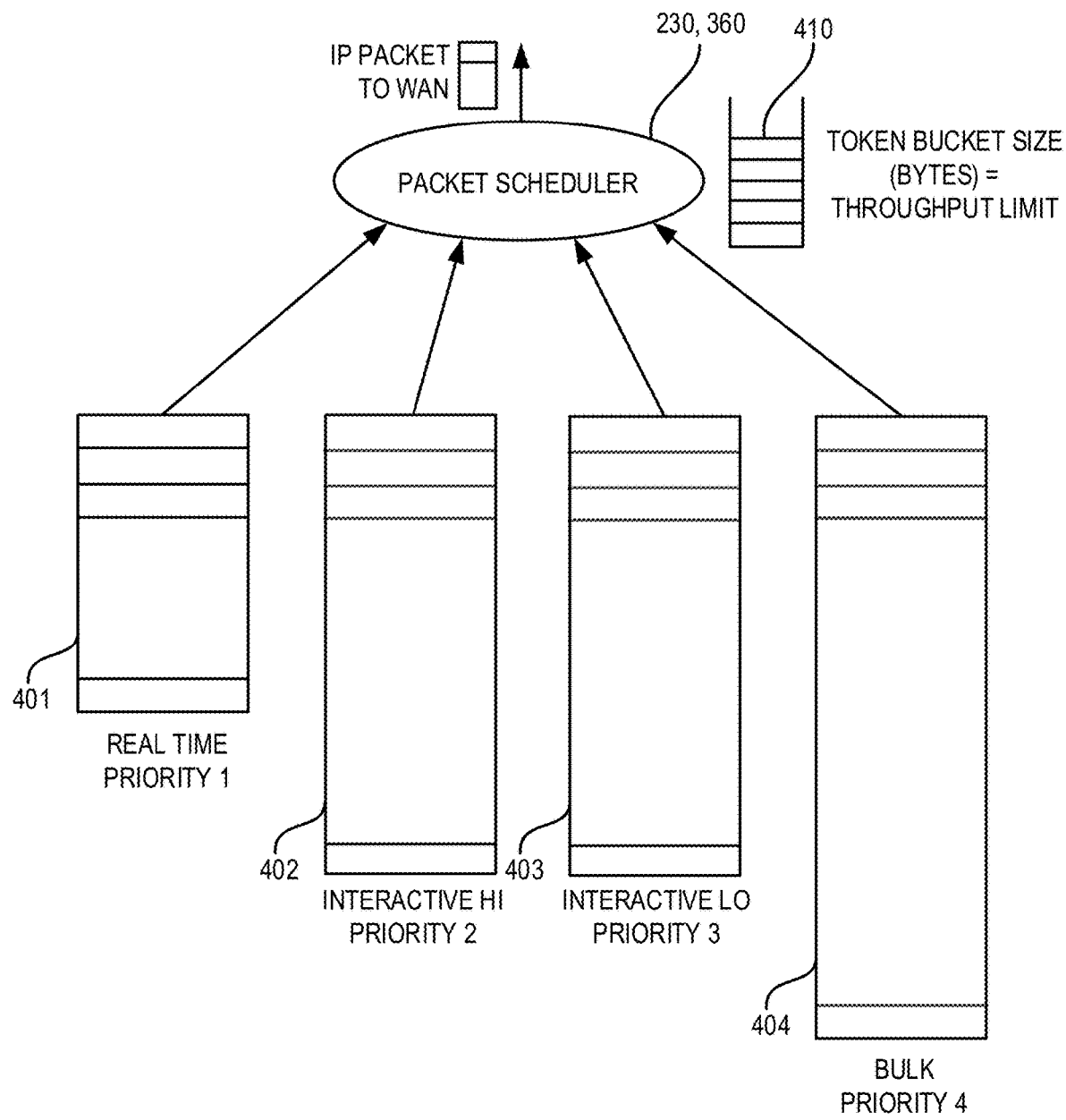
FIG. 4 illustrates an example packet scheduler operation, in accordance with example embodiments.

FIG. 4 illustrates an example packet scheduler operation, in accordance with example embodiments. The packet scheduler modules 230 and 360 both operate in a similar fashion, in that the modules perform traffic shaping of outgoing data. The packet scheduler module 230 shapes outgoing traffic in the uplink direction from VPN router 200 to VPN gateway 300. Conversely, the packet scheduler module 360 shapes outgoing traffic in the downlink direction from VPN gateway 300 to VPN router 200. As shown in FIG. 4, both the VPN router 200 and the VPN gateway 300, using CPUs 210 and 310 respectively, implement quality of service (QOS) using, for example, four priority queues 401, 402, 403, and 404 for the outgoing WAN traffic, thereby classifying and prioritizing the outbound data packets. The priority queue 401 stores the highest priority packets to queue for transmission. The priority queue 402 stores the second-highest priority packets. The priority queue 403 stores the third-highest priority packets. Priority queue 404 stores the lowest priority packets. Since the VPN gateway 300 manages outgoing traffic to both VPN router 200a and VPN router 200b, it maintains four priority queues for each of VPN routers 200a and 200b in the network. In the VPN router 200 priority queues 401-404 are stored in memory 220, while in VPN gateway 300, priority queues 401-404 are stored in memory 320. Real-time traffic, such as voice is mapped to the highest-priority queue 401. Interactive traffic such as POS and hypertext transfer protocol (HTTP) is mapped to the second-highest and third-highest priority queues 402 and 403, respectively, to match the relative priorities. Bulk traffic is mapped to the fourth and lowest-priority queue 404.

The CPUs 210 and 310 classify IP packets based on the fields within the header of the packets (e.g., Differentiated Services Code Point (DSCP) code points in QOS configurations), source and destination addresses, and, for TCP and UDP, by its source and destination ports. A variety of matching mechanisms can be employed to perform the classification including those based combinations of fields and binary masked matching and value range matching. The CPUs 210 and 310 can classify an IP packet based on IP flows and their packet size distribution, packet time, based on deep-packet inspection of the fields within individual packets within an IP flow, and other characteristics of the IP flow.

In the various embodiments, a network manager software program that manages both the VPN router 200 and the VPN gateway 300 allows an operator to map the traffic types to the different priority queues based on individual packet header fields. The network manager software program can allow an operator to program IP selection (e.g., address, port, DSCP, etc.) based rules to map UDP traffic (such as voice). The network manager software program can be executed on the network manager apparatus 164, but alternatively can be executed on any computer or other electronic device at NOC 160 or at any remote site, as long as the device can access VPN router 200 and VPN gateway 300, either directly or indirectly, to issue the mapping. The network manager software program can also allow an operator to classify the traffic of a TCP connection based on TCP PEP rules. In particular, an operator can classify such traffic based on the header fields of SYN packet, with the result being to map TCP connections to backbone connections where each backbone connection operates at a different priority level. The result can be to map different TCP connections carrying different types of traffic (HTTP, FTP, etc.) to a different priority level. For example, HTTP traffic can be mapped to a lower priority backbone connection, while POS traffic can be mapped to a higher priority backbone connection.

Once the CPUs 210 and 310 establish the respective packet traffic classification and prioritization mappings, the next step is to have packet scheduler modules 230 and 360, in VPN router 200 and VPN gateway 300 respectively, process the packets from their respective WAN queues and shape the traffic as per a prioritization scheme. That is, both packet scheduler modules 230 and 360 process the outgoing IP packets in their respective WAN queues, which are filled according to the traffic classification and prioritization rules. In the certain embodiments, the scheduler modules 230, 360 implement a token bucket 410 with a maximum bucket size in bytes corresponding to the respective throughput limit. The packet scheduler modules 230, 360 then process the packets from the WAN queues in a priority order, thereby ensuring that the real-time traffic is typically processed with the least amount of queuing delay. While processing packets, the packet scheduler modules 230 and 360 include (i.e., take into account) the underlying network protocol overhead (on top of the IP packet length) in its available tokens calculations prior to de-queuing a packet from a WAN queue for transmission.

According to certain embodiments, traffic shaping is based on a relatively strict priority queuing. In various other embodiments, the packet scheduler modules 230 and 360 can alternatively utilize other priority schemes such as Weighted Fair Queuing to provide a suitable QOS policy for various situations. Once the traffic classification, prioritization, and shaping is established, what is then configured is the throughput limit (token bucket size) at each VPN peer, such as to match the last-mile link speeds and take into account the appropriate network protocol overhead in the throughput limit calculations and enforcement. Moreover, to configure optimal uplink and downlink throughput, the VPN routers 200a, 200b need to recognize the various link characteristics information (i.e., configuration) from respective DSL modems 122 and 142. The link characteristics information includes, e.g., uplink speed, downlink speed, WAN Protocol (e.g., RFC 2684 Bridged, RFC 2684 Routed, PPPoA, PPPoE, etc.), and ATM Encapsulation Mode (e.g., LLC, VC MUX, etc.), for example.

With reference again to FIG. 1, according to an example embodiment, in initially setting a target transmit and receive rates for data flow in the network, the DSL modem 122 provides information regarding link characteristics, such as uplink and downlink speeds (e.g., a downlink speed of 1.5 Mbps and an uplink speed of 384 Kbps). Once the link characteristics information is obtained, it is stored in memory 220 and is made available to the various applications and/or modules within VPN router 200. The VPN router 200 sets its uplink throughput limit in the uplink direction to match the learned uplink speed of the DSL modem 122. That is, in the example of FIG. 1, VPN router 200 sets its uplink throughput limit to 384 Kbps, for example. The VPN router 200 applies a configurable throughput scale factor to the modem uplink throughput limit. The scale factor ensures that the maximum uplink throughput does not exceed the uplink speed of the DSL modem 122, 142. That is, the intent of the uplink scale factor is to keep the overall link throughput slightly below the uplink line speed of the DSL modem 122, 142, to account for small traffic bursts and to prevent overdriving last-mile link 121, 141 in the uplink direction.

For example, the default scale factor for the uplink may be set at 90%. Thus, the Effective Uplink Throughput Limit equals (Modem-provided uplink speed)*(Uplink Throughput Limit Factor). Accordingly, in remote site 120 (for example), the Effective Uplink Throughput Limit=384 Kbps*90%=345.6 Kbps, which can be rounded down to 345 Kbps. Thus, VPN router 200s sets its uplink throughput limit at 345 Kbps. The VPN router 200 then applies a configurable throughput scale factor to the modem downlink throughput limit. The scale factor ensures that the maximum downlink throughput by VPN gateway 300 does not exceed the downlink speed of the DSL modem 122, 142. Similar to the uplink scale factor, the intent of the downlink scale factor is to keep the overall link throughput slightly below the downlink line speed of the DSL modem 122, 142, to account for small traffic bursts and to prevent overdriving last-mile link 121, 141 in the downlink direction. The downlink scale factor can be the same as, or different from, the uplink scale factor. For example, the default scale factor for the downlink may be set at 90%. Thus, the Downlink Effective Throughput Limit equals (Modem-provided downlink speed)*(Downlink Throughput Limit Factor). Accordingly, in remote site 120 (for example), the Effective Downlink Throughput Limit=1.5 Mbps*90%=1.35 Mbps. Thus, VPN router 200a sets the effective downlink throughput limit at 1.35 Mbps.

While VPN router 200 does not directly utilize the effective downlink throughput limit to throttle transmissions, VPN gateway 300 incorporates the effective downlink throughput limit for its downlink transmissions from NOC 160 to remote site 120, for example. Thus, VPN router 200 typically follows the effective uplink throughput limit (i.e., the token bucket size for packet scheduler module 230) in the uplink direction. The VPN router 200, using packet scheduler module 230, uses the WAN protocol and ATM encapsulation information to compute the network protocol overhead (e.g., IPSEC, PPP, ATM, etc.) associated with the underlying network in its throughput calculations or determinations. The VPN router 200 uses the computer network protocol overhead to set its path maximum transmission unit (MTU) and its TCP maximum segment size (MSS) to match the underlying network between NOC 160 and remote site 120. That is, for packets sent from VPN router 200 to VPN gateway 300, the path MTU and TCP MSS of the VPN router 200 are dependent upon at least the overhead associated with the WAN protocol and ATM encapsulation information. The maximum transmission unit (MTU) of a communications protocol of an OSI layer comprises the size (e.g., in bytes) of the largest protocol data unit that the layer can pass on. In the TCP protocol, the maximum segment size (MSS) specifies the largest amount of data (e.g., in octets) that a communications device can receive in a single TCP segment, and therefore in a single IP datagram. The TCP MSS does not include the TCP header or the IP header. The IP datagram containing a TCP segment may be self-contained within a single packet, or it may be reconstructed from several fragmented pieces, whereby the MSS limit applies to the total amount of data contained within the final reconstructed TCP segment.

By way of example, an MSS for a TCP connection is negotiated during connection establishment. The TCP SYN packet and the TCP SYN-ACK packet carry an MSS TCP header option, which provides the maximum segment size that the sender is prepared to receive. The VPN router enforces a preferred MSS value by reducing the value found in the MSS header option of a TCP SYN packet and of a TCP SYN-ACK packet to be no larger than the preferred value for packets going to the sender and adjusts the checksums accordingly. This is done either as part of a TCP spoofing PEP optimization, or on un-spoofed TCP connections where only the TCP SYN and TCP SYN-ACK packets are edited. The VPN router 200 then typically sends a ModemInfo message to VPN gateway 300. The ModemInfo message includes the link characteristics information that VPN routers 200a, 200b learned from DSL modems 122, 142, respectively, including, e.g., the modem-provided and the effective uplink and downlink speeds, WAN protocol, and ATM encapsulation modem, along with other information such as, e.g., modem type (DSL, wireless, cable, etc.).

According to a further example embodiment, the VPN gateway 300 sets the per-site throughput limit for VPN router 200 (i.e., the token bucket size for packet scheduler module 360) according to a minimum of: (1) the effective downlink throughput limit; and (2) a NOC-configured maximum downlink throughput limit. In cases where DSL modem speeds are much greater than the throughput available at NOC 160, the NOC-configured limit can restrict the downlink throughput limit to meet the NOC 160 service plan offering. The VPN gateway 300, using packet scheduler module 360, uses the WAN protocol and ATM encapsulation information to compute the network protocol overhead (e.g., IPSEC, PPP, ATM, etc.) associated with the underlying network in its throughput calculations. Alternatively, the overhead information, or other information in relation to regulating a rate of establishing network connections in response to the determined received rate for controlling traffic flow, can be transmitted in the ModemInfo message in accordance with the computation by VPN router 200. The VPN gateway 300 uses the computed overhead to set its path MTU and its TCP PEPs MSS to match the underlying network between NOC 160 and remote sites 120, 140. That is, the path MTU and TCP PEP MSS of the VPN gateway 300 for packets sent to VPN router 200a, 200b are dependent upon at least the overhead associated with the WAN protocol and ATM encapsulation information.

Additionally, variables other than, or in addition to, the path MTU and MSS of the TCP PEP can be adjusted based on the monitored throughput, depending on, e.g., the particular network protocol(s) employed. Further, the setting of network throughput limits, such as by means of determining target transmit and receive rates (e.g., based on measured latency parameters), and the regulation of the establishment of network connections based on the determined target receive rate for controlling the rate of received traffic over a peerless tunnel, can be applied to last-mile link 141 or to other links in systems in a similar manner to that of system 100, for example. Also, the VPN routers 200a, 200b and VPN gateway 300 can adjust network throughput limits, based on a monitored change in speed, such as in the last-mile link speed. Such a change can result from a retraining of the modem by the DSLAM in NAP network 105. Modems typically can retrain for at least two reasons: (1) variations in the signal-to-noise ratio; or (2) if large numbers of errors are detected. When this occurs, the DSLAM in NAP network 105 and the DSL modem 122 (for example) typically can renegotiate the line speeds. Another such change can result from remote site 120 changing its DSL service plan to a higher (i.e., greater throughput) or lower (i.e., less throughput) tier of service.

Such changes can necessitate an updating of the uplink and downlink throughput limits on VPN router 200 and VPN gateway 300, respectively, in order to maintain optimal data throughput, or can necessitate adjusting of transmit and receive rates in the network or system 100. That is, by either updating the throughput limits and/or by dynamically adjusting the transmit and receive rates in the network, or by regulating the rate of establishing network connections based on the determined target receive rate, the system 100 can minimize the over-driving of last-mile links 121, 141 (e.g., when the modem link speed decreases) or the under-utilizing the last-mile links 121, 141 (e.g., when the modem link speed increases), or other system components to minimize packet loss and to enhance quality of service. Such changes may, therefore, also be used in setting or adjusting the target receive rate and the target transmit rate in the network, according to example embodiments.

According to example embodiments, as to determining or adjusting the throughput, or the transmit rates and receive rates, the VPN router 200a, 200b periodically queries DSL modem 122, 142, respectively, for link characteristics information, and periodically measures the latency in the network. Also, the VPN gateway 300 periodically queries DSL modem 122 and VPN router 200a, and DSL modem 142 and VPN router 200b, for link characteristic information, and periodically measures the latency in the network. The VPN router 200a, 200b and/or the VPN gateway 300 also determines if the returned link speed information from the query has changed compared to the previous link speed information, or based on the measured latency, the latency has changed. In various embodiments, a positive determination is made only when the change in link speed is non-trivial (e.g., changed beyond a configurable limit) to avoid unnecessary computations and ModemInfo messages, or the measured latency has significantly changed, such as at or above a predetermined threshold for the latency.

By way of example, if modem link speeds have significantly changed as compared to previous values, or the latency determination indicates a significant increase in the latency, then the VPN router 200a, 200b and/or the VPN gateway 300 (as to the link speeds) may include new uplink and downlink throughput limits with new link speed information, and (as to the determined latency) may dynamically adjust the receive and transmit rates (e.g., based upon the determined latency parameters). Depending on circumstances, one of the two throughput limits may remain unchanged, or both may be changed, or transmit rates and receive rates can be adjusted for various parts of the network. Otherwise, if the modem link speeds have not changed (or if the change is merely trivial), or if the determined latency parameters have not significantly changed, periodic monitoring of link speeds or the latency parameters, the DSL modem 122, 142, the VPN router 200a, 200b or the VPN gateway 300 typically continues periodically monitoring link characteristics information, as well as measuring or determining the latency parameters, or a receive data rate for a network connection.

Based upon the determination, the VPN router 200a, 200b and the VPN gateway 300 sets its uplink throughput limit to correspond to the learned uplink speed of the DSL modem. The VPN router 200a, 200b and the VPN gateway 300 applies a configurable throughput scale factor to the new modem uplink throughput limit, to obtain an effective uplink throughput limit, as well as determines or adjusts the receive rates and transmit rates in the network. As previously noted, the effective uplink throughput limits ensure that the maximum uplink throughput does not exceed the uplink speed of DSL modem 122, 142, or of VPN router 200a, 200b, or of VPN gateway 300, providing consideration for small traffic bursts. The VPN router 200a, 200b and the VPN gateway 300 apply configurable throughput scale factors to the new downlink throughput limit or limits, to obtain the effective downlink throughput limits, as well as maintaining or adjusting the receive rates or transmit raters in the network, based on the determined latency parameters.

By way of further example, the VPN router 200a, 200b sends a ModemInfo message to VPN gateway 300, the ModemInfo message containing at least the new effective uplink and downlink throughput limits, as well as can advise the VPN gateway of any adjustments made in the target or receive rates in the network, such as system 100. The ModemInfo message can also contain other data (e.g., the new modem-provided uplink and downlink throughput limits), and can be sent by being piggy-backed on an existing message, for example. The VPN gateway 300 receives the ModemInfo message from VPN router 200a, 200b and the VPN router 200a, 200b can set an ACK-requested flag to confirm receipt of the ModemInfo message. The VPN gateway 300 sets its new downlink throughput limit for remote site 120, 140, including VPN routers 200a, 200b, in accordance with the effective downlink throughput limit calculated by the VPN router 200a, 200b or by the VPN gateway 300, or both, as well as can set or adjust the transmit and receive rates in the network, such as system 100, based on received or determined information (e.g., contained in the ModemInfo message).

Further, it will be understood that operations performed by VPN router 200 or VPN gateway 300, including those related to determining and adjusting the transmit and receive rates (e.g., based on the latency parameters), related to adjustment of throughput limit settings, and related to regulating a rate of establishing network connections, may be performed using the respective control modules and memory of the VPN router 200 or VPN gateway 300, or may be performed by other quality of service (QOS) components or modules, according to example embodiments. Moreover, other modules or components in a network may be configured to set or adjust the throughput limit settings, as well as the target transmit and receive rates, and the to regulate the rate of establishing network connections, in the network, such as by incorporating or utilizing the same or similar component as described in FIGS. 2 and 3 for the VPN router 200 and the VPN gateway 300, in a similar manner to that described. As such, the setting or adjustment of the throughput limit settings, as well as the target and receive rates in the network, can be extended to various parts of the network, including but not limited to any other last-mile links, or other links, in systems similar to that of system 100.

By performing the described process, a network such as the system 100 allows VPN peers (e.g., VPN router 200, VPN gateway 300, etc.) or other system components or modules to provide QOS to the end-user traffic while reacting to the changing network conditions by (1) actively monitoring the modem link speeds and automatically adjusting the Throughput Limit settings in both directions; (2) actively monitoring the traffic and scaling back the bulk and interactive traffic automatically to give priority to the real-time and interactive traffic; and (3) setting and dynamically adjusting transmit rates and receive rates in the network and regulating a rate of establishing network connections, based upon determined latency parameters, to control the traffic flow, according to example embodiments.

The active QOS overlay functionality, according to embodiments of the present invention, are also referred to herein as a targeted extra latency quality of service overlay (TELQO) functionality. TELQO functionality typically operates in private networks (e.g., enterprise IPSEC networks or virtual private networks (VPNs)). As to a peered TELQO operation, such operation generally occurs, for example, over a VPN connection or an IPSEC tunnel, and a peerless TELQO operation can be employed for a split-tunnel, that is traffic over a tunnel directed to a public network (e.g., the Internet). Typically, a peered TELQO operation is more precise than a peerless TELQO operation, and thus provides better performance in terms of fully utilizing broadband capacity.

The TELQO functionality of example embodiments provides advantages over existing quality of service (QOS) applications, including such advantages as: (1) automatic and dynamic measurement and adjustment of available capacity of a broadband connection; (2) support of peerless operation, which allows for active quality of service (QOS) management of data traffic over ordinary-grade broadband connections over conventional broadband networks (including split-tunnel connections—defined below), where traffic moves from servers on a public network (e.g., the Internet) down the broadband connection without being governed by any peer intermediary between the broadband connection and the public network; (3) support of multiple tunnels (e.g., separate streams of traffic), which share a broadband connection and provide prioritization within each stream (e.g., a single IPSEC tunnel (which is peered), and a split-tunnel (which is peerless)); and (4) provisions for an IP-Flow based classifier (generally not requiring any configuration), which automatically classifies (and reclassifies as needed) end-user traffic to provide real-time treatment (as required), and to appropriately classify other applications (e.g., as Light-Interactive, Heavy-Interactive and Bulk-Transfer).

By way of example, a tunnel comprises a collection of data traffic (e.g., data packets) that is individually allocated to bandwidth, where the traffic data packets are classified and prioritized to fit within the allocated bandwidth. A tunneling protocol comprises the encapsulation of one network protocol (e.g., a payload protocol) within or based on a different network protocol (e.g., the delivery protocol). For example, tunneling may be employed to carry a payload over an incompatible delivery-network, or to provide a secure path through an untrusted network. An example of a tunnel includes a virtual private network (VPN) tunnel, which, for example, may comprise a private network that interconnects remote networks through primarily public communications infrastructures (e.g., the Internet). A VPN tunnel provides security through tunneling protocols and security procedures (e.g., encryption). Further, a VPN tunnel may comprise a given broadband connection that carries one or more VPN connections (e.g., a VPN connection to securely connect the branch offices of an organization to a head office network through a public network, such as the Internet, or one enterprise connection to a corporate data center and one to a credit-card authorization service). A further example of a tunnel includes a collection of related-traffic directly transmitted out to a public network (e.g., a split tunnel to the Internet). For example, a split tunnel may comprise a simultaneous network connection to a public network (e.g., the Internet) and to a local area network (LAN) or wide area network (WAN), using the same physical network connection (where the LAN or WAN connection may be via a VPN connection). A given broadband connection may carry multiple split tunnels (e.g., a connection carrying guest WiFi traffic and connections to an explicitly enumerated list of business-related secure web sites).

By way of further example, a peer comprises the node at the other end of a tunnel that includes TELQO capabilities. A peerless tunnel comprises a tunnel where the traffic being received across a broadband connection with TELQO capabilities is not transmitted by a peer, and thus may be indirectly controlled via receive traffic shaping (e.g., a split tunnel where broadband data traffic received from one or more hosts over a public network (e.g., the Internet) via a split tunnel). For example, all split tunnels and some VPN tunnels are peerless. A peered tunnel comprises a tunnel where the traffic being received across a broadband connection with TELQO capabilities is transmitted, and rate limited, by a TELQO peer. For example, according to example embodiments, peered tunnels are preferable to peerless tunnels, because the receive rate of a peered tunnel can be more precisely controlled as compared to the receive rate of a peerless tunnel.

In accordance with example embodiments, the TELQO capabilities may operate according to various example modes, including an over-engineered mode, a single-peer mode, a multi-peer mode, a broadband access mode, a single-peer split tunnel mode, and a multi-peer multi-peerless mode. According to the over-engineered mode, the broadband connection can be assumed to be over-engineered, and thus, typically, there is no need to shape incoming traffic as the broadband connection receive path should not be congested, or to allocate bandwidth to tunnels as the transmit and receive paths should not be congested. In the over-engineered mode, however, there can be a need to rate limit and prioritize traffic transmitted thru the peered tunnels of a node, because the receive capacity of the peer(s) typically can be limited. Further, when in the over-engineered mode, the rate limit of a peered tunnel can be set by the peer via a Set-Rate transaction (further described below).

According to the single-peer mode, a node can have a single, peered tunnel. For example, there are no peerless tunnels with the single-peer mode, and thus there is no need to traffic shape received traffic. In the single-peer mode, one-way latency can be measured with a TELQO server, and transmit and receive target rates can be determined. Also, in the single-peer mode, the traffic comes from a single peer (e.g., ordinarily via a single VPN tunnel) so there is no need to allocate transmit or receive bandwidth among tunnels. In the single-peer mode, however, once target transmit and receive rates are determined, the transmission of a single peered tunnel is prioritized and rate limited, and the transmit rate of the peer is set.

According to the multi-peer mode, the broadband connection is typically not over-engineered and multiple peered tunnels can be supported (e.g., ordinarily one per VPN tunnel). One-way latency can be measured with a TELQO server and target transmit and receive rates can be determined. Transmit and receive bandwidth are allocated among the multiple peered tunnels with each peer being instructed as to its rate limit, and transmission to each peer being limited by the transmit bandwidth allocator and by the peer. Also, in the multi-peer mode, there is no need to traffic shape received traffic in that the received traffic is from a TELQO peer.

According to the broadband access mode, the broadband connection receiving the QOS overlay features does not have any IPSEC VPN tunnels to TELQO-equipped peers. As far as the TELQO functionality is concerned, the traffic is split-tunnel traffic, and that traffic is considered to be a single peerless tunnel.

According to the single-peer split-tunnel mode, one-way latency can be measured with a TELQO server and target transmit and receive rates can be determined. Received split tunnel traffic with the single-peer-split tunnel is traffic shaped, and bandwidth is allocated between the peerless split-tunnel and the single peered tunnel. By way of example, the peer is sent the transmit rate, and split tunnel and peer packet transmission is governed by the allocated transmit bandwidth limits. For the peerless tunnel, the received traffic may be indirectly regulated by shaping the traffic via insertion of extra target latency amounts, adjustment of window sizing, control of new connection establishment and packet dropping (as discussed in further detail below). Further, the bandwidth limits governing the traffic shaping may be set based on one or more of a variety of factors, including the latency measurements based on probe transactions and limits calculated based on other network factors.

According to the multi-peer multi-peerless mode, the broadband connection is typically not over-engineered and multiple peers can be supported (e.g., ordinarily multiple VPN tunnels) along with multiple peerless tunnels (e.g., split-tunnels and/or peerless VPN tunnels). One-way latency can be measured with a TELQO server and target transmit and receive rates can be determined. With the multi-peer multi-peerless modes, transmit and receive bandwidth is allocated among the tunnels (e.g., peered and peerless) with the transmit rate of a tunnel being governed by its assigned rate limit. Peers are sent their transmit rate and peerless tunnel traffic is traffic shaped to match its assigned receive rate limit. Again, as specified above, for the peerless tunnels, such rate limits may be achieved by various receive traffic shaping mechanisms.

According to further example embodiments, a VPN router (e.g., an enterprise branch-office router) may have multiple broadband connections operating in various modes, including high-availability switch-over, high-availability load-balancing and connection bonding. Further, the TELQO functionality may be applied to such broadband connections. By way of example, in the High-Availability Switch-Over mode, data traffic typically runs entirely across one broadband connection at a time, and thus the TELQO functionality can support this mode by either employing one TELQO instance (e.g., bridge or WAP) per broadband connection (where the TELQO instance would recognize when it can carry traffic, and start up and run accordingly), or by employing a single TELQO instance that dynamically adjusts to changed traffic characteristics on switchover. In the High-Availability Load-Balancing mode, traffic runs simultaneously across multiple broadband connections, and thus a TELQO instance can be employed per connection, and status and statistics from the links can be used to assist the classification and routing algorithms that distribute traffic across the broadband connections. In the Connection Bonding mode, a single IP flow may be distributed across multiple broadband connections when throughput exceeding a single broadband connection is required. Such data traffic would be classified as Bulk-Transfer traffic, and thus a TELQO instance could be employed to the connection bonding problem with either of the following architectures: (1) Bonding Inside of the TELQO instance, where the instance addresses a single bonded broadband connection and operates to keep latency in moderation, and it would be the responsibility of the bonding algorithms to distribute the TELQO provided traffic appropriately across connections; or (2) Bonding Outside of the TELQO instance, where there would be a TELQO instance for each broadband connection, and the bonding algorithm would explicitly distribute the data traffic of a high-speed bulk flow across the multiple broadband connections using feedback from the TELQO instances regarding how much capacity is available for such a bonded bulk transfer. The equivalent of High-Availability Load-Balancing can be used for less bandwidth intensive flows.

In accordance with further example embodiments, the TELQO functionality classifies traffic into specific classifications. By way of example, such classifications include: (1) Light-No-Delay, which typically is applied to transmissions relating to TELQO control signaling, controlling the operation of the TELQO functions (e.g., clock synchronization, latency measurements and setting of the transmit rate for a peer); (2) Real-Time, which typically is applied to data traffic of applications that typically require a relatively consistent low latency and jitter and have a relatively predictable and consistent top-speed (e.g., VOIP comprises a typical example of a flagship real-time application); (3) Light-Interactive, which typically is applied to data traffic that typically benefits from relatively low-latency and does not amount to a significant fraction of overall traffic when aggregated together (e.g., domain name system (DNS) lookups comprise typical examples of Light-Interactive traffic); (4) Heavy-Interactive, which typically is applied to data traffic that typically benefits from relatively low-latency, but may operate at relatively high bit rates (for discrete periods of time), which can amount to a significant fraction of the capacity of a broadband connection (e.g., web browsing, such as hypertext transfer protocol (HTTP) and secure HTTP protocol (HTTPS), comprises a typical example of a dominant form of Heavy-Interactive traffic); and (5) Bulk-Transfer, which typically is applied to data traffic that can be expected to use a considerable amount of traffic over a long period of time (e.g., bulk traffic typically cannot expect to receive low-latency transmission).

Additionally, in accordance with example embodiments, a packet-forwarding classification is dynamically assigned to each traffic class. For example, packet-forwarding classifications include: (1) Governed, where the packets are queued and typically forwarded, such as when a bandwidth governor can allow their forwarding; and (2) Ungoverned, where packets are typically forwarded without a queuing delay regardless of bandwidth limits—typically, a class is assigned to the Ungoverned packet forwarding classification when the total of Ungoverned traffic can be relied upon to remain consistently significantly less than the target rate.

By way of example, the bandwidth allocation module assigns the packet forwarding classification to the traffic classes, as follows: (1) the Light-No-Delay and Real-Time traffic classes are assigned to the Ungoverned packet forwarding classification; (2) when there is no significant real-time activity, the Light-Interactive traffic class is typically assigned to the Ungoverned packet classification—alternatively, when there is real-time activity, the Light-Interactive traffic class is typically assigned to the Governed packet forwarding classification. If the classifier is unreliable, however, and a relatively large fraction of available bandwidth ends up being classified as Light-Interactive (even for a relatively brief period of time) then Light-Interactive traffic class will be assigned classified (at least conditionally) to the Governed packet forwarding classification; and (3) the Heavy-Interactive and Bulk-Transfer traffic classes are typically assigned to the Governed packet forwarding classification.

Figure 5A:
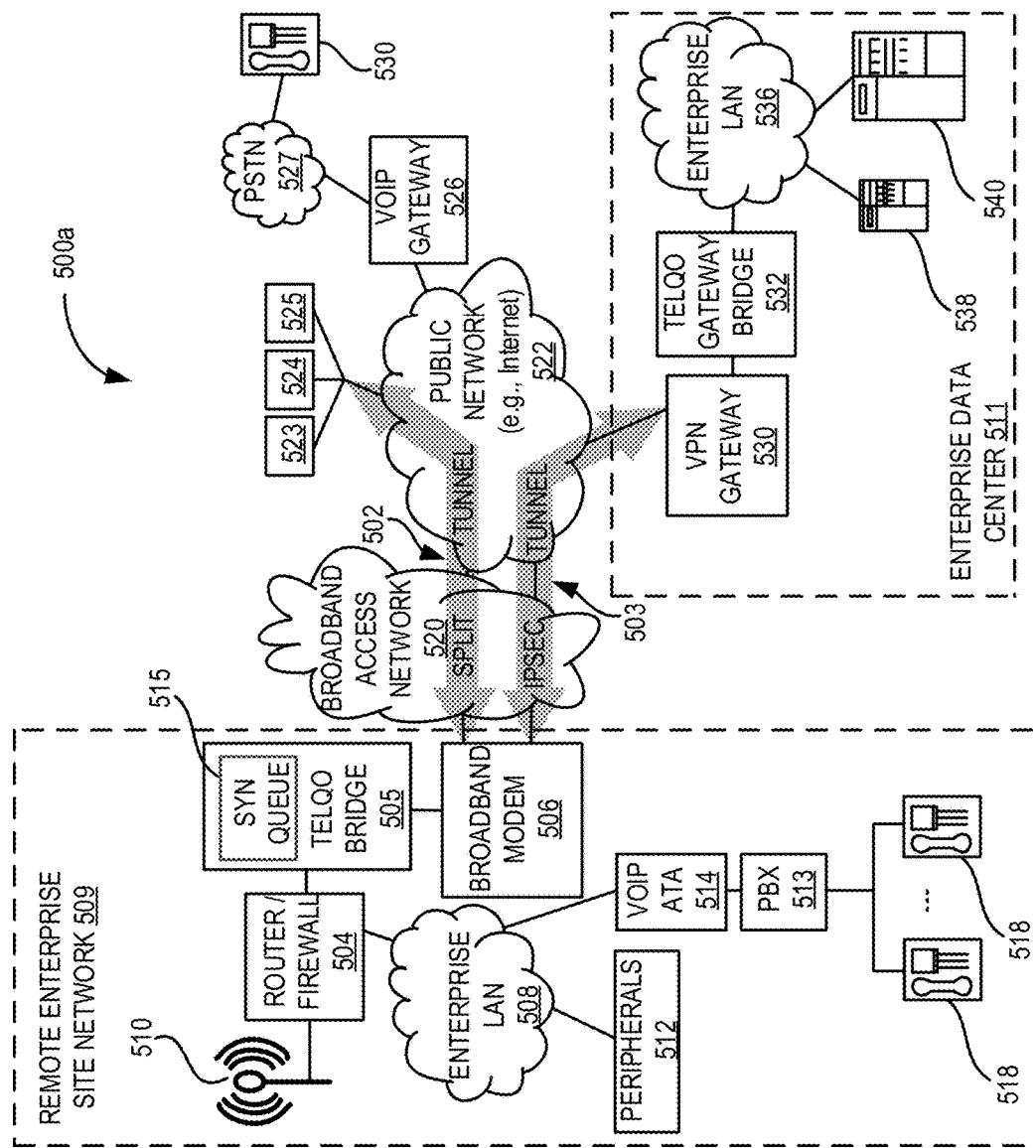
FIG. 5A illustrates a network, including a targeted extra latency quality of service overlay feature, in accordance with example embodiments.

FIG. 5A illustrates a network 500a (e.g., an enterprise or small/medium enterprise (SME) network), including TELQO functionality, in accordance with example embodiments. With reference to FIG. 5A, the TELQO functionality is employed in an existing enterprise network, for example, by inserting a TELQO bridge 505, at the remote enterprise site network 509, between the existing router/firewall 504 and the broadband modem (which provides access to the broadband access network 520). Alternatively, as will be recognized, the TELQO bridge 504 may be employed at different points within the enterprise network (e.g., the TELQO bridge may be implemented within the router firewall 504 via one or more modules composed of software and/or hardware). The router/firewall 504 typically supports one or more conventional broadband connections, each simultaneously supporting one or more tunnels. Such tunnels, for example, may comprise the Internet protocol secure (IPSEC) tunnel 503 to the enterprise data center 511 (e.g., for point of sale and VOIP traffic) and the split tunnel 502 to the public network 522 (e.g., for customer access to the Internet using guest WiFi services via the WiFi equipment 510). The TELQO bridge 505 allows traffic to share the network connection, while maintaining enhanced quality of service for VOIP and other real-time (response time sensitive) applications. At the far end of the IPSEC tunnel 503, the TELQO gateway bridge 532 is positioned, for example, between the data center enterprise LAN 536 and the data center VPN gateway 530.

With respect to the TELQO functionality (and the functionality hereinafter described with respect to the TELQO bridge 505), it will be appreciated that such functionality may alternatively be implemented by any other suitable component of the network (e.g., the router/firewall 504, the TELQO bridge 505, the VPN gateway 530, the TELQO gateway bridge 532, or any suitable combination thereof), for example, without departing from the scope of the embodiments of the present invention. For simplicity, however, the TELQO functionality is described herein with respect to the TELQO bridge 505. Moreover, similarly, with respect to the example networks 600, 700, 800 and 900 (of FIGS. 6, 7, 8 and 9, respectively), while described herein with regard the respective TELQO WAN optimization appliance (WAP) and TELQO WAN optimization server (WOS) (network 600), the TELQO bridge and TELQO peerless server (TPS) (network 700), the TELQO WAP and TPS (network 800), and the TELQO bridge and TPS (network 900), it will be appreciated that the TELQO functionality may alternatively be performed by other components of each of the respective networks (or any suitable combination of such components), without departing from the scope of the embodiments of the present invention. For example: with respect to the network 600 (FIG. 6), the TELQO functionality may be implemented by the router/firewall 604, the WAP 630, the VPN gateway 626, the WOS 632 or the TNMS 634, or any suitable combination thereof; with respect to the network 700 (FIG. 7), the TELQO functionality may be implemented by the router/firewall 704, the TELQO bridge 705, the TPS 724, the TNMS 734, or any suitable combination thereof; with respect to the network 800 (FIG. 8), the TELQO functionality may be implemented by the router/firewall 804, the WAP 830, the TPS 824 or the TNMS 834, or any suitable combination thereof; and with respect to the network 900 (FIG. 9), the TELQO functionality may be implemented by the router/firewall 904, the TELQO bridge 905, the TPS 924 or the TNMS 934, or any suitable combination thereof.

According to example embodiments, the TELQO functionality: (1) dynamically monitors the loading of the broadband connection and controls the traffic rate to avoid overflowing the connection with the result that the broadband connection provides a consistent low latency for data, including controlling the traffic flow over split tunnel 502 from the public network (e.g., Internet sites 523, 524, 525); (2) classifies and prioritizes traffic so that VOIP and latency sensitive applications are given preference over Bulk-Transfer traffic (e.g., even when the broadband is saturated), such as to promote a relatively reliable VOIP transport, and a relatively consistent and improved responsiveness; and (3) allocates bandwidth so that, when offered traffic exceeds available capacity, the lower priority traffic (e.g., guest WiFi traffic) can be restricted to a configurable percentage of the broadband capacity of the one or more tunnels of the network 500a. Moreover, the TELQO network 500a supports typical terrestrial broadband transports, including DSL, cable modem, FIOS, T1 and 3G/4G wireless, and supports VOIP over any of these transports that provide sufficient capacity and relatively adequate QOS.

By way of example, to enhance quality of service via TELQO functionality, the TELQO bridge 505 may be configured to adjust the transmit rate across its broadband connection, adjust the transmission rate of a TELQO peer to the router/firewall 504 (e.g., the transmit rate for traffic transmitted from the data center VPN gateway 530 via the IPSEC tunnel 503), and perform traffic shaping of received broadband traffic (e.g., broadband traffic received from the Internet via the split tunnel 502). The TELQO bridge 505 thereby minimizes, substantially reduces or substantially prevents data from piling up inside the broadband connection so that the prioritization of traffic and the traffic shaping of received traffic can provide the desired QOS characteristics (e.g., low latency for real time and interactive traffic). In this regard, the TELQO bridge 505 is configured to initiate and manage TELQO probe transactions, whereby the one way latency of the network is measured in both directions across the broadband connection. Based on the measured latency, the bridge 505 determines target transmit and target receive rates. Further, based on the determined target transmit and receive rates, the TELQO bridge controls the transmit rate of the traffic transmitted to the peer via the peered tunnel, sets the transmit rate (via a Set-Rate transaction) for traffic transmitted by the peer over the peered tunnel, and allocates the target receive rate across the split tunnel via traffic shaping mechanisms for the receive traffic over the peerless or split tunnel. According to example embodiments, for the peerless tunnel, the TELQO bridge indirectly regulates the receive traffic via one or more traffic shaping mechanisms, including insertion of extra target latency amounts, adjustment of window sizing, control of new connection establishment and packet dropping (as discussed in further detail below). Further, the bandwidth limits governing the traffic shaping may be set based on one or more of a variety of factors, including the latency measurements based on probe transactions and limits calculated based on other network factors, for example.

The target transmit and receive rates are determined, for example, by periodically monitoring one-way latency in both directions across the broadband connection. With respect to network latency measurements, the TELQO bridge 505 need only measure explicit one-way latency when the transmitter is not idle, as it gets a read of the minimum one-way latency as a byproduct of clock synchronization probe transactions. Based on the clock synchronization probe transaction, a low one-way latency measurement in one direction indicates a light-load scenario, and thus the one-way latency in the opposite direction should substantially equal the measured one-way latency. When the measured latency exceeds a targeted threshold above typical latency experienced when the traffic is light, the target rate is reduced. For example, when a measurement indicates that the extra latency exceeds a threshold, the target rate is reduced by some fixed percentage. Otherwise, when the offered traffic exceeds the target rate, the target rate is increased. This is measured, for example by determining a number of consecutive allocation periods that ended with packets left unsent. The TELQO bridge 505 thereby determines, sets and dynamically adjusts transmit and receive rates, based upon a determination of the latency parameters, and adjusts throughput limits, for the network 500*a*.

As to the determination or adjustment of the throughput, or the transmit and receive rates, the TELQO bridge 505 periodically queries the LAN 508 or the broadband modem 506 for link characteristics information, as well as periodically measuring one-way latency in the network, via both the transmit and receive directions. For example, the TELQO bridge 505 determines if the returned link speed information from the query has changed compared to the previous link speed information, or based on the measured latency, the latency has changed such as at or above a predetermined threshold for the latency. If link speeds have significantly changed as compared to previous values, or the latency determination indicates a significant increase in the latency in the network 500, then the TELQO bridge 505 (as to the link speeds) includes new uplink and downlink throughput limits with the new link speed information, and (as to the determined latency) dynamically adjusts the receive and transmit rates (e.g., based upon the determined latency parameters). Determining the latency parameters in the network may include, for example, the TELQO bridge 505 adjusting the transmit rate across the broadband connection, adjusting the VPN gateway 530 transmission rate to the router/firewall 504, as well as traffic shaping of received broadband traffic. This is typically done so as to prevent data from piling up inside the broadband connection of the network 500*a* so that the prioritization of traffic and the traffic shaping provides the desired QOS characteristics (e.g., low-latency for real-time and interactive traffic).

By way of further example, based on the determined network latency parameters, the TELQO bridge 505 determines a target receive data rate to control traffic flow, for example, over one or more peerless tunnels, and regulates, and, based on the determined target receive data rate, regulates the traffic flow of the traffic received via such peerless tunnels (e.g., broadband data received from various hosts via on or more peerless tunnels over the network connection, such as split tunnels to the public network 522). In this regard, according to example embodiments the TELQO bridge controls the received traffic flow over the peerless tunnels via various methods, either individually or in any suitable combination. According to one example method for controlling received data flow from a split tunnel, the TELQO bridge 505 regulates the rate of establishing new network connections. For example, in the case of accessing a web page of an Internet site via a peerless tunnel 502, each link contained on that web page will initiate a new TCP connection to the web site identified by the link, which can result in dozens of new TCP connections. In order to initiate a TCP connection, TCP uses a three-way handshake. The client or web browser first transmits a TCP SYN packet to the server to initiate the connection, and the server responds by transmitting a SYN-ACK packet back to the client. The client then transmits an ACK packet back to the server, and, at this point, the client and server have each received an acknowledgment of the connection. One component of the packets is a sequence number that is used by to reassemble the data stream. Accordingly, without the initial SYN packet being transmitted to the server, no connection will be initiated, and thus the server cannot transmit the associated web site data back to the client (over the split tunnel). In order to control the traffic flow of the data received over the split tunnel, therefore, the TELQO bridge 505 regulates the rate at which such new network connections are initiated and established. By way of example, the TELQO bridge 505 stores or queues the respective SYN packets in the SYN queue 515, and releases them at a determined rate to control the rate of the establishment of the respective network connections.

According to a further example method for controlling received data flow from a split tunnel, the TELQO bridge 505 dynamically controls the TCP window sizing. With a TCP connection between a client and a server, the client sets a window size, which reflects the number of bytes the client is willing to receive at one time from the server (or the number of bytes that may remain unacknowledged at any given time. This window size is the receive window for the client, which sets a bound on the number of bytes that the server may send at one time, or the send window size of the server, and thus the window size effectively controls the channel bit rate or traffic flow. Hence, in addition or as an alternative to regulating the rate of establishing new connections, the TELQO bridge 505 controls traffic flow of data received over the split tunnel by setting the window size accordingly.

According to yet a further example method for controlling for controlling received data flow from a split tunnel, the TELQO bridge 505 may employ packet tossing or dropping. By way of example, in order to slow down the rate of data receipt, for example, over a split tunnel, the transmitting hosts can be signaled to slow down their respective transmit rates. This can be accomplished by methodically dropping TCP packets received from a given host, whereby, according to TCP procedures, upon experiencing packet loss the transmit rate is adjusted. Accordingly, when the respective transmitting host experiences packet loss based on the packets dropped by the TELQO bridge 505, the host will adjust the transmit rate accordingly.

According to example embodiments, in controlling receive traffic flow over a peerless tunnel, the TELQO bridge 505 measures one-way network latency in both directions across its network connection, and determines appropriate target receive rates based on the latency determinations. Based on the determined target receive rates, the TELQO bridge 505 regulates the rate for establishing network connections, and determines and sets window sizing to control channel bit rate. The TELQO bridge further determines whether the offered traffic load from the network connections exceeds a target receive rate for the respective tunnels. Where it is determined that the offered traffic load from the one or more network connections does not exceed a target receive rate, the TELQO bridge 505 maintains the target receive rate—the rate of establishing network connections and initial window size settings the one or more TCP connections. Where the offered traffic load exceeds the target receive rate, however, the TELQO bridge 505 adjusts the window sizing and the rate of establishment of network connections, accordingly, and employs packet tossing and injection of targeted extra latency, as necessary, to avoid overloading the network connection (e.g., resulting in jitter, packet loss and intolerable latency) so as not to adversely affect real time traffic over the network.

Figure 5B:
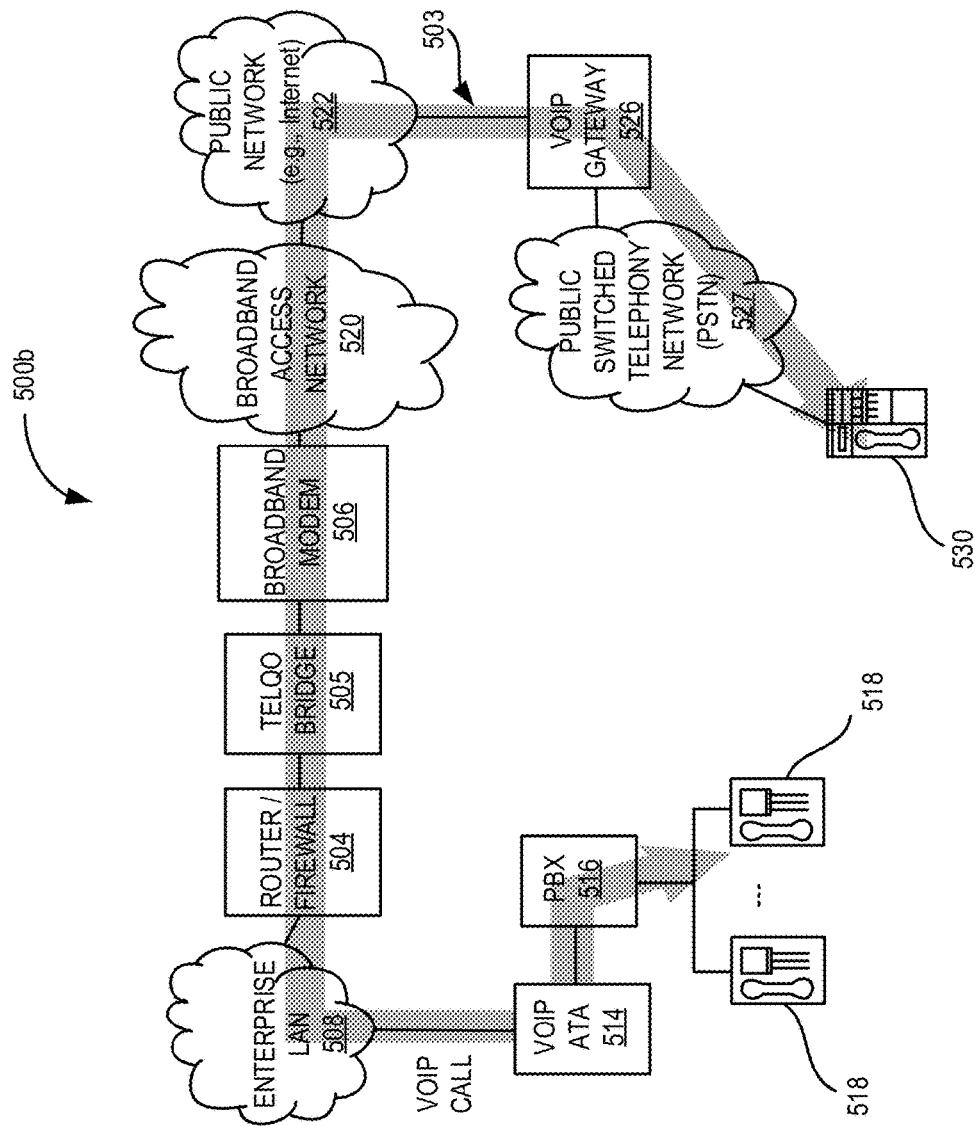
FIG. 5B illustrates a network, including a targeted extra latency quality of service overlay feature, as applied to a voice over Internet Protocol (VOIP) application, in accordance with example embodiments.

FIG. 5B illustrates a network 500b, including a targeted extra latency quality of service overlay feature, as applied to a voice over Internet Protocol (VOIP) application, in accordance with example embodiments. With reference to FIG. 5B, as in the network 500a (FIG. 5A), the TELQO functionality is employed by inserting the TELQO bridge 505 between the existing router/firewall 504 and the broadband modem 506. The TELQO bridge 505 conditions the traffic running across the broadband access network 520 to allow the VOIP traffic to share the broadband connection with existing traffic, whereby no reconfiguration of the router/firewall 504 or the broadband modem 506. Further, a standard VOIP analog telephone adapter (ATA) 514 is installed with connections to the Enterprise LAN 508 and to the private branch exchange (PBX) 513. In some cases, however, the router/firewall 504 may need to be adjusted to permit the ATA 514 to access to the public network 522. Existing phone numbers are ported from the public switched telephone network (PSTN) 527 to the VOIP service, and then voice calls (using the existing phone numbers) take place over the broadband connection (the broadband access network 520) and the public network 522 (e.g., the Internet), and terminate at the PSTN via a VOIP gateway 526. In addition to facilitating VOIP services, the TELQO bridge 505 also proactively monitors the resulting voice quality and broadband connection quality (e.g., to identify service issues), and optimizes voice quality over broadband connections that may suffer from substantial packet loss (e.g., conventional broadband connections under congested network conditions).

FIGS. 6-9 illustrate different network architectures for implementing TELQO functionality and features, in accordance with various example embodiments.

Figure 6:
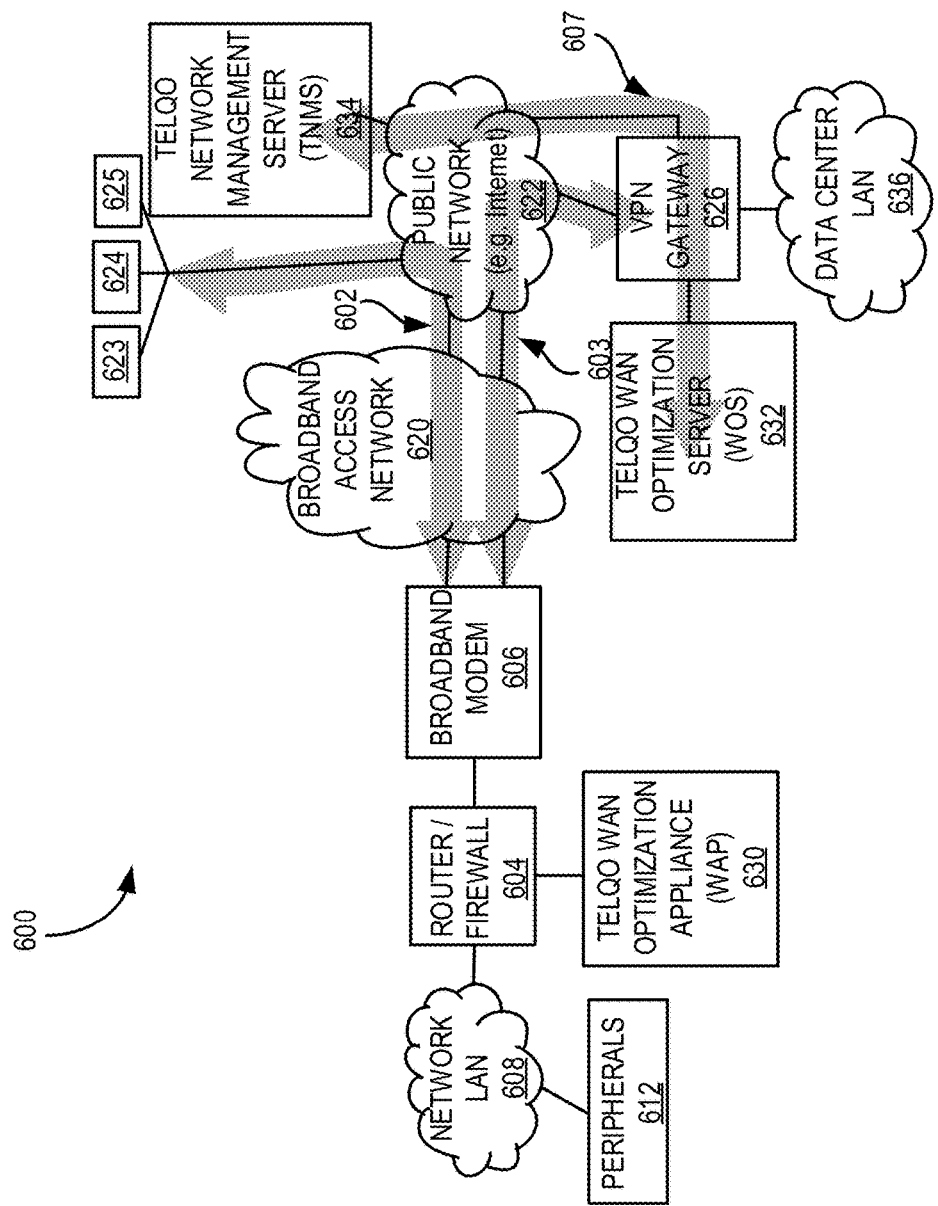
FIG. 6 illustrates a network (e.g., an enterprise or small/medium enterprise (SME) network), including targeted extra latency quality of service overlay functionality that augments an existing broadband network via a WAN optimization appliance, which supports both peered and peerless tunnel connections, in accordance with example embodiments.

FIG. 6 illustrates a network 600 (e.g., an enterprise or small/medium enterprise (SME) network), including TELQO functionality that augments an existing broadband network via a WAN optimization appliance, which supports both peered and peerless tunnel connections, in accordance with example embodiments. With reference to FIG. 6, in accordance with an example embodiment, peered TELQO functionality is added to the router/firewall 604 (e.g., an enterprise-grade branch-office router/firewall), where the network 600 supports one or more peered tunnels 603 (e.g., an IPSEC tunnel), via the public network 622, to the VPN gateway 626. The interface to the VPN gateway 626 can be over-engineered such that the aggregate offered load does not significantly affect end-to-end latency or packet loss. In accordance with a further example embodiment, peerless TELQO functionality may be added to the router/firewall 604, where the network 600 also supports one or more peerless tunnels 602 (e.g., a split tunnel), via the public network 622, to the Internet sites 623, 624, 625. Further, the peerless TELQO functionality may be useful by itself (e.g., where there is no IPSEC VPN, which is basically equivalent to the IPSEC VPN case where all of the traffic is split tunnel traffic).

According to the example network 600, the TELQO WAN optimization appliance (WAP) 630 has a single Ethernet interface connecting the WAP 630 to the router/firewall 604 LAN interface, where a pair of upstream and downstream VLANs (e.g., network LAN 608 and data center LAN 636) are configured on the interface. The network LAN 608 provides network access, for example, to the peripherals 612 (e.g., computer or server, printers, and other such peripherals). Further, the policy based routing of the router/firewall 604 is configured to forward: (1) packets which ordinarily would be forwarded upstream thru an IPSEC tunnel to the TELQO WAP 630 via the downstream VLAN prior to IPSEC encryption; (2) packets received from the upstream VLAN (from the WAP 630) through the IPSEC tunnel (being IPSEC encrypted in the process); (3) packets received via the IPSEC tunnel, which are routed to the WAP 630 via the upstream VLAN (after being IPSEC decrypted); (4) packets received via the IPSEC tunnel, which ordinarily would be forwarded from a LAN port to the WAP 630 via the upstream VLAN (after being IPSEC decrypted); and (5) packets received via the downstream VLAN to the appropriate LAN port. Moreover, when the TELQO WAP 630 cannot or does not respond to the appropriate next hop checks initiated by the VPN router/firewall 604, the router/firewall 604 may be configured to skip such rules of the policy-based routing (e.g., to disable or bypass the TELQO functionality in the event of a failure of the WAP 630).

By way of example, the TELQO WAP 630 functions as a transparent traffic bridge between the upstream and downstream VLANs (e.g., except, potentially, in the case of traffic shaping functions), which may be accomplished by means of raw-mode socket operations. The WAP 630 may also be configured to employ dynamic host configuration protocol (DHCP) on the upstream VLAN to obtain an IP address for communicating with the TELQO WAN optimization server (WOS) 632. Further, the WAP 630 initiates and manages the TELQO probe transactions, for example, exchanging probe packets with a TELQO server process on the WOS 632 (e.g., on an as needed basis) to measure the one-way latency in both directions between itself and a TELQO peerless server. Based on the measured latency, the WAP 630 initiates and manages the TELQO Set-Rate Transactions, exchanging set-rate packets with the WOS 632 to control the rate at which the WOS 632 transmits data through the tunnels 602 to the WAP 630. The WAP 630 may also implement a management tunnel protocol, facilitating network management communications, for example, by means of management traffic exchanged with one or more TELQO network management servers (TNMS) 634. For example, the WOS 632 interfaces with the TNMS(S) 634 via one or more network management tunnels 607 (e.g., over the public network 622), which facilitate the exchange of network management traffic between the WOS 632 and the TNMS(S) 634, and between the WAP 630 and the TNMS(S) 634 (via the WOS 632). Other functions of the WAP 630 may comprise generation of performance log files (e.g., ASCII comma separated value files) for network management purposes, periodic generation of status variables (e.g., ASCII comma separated value variables) for simple network management protocol (SNMP) accessibility, and periodic reading of environment configuration files (e.g., in ASCII .INI formats).

The WOS 632 interacts with the VPN gateway 626 in an analogous fashion to the interaction of the WAP 630 with the VPN Router/Firewall 604. In that regard, the WOS 632 has an Ethernet interface connecting the WOS 632 to the VPN gateway 626 (e.g., via an appropriate data-center VLAN 636 Ethernet switch), where a pair of upstream and downstream VLANs are configured on the interface. The policy based routing of the VPN gateway 626 is configured to facilitate access of the WOS 632 to packets before being IPSEC encrypted and transmitted downstream, and after being IPSEC encrypted and upon being received upstream. Further, the VPN gateway 626 may likewise be configured to skip the policy-based routing in the event of a failure of the WOS 632.

Moreover, the WOS 632 can support multiple (e.g., hundreds) of TELQO WAPs 630, each with an associated IPSEC tunnel. By way of example, a TELQO WAP 630 may employ a management interoperability protocol (e.g., signed User Datagram Protocol (UDP) packets carrying initialization file (.INI) file format parameters) to provide the WOS 632 with parameters for identifying the downstream packets that are destined for the WAP 630 via the respective IPSEC tunnel, for identifying the upstream packets that are received from the WAP 630 via the respective IPSEC tunnel, and for classifying and traffic shaping IP flows headed downstream to the WAP 630 via the respective IPSEC tunnel.

By way of example, the WOS 632 may be configured to support multiple private networks and multiple VLAN pairs (e.g., with one process per VLAN pair). The WOS 632 also performs a transparent bridging function (with traffic shaping) between the upstream and downstream VLAN interfaces (e.g., by means of raw-mode socket operations). Further, the WOS 632 handles the TELQO probe and TELQO Set-Rate Transactions from the WAP(s) 630. Additionally, based on initial interaction with the WAP(s) 630, the WOS 632 generates format configuration files for each WAP 630, which may include information that allows the WOS 632 to identify the WAP 630 from which upstream packets are received and to which a downstream packet is destined. Also, the WOS 632 similarly may be configured to periodically generate performance log files (e.g., for network management purposes), periodically generate ASCII CSV status variables (e.g., for simple network management protocol (SNMP) accessibility), and periodically read environment format configuration files.

Figure 7:
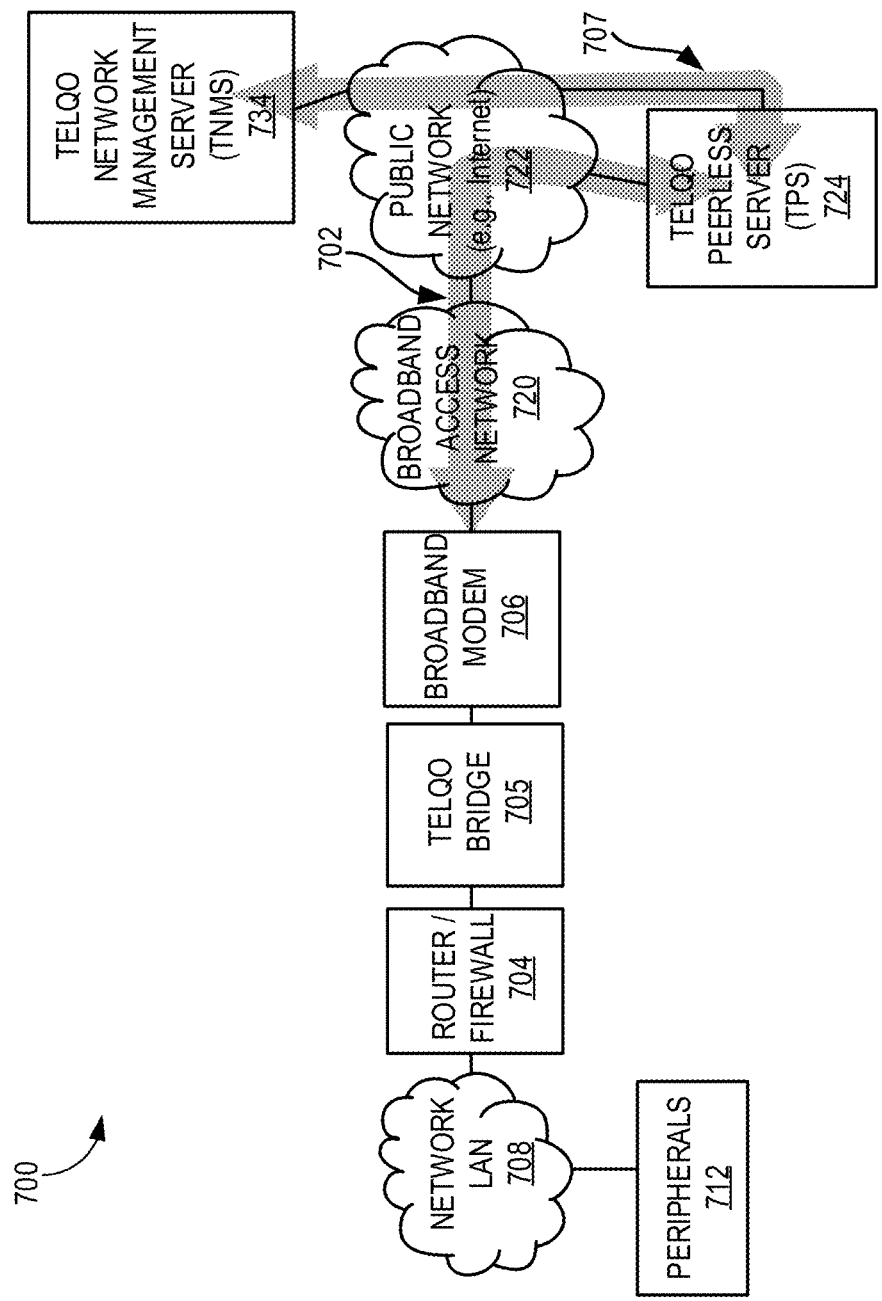
FIG. 7 illustrates a network (e.g., an enterprise or small/medium enterprise (SME) network), including targeted extra latency quality of service overlay functionality that augments an existing broadband network via a network bridge, which supports peerless tunnel connections, in accordance with example embodiments.

FIG. 7 illustrates a network 700 (e.g., an enterprise or small/medium enterprise (SME) network), including TELQO functionality that augments an existing broadband network via a network bridge, which supports peerless tunnel connections, in accordance with example embodiments. With reference to FIG. 7, in accordance with an example embodiment, peerless TELQO functionality is added to an existing broadband network connection, where the network 700 supports one or more peerless tunnels 702 to the TELQO peerless server (TPS) 724, via the public network 722. As in the networks 500a and 500b (FIGS. 5A and 5B), a TELQO bridge 705 is positioned between the existing router/firewall 704 and the broadband modem 706. The network LAN 708 provides network access, for example, to the peripherals 712 (e.g., computer or server, printers, and other such peripherals).

The TELQO bridge 705 functions in similar respects as to the WAP 630 of the network 600 (FIG. 6). The bridge 705 transparently bridges (except, possibly, for traffic shaping functions) packets between the router/firewall 704 and the broadband access modem 706, handling ordinary IP over Ethernet. Additionally, the TELQO bridge 705 may also handle point-to-point protocol over Ethernet (PPPoE). The TELQO bridge 705 employs DHCP, when appropriate, to obtain an IP address for communication with the TPS 724, and, when this is not feasible, the bridge 705 alternatively determines a working IP address, and uses that IP address for the exchange of UDP packets with the TPS 724. Further, as with the WAP 630, the TELQO bridge 705 initiates and manages TELQO probe and Set-Rate Transactions. For probe transactions, the bridge 705 exchanges probe packets with the TPS 724 to determine the latency to and from the TPS 724. The TELQO bridge 705 also implements a management tunnel protocol, facilitating network management communications with one or more TELQO network management servers (TNMS) 734. For example, as with the network 600 (FIG. 6), the TPS 724 interfaces with the TNMS(S) 734 via one or more network management tunnels 707 (e.g., over the public network 722), which facilitate the exchange of network management traffic between the bridge 705 and the TNMS(S) 734 (via the TPS 724). Additionally, according to an example embodiment, the TELQO bridge 705 is configured with a list of TPSs, whereby, on startup, the bridge 705 interacts with all of the configured TPSs to determine the one with the lowest round-trip latency. The TELQO bridge 705 can thereby fall back to other TPSs in the list should interactions fail with the selected TPS.

Figure 8:
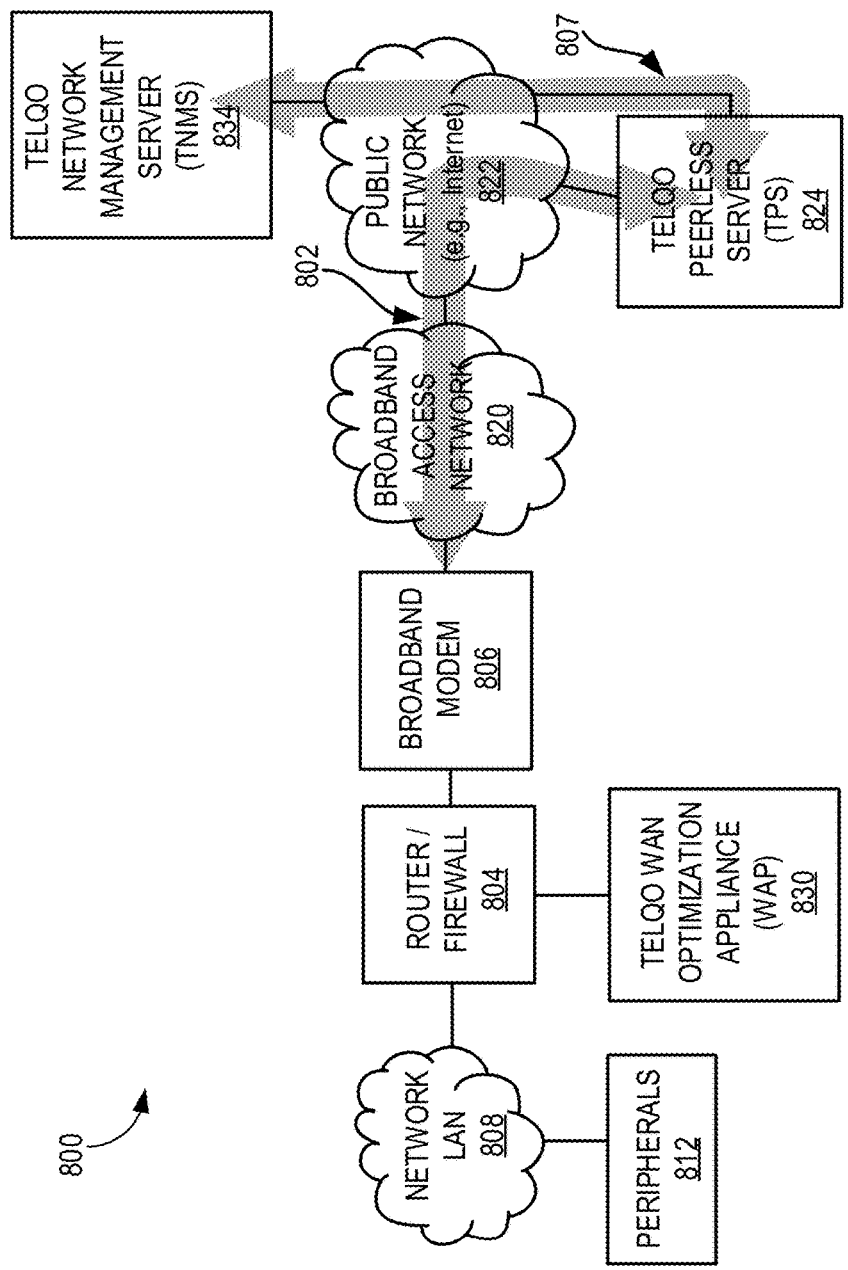
FIG. 8 illustrates a network (e.g., an enterprise or small/medium enterprise (SME) network), including targeted extra latency quality of service overlay functionality that augments an existing broadband network connection via a WAN optimization appliance, which supports peerless tunnel connections, in accordance with example embodiments.

FIG. 8 illustrates a network 800 (e.g., an enterprise or small/medium enterprise (SME) network), including TELQO functionality that augments an existing broadband network connection via a WAN optimization appliance, which supports peerless tunnel connections, in accordance with example embodiments. With reference to FIG. 8, in accordance with an example embodiment, peerless TELQO functionality is added to an existing broadband network connection, where the network 800 supports one or more peerless tunnels 802 to the TELQO peerless server (TPS) 824, via the public network 822. As in the network 600 (FIG. 6), a TELQO WAN optimization appliance (WAP) 830 augments the router/firewall 804. The TELQO WAP 830 comprises a single Ethernet interface which communicates with a LAN interface of the router/firewall 804, where, as in the network 600, a pair of upstream and downstream VLANs are configured on the interface. The network LAN 808 provides network access, for example, to the peripherals 812 (e.g., computer or server, printers, and other such peripherals). Further, the policy based routing of the router/firewall 804 is configured to forward: (1) packets which ordinarily would be forwarded from the WAN port of the router/firewall 804 to the WAP 830 via the downstream VLAN; (2) packets received from the WAN port of the router/firewall 804 via the upstream VLAN; (3) packets received by the WAP 830 from the WAN port of the router/firewall 804 via the upstream VLAN; (4) packets received by the WAP 830 from the WAN port of the router/firewall 804, which are ordinarily forwarded from a LAN port to the WAP via the upstream VLAN; and (5) packets received from the downstream VLAN to the appropriate LAN port.

By way of example, similar to the WAP 630 and the bridge 705, the WAP 830 transparently bridges (except, possibly, for traffic shaping functions) packets between the upstream and downstream VLANs, employs DHCP on the upstream VLAN to obtain an IP address for communication with the TPS 824, initiates and manages TELQO probe and Set-Rate Transactions, and implements a management tunnel protocol, facilitating network management communications with the network management server(s). For example, as with the network 600 (FIG. 6), the TPS 824 interfaces with the TNMS(S) 834 via one or more network management tunnels 807 (e.g., over the public network 822), which facilitate the exchange of network management traffic between the WAP 830 and the TNMS(S) 834 (via the TPS 824).

Additionally, according to an example embodiment, similar to the TELQO bridge 705, the WAP 830 is configured with a list of TPSs, whereby, on startup, the bridge interacts with all of the configured TPSs to determine the one with the lowest round-trip latency. The TELQO bridge 705 can thereby fall back to other TPSs in the list should interactions fail with the selected TPS.

The TELQO WAP 830 may comprise a single Ethernet interface which communicates with a LAN interface of the router/firewall 804, where, as in the network 600, a pair of upstream and downstream VLANs are configured on the interface. The network LAN 808 provides network access, for example, to the peripherals 812 (e.g., computer or server, printers, and other such peripherals). Further, the policy based routing of the router/firewall 804 is configured to forward: (1) packets which ordinarily would be forwarded from the WAN port of the router/firewall 804 to the WAP 830 via the downstream VLAN; (2) packets received from the WAN port of the router/firewall 804 via the upstream VLAN; (3) packets received by the WAP 830 from the WAN port of the router/firewall 804 via the upstream VLAN; (4) packets received by the WAP 830 from the WAN port of the router/firewall 804, which are ordinarily forwarded from a LAN port to the WAP via the upstream VLAN; and (5) packets received from the downstream VLAN to the appropriate LAN port.

Figure 9:
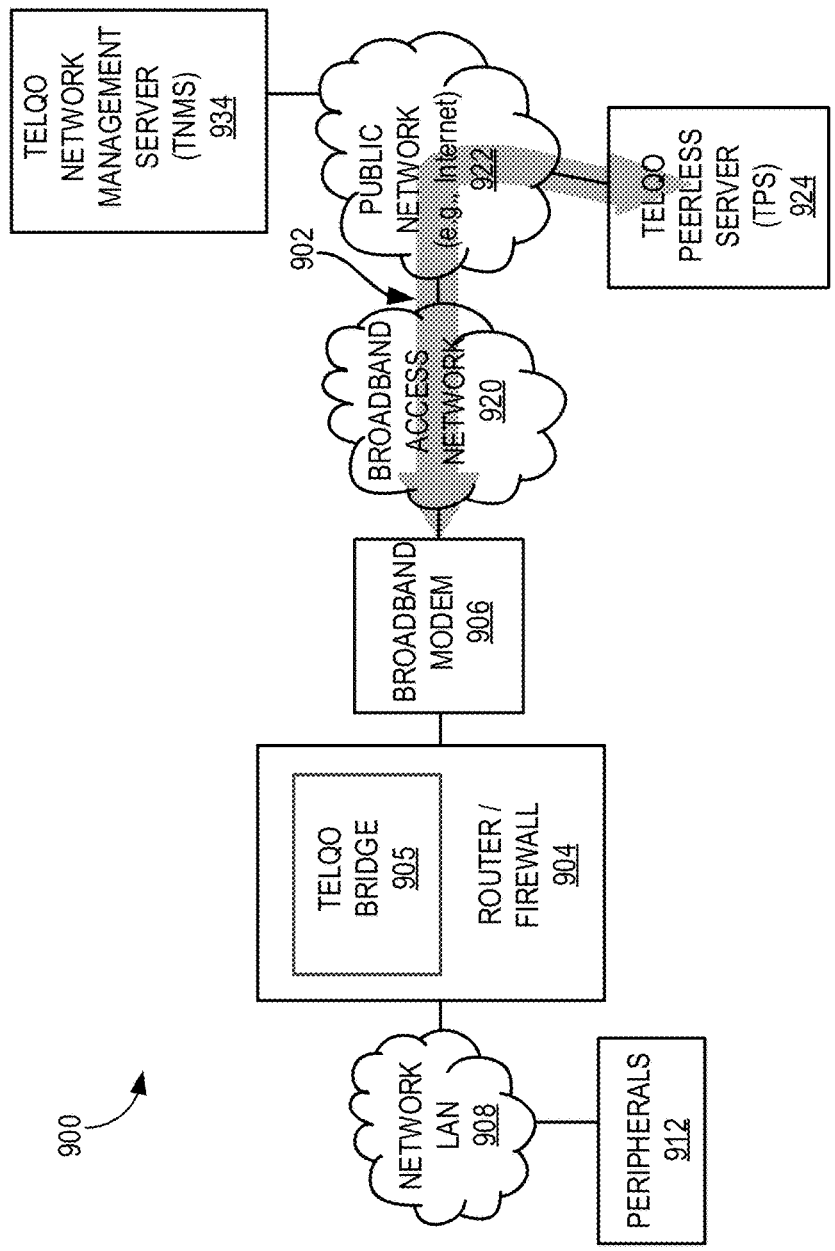
FIG. 9 illustrates a network (e.g., an enterprise or small/medium enterprise (SME) network), including targeted extra latency quality of service overlay functionality that augments an existing broadband network connection via a network bridge integrated within a network router/firewall, which supports peerless tunnel connections, in accordance with example embodiments.

FIG. 9 illustrates a network 900 (e.g., an enterprise or small/medium enterprise (SME) network), including TELQO functionality that augments an existing broadband network connection via a network bridge integrated within a network router/firewall, which supports peerless tunnel connections, in accordance with example embodiments. With reference to FIG. 9, in accordance with an example embodiment, peerless TELQO functionality is added to an existing broadband network connection, where the network 900 supports one or more peerless tunnels 902 to the TELQO peerless server (TPS) 924, via the public network 922. In the network 900, the TELQO bridge 905 is integrated into the router/firewall 904. Moreover, when integrated with the router/firewall 904, the TELQO bridge software management functions are integrated with the router/firewall management, and thus no tunneling of management traffic occurs through the TPS 924.

Figure 10:
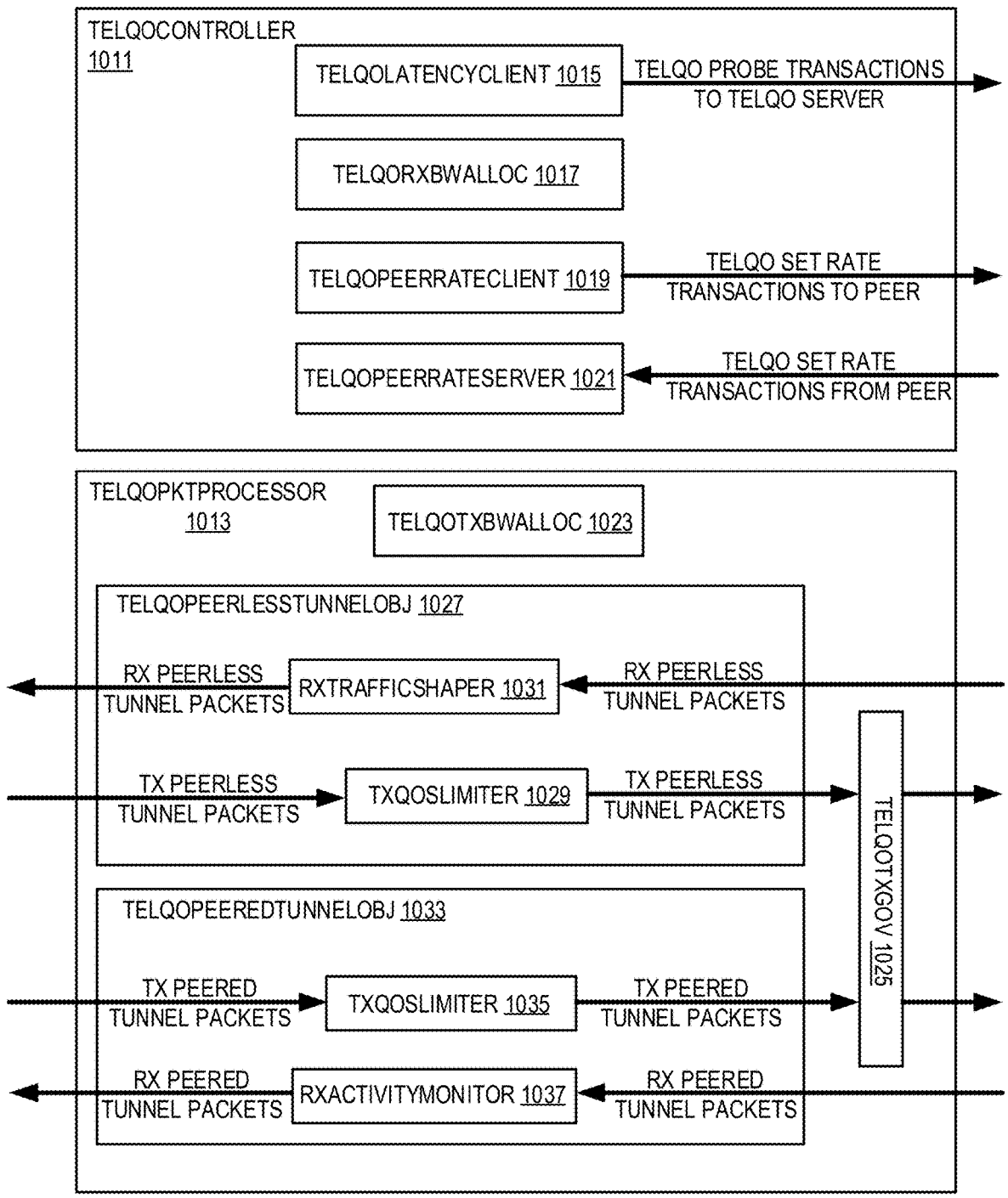
FIG. 10 illustrates an example structure for the organization of various components or modules (e.g., software components or objects) for implementing a TELQO functionality, according to example embodiments.

FIG. 10 illustrates an example structure for the organization of various components or modules (e.g., software components or objects) for implementing the TELQO functionality, according to example embodiments. With reference to FIG. 10, at a high level, the TELQO functionality is implemented, for example, within a TELQO bridge (e.g., bridge 505, 705, 905) or TELQO WAP (e.g., WAP 630, 830) via two components (e.g., modules or software/firmware objects, or a combination thereof)—a control module (e.g., the TelqoController 1011) and a packet processing module (e.g., the TelqoPktProcessor 1013). The TelqoController module is typically less real-time sensitive (e.g., no per-packet processing), and thus may run as an operating system user process (e.g., a LINUX user process). The TelqoPktProcessor is typically relatively real-time sensitive (e.g., including per packet processing, such as prioritization, rate governing, etc.), and thus may run either within the same process as the TelqoController, and (when appropriate—e.g., for more real-time sensitive processes) run within a kernel module (e.g., as a set of NetFilter hooks). By way of example, the TelqoController may consist of a socket application that exchanges TELQO probe packets with a TELQO gateway bridge (e.g., bridge 532), TELQO WOS (e.g. WOS 632), or TPS (e.g., TPS 724, 824, 924). The TelqoController initiates network latency measurements, and determines and adjusts target transmit and receive rates. By way of further example, the TelqoPktProcessor may be composed of LINUX NetFilter type modules, which operate in real time on packets prior to transmission and after receipt via the WAN interface of the router/firewall (e.g., router/firewall 504, 604, 704, 804, 904). Further, the TelqoPktProcessor may operate as a transparent raw-mode socket bridge application (e.g., between a virtual WAN Ethernet interface and the actual WAN Ethernet interface).

By way of further example, the TelqoController 1011 includes a TELQO Latency Measurement Client (TelqoLatencyClient 1015), a TELQO Receive Bandwidth Allocator (TelqoRxBwAlloc 1017), a TELQO Set-Peer-Rate-Limit Client (TelqoPeerRateClient 1019), and a TELQO Set-Peer-Rate-Limit-Server (TelqoPeerRateServer 1021). The TelqoLatencyClient interacts with a TELQO server to maintain clock synchronization, measure one-way network latency, and determine the target transmit rate and target receive rate and provide these rates to the bandwidth allocators. This module may be optional when in the Over-Engineered mode, wherein the target transmit rate would default to an infinite rate. The TelqoRxBwAlloc allocates receive bandwidth among the multiple tunnels. This module may also be optional when the broadband connection is Over-Engineered. There typically would be one TelqoPeerRateClient per peered tunnel, where each such module sets the transmit limit for the respective peer, such as by initiating TELQO Set-Peer-Rate-Limit transactions, on an as needed basis. This module may be optional when the peer is operating in an Over-Engineered mode. There typically would also be one TelqoPeerRateServer module per peered tunnel, where each such module obtains from the peer the transmit rate that will govern transmissions to the peer.

The TelqoPktProcessor 1013 includes a TELQO Transmit Bandwidth Allocator (TelqoTxBwAlloc 1023), a TELQO Peerless Tunnel module (TelqoPeerlessTunnelObj 1027), a TELQO Peered Tunnel module (TelqoPeeredTunnelObj 1033), and a TELQO Transmit Governor (TelqoTxGov 1025). The TelqoTxBwAlloc may allocate transmit bandwidth among multiple tunnels. It may also be real-time intensive, operating periodically at a high frequency (such as 100 to 1000 times per second), where each such period typically requires interactions with each TxQOSLimiter module and with the TelqoTxGov. The TelqoPeerlessTunnelObj 1027 is responsible for transmit QOS prioritization and throughput limiting, and for receive traffic shaping for the traffic of a single peerless tunnel, where there typically would be one such module for each peerless tunnel. Further, the TelqoPeerlessTunnelObj 1027 will include a TxQOSLimiter 1029, which performs transmit limiting and prioritization of traffic being sent to the device to the limit provided by the TelqoTxBwAlloc, and a RxTrafficShaper 1031, which performs traffic shaping for received traffic to keep it under the limit assigned by the TelqoRxBwAlloc. The TelqoPeeredTunnelObj 1033 is responsible for transmit QOS prioritization and throughput limiting for traffic being carried by the broadband connection across a single peered tunnel (e.g., a VPN tunnel), where there typically would be one such module for each peered tunnel. Further, the TelqoPeeredTunnelObj 1033 will include a TxQOSLimiter 1035, which performs transmit limiting and prioritization of traffic being sent to the device to the limit provided by the TelqoTxBwAlloc, and a RxActivityMonitor 1037, which classifies received packets and counts packets and bytes by classification (which counts can be used by the TelqoRxBwAlloc)—this module is optional when operating in an Over-Engineered mode. The TelqoTxGov 1025—this module is typically a final check that is responsible for keeping the transmission rate under the Target Transmit Rate, and is optional and typically only required when there are multiple tunnels and the broadband connection is not Over-Engineered.

Clock-Synchronization

In accordance with example embodiments, in order to measure one-way latency, such as for probe transactions, the clocks used to timestamp packets measuring one way latency in the VPN router and VPN gateway may be synchronized, to the extent that relatively large one-way latency can be identified and adjusted, such as to control the rate of traffic flow over tunnels. For example, the clocks may be adjusted to be accurate to within approximately 20 milliseconds. As to clock synchronization for probe and rate setting in networks, the following explanation of terminology for clock synchronization is provided, such as in relation to determining the latency parameters, although the relations and terminology are by way of example only, and should not be construed in a limiting sense. Such example terminology used for the described relations as can be used to quantitatively determine clock synchronization, are as follows (a lower case t indicates a specific point of time):

(1) $Cl(t)$: The local router/gateway maintains a 32-bit millisecond counter (Cl) that counts the number of milliseconds since the router/gateway was rebooted (rolling over as necessary), and the counter must not be adjusted by changes to the calendar clock, and the value $Cl(t)$ holds the value of that counter at time t.

(2) $Cr(t)$: The TELQO Server maintains a 32-bit millisecond counter (Cr) that counts the number of milliseconds since the router/gateway was rebooted, and the value $Cr(t)$ holds the value of that counter at time t.

(3) $Cs(t)$: The TelqoLatencyClient maintains a 32-bit millisecond counter which is synchronized (Cs) as well as possible to the clock of the TELQO Server (Cr).

(4) $Os(t)$: The TelqoLatencyClient maintains a 32-bit timer offset (Os) which when added to $Cl(t)$ produces the synchronized time ($Cs(t)$), and thus $Cs(t)=Cl(t)+Os(t)$, and when $Os(t)$ is substantially perfect (such as relatively zero) then $Cs(t)=Cr(t)$.

The initialization and maintenance of $Os(t)$, by the TelqoLatencyClient, reflects an important part of the clock synchronization. Also, if the clocks of the router and gateway have not drifted, $Os(t)$ can be a constant after being properly initialized. By way of example, the TelqoLatencyClient initializes its $Os(t)$, such as by transmitting multiple request probe packets to its TELQO Server and processing the responses, where $Cl(req)$ reflects the value of Cl when the request is sent by the gateway/router, $Cl(resp)$ reflects the value of Cl when the response is received by the gateway/router, and $Cr(req)$ reflects the value of Cr when the request is received by the gateway. Ideally, the one-way latency for the request typically can be equal to the one-way latency for the response and, thus, the time of $Cr(req)$ is half way between $Cs(req)$ and $Cs(resp)$. Accordingly, $$Cr(req)=Cs(req)+(Cs(resp)-Cs(req))/2, \text{ and} \qquad (1)$$

$$Cr(req)=Cl(req)+Os(req)\pm(Cl(resp)+Os(resp)-Cl(req)-Os(req))/2 \qquad (2)$$

Further, because Os typically changes slowly over time (e.g., as the clocks drift), effectively $Os(resp)=Os(req)$, and as such:

$$Cr(req)=Cl(req)+Os(req)+(Cl(resp)-Cl(req))/2 \qquad (3)$$

$$Cr(req)=Cl(req)/2+Os(req)+Cl(resp)/2 \qquad (4)$$

$$Os(req)=Cr(req)-(Cl(req)+Cl(resp))/2 \qquad (5)$$

In the case of a relatively instantaneous network (where $Cl(req)=Cl(resp)$), the relations for clock synchronization can be expressed, for example, as follows:

$$Os(req)=Cr(req)-Cl(req), \text{and} \qquad (6)$$

$$Cr(t)=Cl(t)+Os(t). \qquad (7)$$

If the two clocks did not drift significantly, then for clock synchronization, updating $Os(t)$ can be implemented with a zeroth order difference equation, for example, as follows:

$$Os(t_{n+1})=Os(t_n)+F(Os(t_n),Cr(req),Cl(req),Cl(resp)), \qquad (8)$$

where $Cr(req)$, $Cl(req)$ and $Cl(resp)$ reflect their most recent values, and where the F function addresses any measurement error and the minor drift.

If the two clocks drift significantly, but the rate of drift is relatively constant, then $Os(t)$ may be updated a first-order difference equation, for example, as follows:

$$Os(t_{n+1})=Os(t_n)+D_n*(t_{n+1}-t_n)+F(Os(t_n),Cr(req),Cl(req),Cl(resp)), \qquad (9)$$

where $Cr(req)$, $Cl(req)$ and $Cl(resp)$ reflect their most recent values, and where the F function addresses any initial error and the minor drift, and where $D_n$ (based on long term measurements coming from the timing requests) addresses the constant drift.

If the two clocks drift significantly, but the rate of drift changes by a slow constant, then $Os(t)$ may be updated with a second order difference equation, for example, as follows:

$$Os(t_{n+1})=Os(t_n)+D_n*(t_{n+1}-t_n)+A_n*(t_{n+1}-t_n)^2+F(Os(t_n),Cr(req),Cl(req),Cl(resp)), \qquad (10)$$

where $Cr(req)$, $Cl(req)$ and $Cl(resp)$ reflect their most recent values, where the F function addresses any initial error and the minor drift, where $D_n$ (based on long term measurements coming from the timing requests) addresses the constant drift, and where $A_n$ (based on medium term measurements coming from timing requests) addresses changes in D over time.

In implementations, the order of the difference equation that is applied to update $Os(t)$ (e.g., zeroth order difference equation (8), first order difference equation (9), second order difference equation (10), etc.) may depend on factors such as how accurately the clocks need to be synchronized, how much the clocks drift and how much the drift changes over time, and how frequently usable clock synchronization probe transactions are completed. For example, the existence of clocks with a drift of hundreds of parts per million typically can necessitate the use of a first-order relations model and the long term tracking of the D value to validate the model.

In measuring latency, the $Os(t)$ may be adjusted between usable probe transactions. Such adjustment can use, for example, the first order difference equation (9) to adjust $Os(t)$ between timing requests, and to reduce the timing request frequency. When between timing measurements, equation (9) can typically be simplified, for example, to:

$$Os(t_{n+1})=Os(t_n)+D(t_n)*(t_{n+1}-t_n) \qquad (11)$$

where $t_n$ reflects the time of the most recent usable $Cr(req)$, $Cl(req)$ and $Cl(resp)$.

Following startup, $D(t_n)$ can be calculated or determined relative to the first measurement, and measurements may be required more frequently (e.g., at least once a minute, for example) during the first hour. As $D(t_n)$ is more accurately characterized, the frequency of probe transactions can be reduced. Typically, when a branch office router is first provisioned, probe transactions are relatively frequent up until D is sufficiently well characterized.

Probe Transactions and Set-Rate Transactions

According to one example embodiment, the TELQO functionality described herein operates to measure network latency and to set network target transmit and receive rates via probe and set-rate transactions. Probe transactions may be initiated to obtain/maintain clock synchronization and to measure one-way network latency. Set-Rate transactions may be initiated to set the transmit rate limit of a TELQO peer, and to set its maximum ungoverned classification.

Relatively frequent initiation of probe transactions may enhance synchronization performance, and provides relatively frequent network latency measurements. On the other hand, initiating probe transactions relatively frequently adversely affects available bandwidth, and may result in the transmission of probe requests when either direction of the link is asymmetrically congested, which can drive the Os(t) off in the direction of the asymmetry. Therefore, according to example embodiments, results of a timing request probe transaction which have a relatively short round trip time may be used to adjust Os(t).

Figure 11:
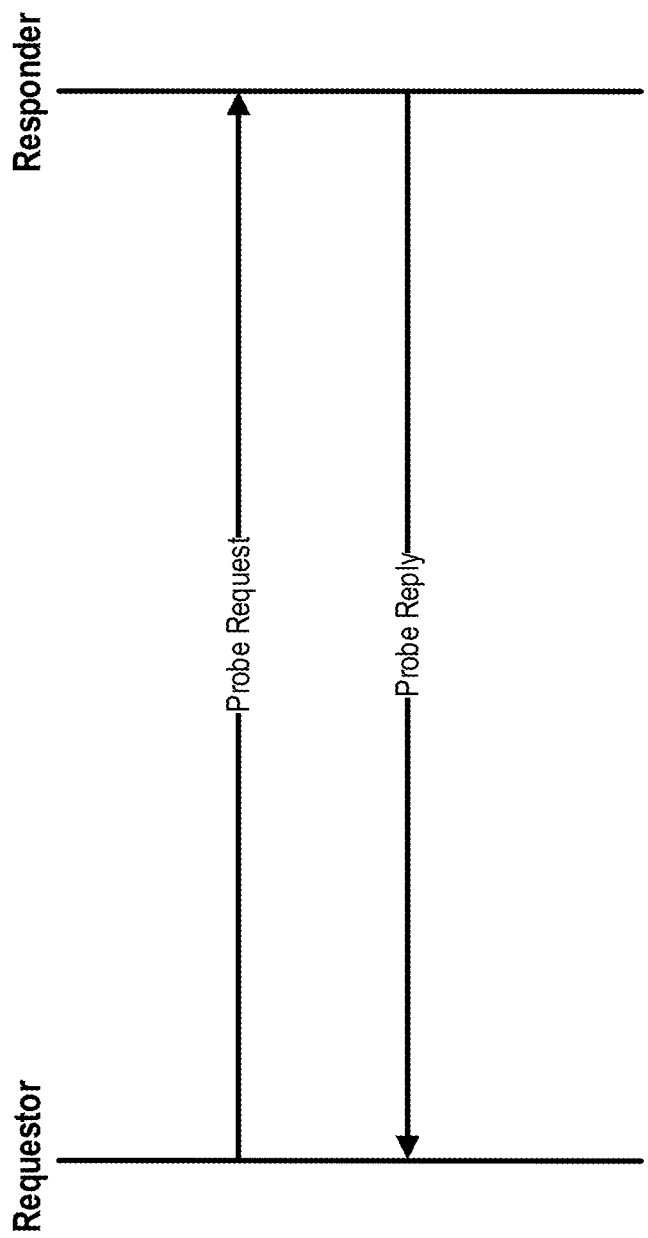
FIG. 11 illustrates a probe transaction between a requestor and responder, in accordance with example embodiments.

By way of example, a probe transaction and a set-rate transaction may utilize two UDP packets operating according to a client/server model. FIG. 11 illustrates an example of a probe transaction between a requestor and responder. For example, the requestor may be a client router and the responder may be a server router communicatively coupled to client router over a VPN network. A probe transaction, for example, may provide a client with a Cl(req), a Cr(req) and a Cl(resp) measurement, as discussed above. These measurements may be used to obtain/maintain clock synchronization and to determine one-way latency in both the transmit and receive directions (e.g., from the client to server and from the server to client). In some implementations, there are no retransmissions of packets within a probe or set-rate transaction, and a timeout can be used to determine the loss of a Probe Reply. In some implementations, at most a single probe transaction and a single set-rate transaction may be underway at any time.

In implementations where the transport prioritizes traffic based on a MPLS tag or DSCP tag, two different probe transaction types may be employed. First, clock synchronization my take place by using the MPLS or DSCP tag for the highest-priority (lowest latency) class-of-service, as discussed above. Second, latency measurements may be taken to determine the worst-case one-way latency in each direction being experienced by real traffic. In implementations, latency measurements in the upstream may involve sending potentially multiple probe request packets upstream, one for each class-of-service that might potentially have the longest upstream latency. The upstream latency measured may then be based on the last of these probes to arrive at the server. In implementations, latency measurements in the downstream direction may involve sending potentially multiple probe response packets downstream, one for each class-of-service that might potentially have the longest downstream latency.

Figure 12:
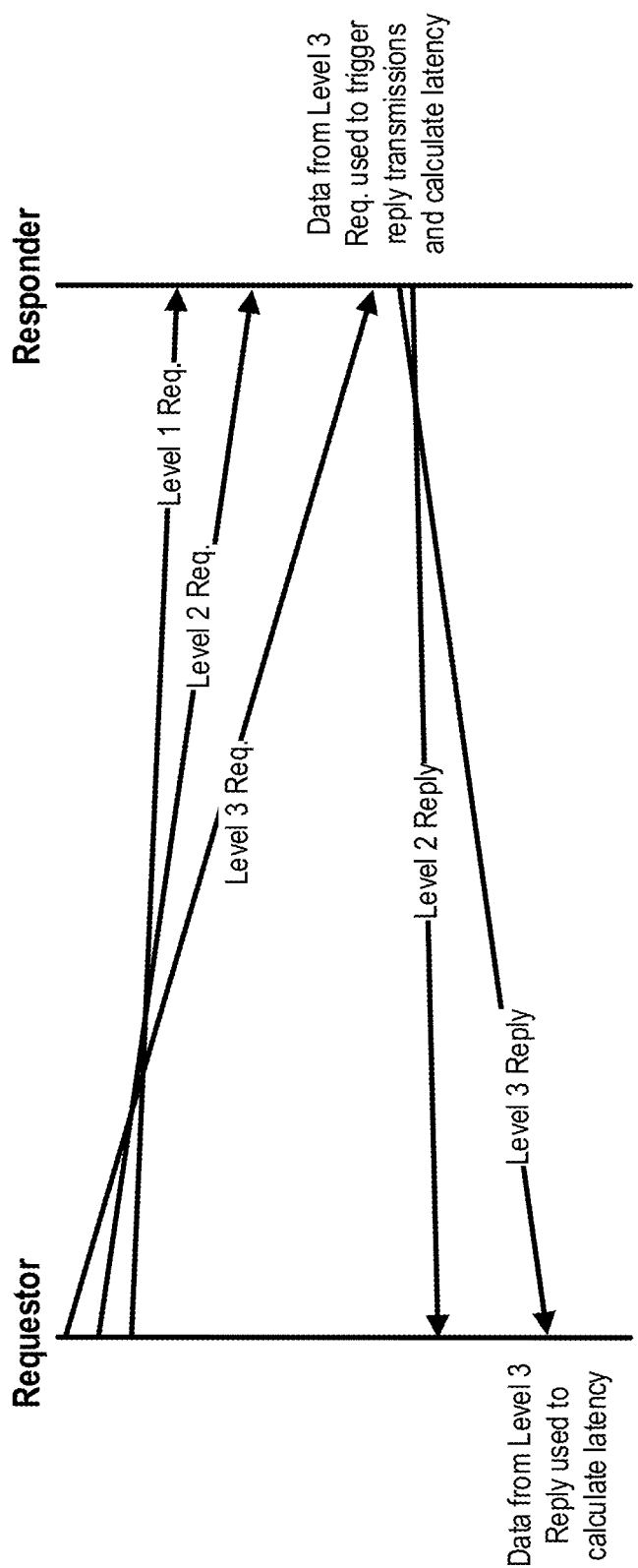
FIG. 12 illustrates an example implementation of a latency measurement probe transaction that may take place when there has been recent, significant upstream traffic for the following class-of-service traffic levels: level 1, level 2, and level 3, and recent significant downstream traffic for the following class-of-service traffic levels: level 2 and level 3, where level 1 traffic has the highest priority and level 3 traffic has the lowest priority.

FIG. 12 illustrates an example implementation of a latency measurement probe transaction that may take place when there has been recent, significant upstream traffic for the following class-of-service traffic levels: level 1, level 2, and level 3, and recent significant downstream traffic for the following class-of-service traffic levels: level 2 and level 3, where level 1 traffic has the highest priority and level 3 traffic has the lowest priority. For example, level 1 traffic may correspond to interactive traffic, level 2 traffic may correspond to stream traffic, and level 3 traffic may correspond to bulk traffic. As illustrated, the underlying prioritization mechanism (e.g., MPLS or DSCP) may have the lowest priority request and reply arriving last. This may not always be the case when the mechanism has some kind of anti-starvation policy (e.g. fair-weighted queuing). The server, upon receiving one of a batch of probe requests, may wait a limited period of time for additional probe requests to arrive up until all requests have arrived. It may then use the last to arrive of the batch to send back the batch of replies. The requestor may use the last of the replies to actually calculate the latency.

With regard to set-rate transactions, a TELQO peer, upon completing initialization of a tunnel, or upon finding that its peer has changed its incarnation number, needs to relatively expeditiously obtain its transmit rate limit. Accordingly, such a TELQO peer periodically sends initiate Set-Rate Transaction requests until it receives a valid Set-Rate Request packet. The reception of an Initiate Set-Rate Transaction packet triggers a TELQO peer to initiate a Set-Rate Transaction.

By way of example, for the probe transactions, a probe packet format can be used both for probe-transaction packets (e.g., between a TelqoLatencyClient and a TelqoServer) and for set-peer-rate packets (e.g., between a TelqoPeerRateClient and TelqoPeerRateServer). A probe packet, for example, can be a UDP packet carrying certain fields compacted together in network byte order, where the fields of such a probe packet may comprise:

(1) a Tag field (e.g., 4 bits), which provides an indication as to whether the packet is a TELQO probe packet;

(2) a Sender ID field (e.g., 32 bits), which uniquely identifies the sender of the packet (e.g., ordinarily an IPv4 address that is unique to the sender), which (for a TelqoLatencyClient) comprises the management IP address of the node, and (for a TELQO Server on the public network) comprises a public IP address, and (for a TELQO Server residing within a data-center node) comprises the management IP address for that node;

(3) an Incarnation Number field (e.g., 32 bits), which uniquely identifies when the Timestamp field was last initialized (e.g., ordinarily this is the UNIX time t value of when the sending application (TelqoLatencyClient or TELQO Server) was started), whereby, when the incarnation number of a server changes, the receiving TelqoLatencyClient restarts synchronization;

(4) a Timestamp field (e.g., a free-running, roll-over timestamp, such as a 32 bit millisecond timer), containing the time when the respective packet was transmitted—e.g., for a Set-Rate-Request packet, the Timestamp field comprises the required transmit bit rate (e.g., bits-per-second) and the maximum traffic classification to be transmitted ungoverned, and, for a Set-Rate-Reply packet, the Timestamp field comprises the Timestamp field from the corresponding set-rate request packet;

(5) a Request/Reply Flag field (e.g., 8 bits), which indicates whether the packet is a request or a reply;

(6) a Peer OoS/Lost field (e.g., 8 bits), which comprises a rollover counter reflecting the number of packets from a peer that were lost or arrived out-of-sequence, with respect to the particular transaction;

(7) a Transaction Sequence Number field (e.g., 8 bits), which comprises a rollover counter identifying the transaction, where the same value is used for each of the request, reply and reply acknowledge for a one transaction; and (8) a Security Checksum field (e.g., 64 bits), which is used by the recipient to detect unauthorized packets and to identify and defend against denial of service attacks.

TelqoController State Machines

In implementations, various state machines can implement the processing of a TELQO controller 1011. A Telqo-LatencyClient Clock Synchronization state may monitor the status of the clock synchronization of a TelqoLatencyClient, such as with a TELQO Server. This state machine may be implemented by a TelqoLatencyClient 1017. A clock synchronization state machine may take on one of the following states:

(1) Initial Clock Synchronization—when in this state, a TelqoLatencyClient clamps its target transmit rate and target receive rate to a very low value (thus inducing a lightly-loaded condition) and initiates a series of Probe transactions. Upon completion of a large enough fraction of the probe transactions, a TelqoLatencyClient transitions to the Uncalibrated Drift State, and a direct transition can be allowed to the steady state provided persistent storage of the Dn is available and the Dn has been stable over long periods of time;

(2) Uncalibrated Drift State—when in this state, a Telqo-LatencyClient keeps a reasonably steady stream of clock synchronization transactions going (e.g., once every 20 seconds) and forces low-latency transactions should no transactions complete which allow for clock synchronization updates within a relatively short period of time (e.g., once every 2 minutes). Also while in this state, when traffic is flowing, TelqoLatencyClient initiates latency measurement probe transactions, on an as needed basis, to properly control the target transmit and target receive rates. A TelqoLatencyClient transitions to the steady state a long enough period of time with clock synchronization updates has completed to allow operation in Steady State;

3) Steady State—when in this state, a TelqoLatencyClient keeps a relatively sufficient amount of clock synchronization transactions going to keep the clocks adequately synchronized and to avoid, where possible, a transition to the Forced Low Latency state. The actual period between such clock synchronization (and if need be forced low-latency transactions) can be a function of the measured clock drift and changes over time from linear clock drive. Also while in this state, when traffic is flowing, TelqoLatencyClient initiates latency measurement probe transactions as can be needed to properly control the target transmit and target receive rates; and (4) Clock Sync Forced Low Latency—when in this state, a TelqoLatencyClient may vote to have a TelqoForceLowLatencySm object clamp the target transmit and target receive rates to very low values (thus inducing a lightly-loaded condition where round-trip time measurements should be close to the minimum and where congestion triggered packet loss should be avoided). Upon completion of a large enough number of the probe transactions, the Clock synchronization state machine may transition back to the state it came from (one of: Uncalibrated Drift State or Steady State).

The TelqoLatencyClient may maintain a Forced-Low-Latency state machine in the form of a TelqoForceLowLatencySm object. This object may maintain whether the target rates are forced to a low enough value that probe measurements should obtain a lightly-loaded round-trip time and should avoid congestion induced packet loss. The state machine may support one of the following states:

(1) On—when the target rates are clamped to a low target bit rate. When clamped the TelqoProbeSchedulerSm object is voted into the ASAP (as soon as possible) state to cause probes to be scheduled back-to-back.

(2) Off—when the target rates are set by the Target Rate Controllers.

The following example clients of a state machine may "vote" for a clamps ON state. A black-ball system may be used where a non-zero number of votes causes the machine to be in the clamped state. The example clients are as follows:

(1) TelqoClockSync Mandate—The TelqoClockSync object triggers a Forced Low Latency state when it needs a close to minimum round-trip time measurement to avoid losing clock synchronization;

(2) Consecutive Failed Probes—The TelqoProbeHandler object can trigger a Forced Low latency state when multiple consecutive probe transactions have failed. This is useful as the probe transactions can fail this way when the target rate is way too high and the congestion is causing huge packet loss;

(3) Initial Clock Synchronization—while in the Initial Clock Synchronization state the target rate may be clamped such that the minimum round-trip time can be measured and so that clock synchronization may be established; and (4) High Availability Networking Switchover—when a high-availability networking switchover takes place the new minimum round-trip time may be established by entering the Force-Low-Latency State.

The TelqoLatencyClient may maintain a set of state variables (e.g., one per tunnel) to monitor force-low latency status. Such a state variable may take one of the following values:

(1) Unforced—when in this state there typically is no effort being expended to force a low-latency condition;

(2) ForceInitiated—when the tunnel should be running in a forced low-latency state, but it is not yet known yet whether the tunnel has in-fact cut its rate. For a Split Tunnel, the Receive Traffic Shaper's rate has been cut down, but the flow of received split-tunnel traffic has yet to fall to a low enough rate. For a Peer Tunnel, the set-rate transaction has been initiated but the reply has yet to be received; and (3) ForceConfirmed—when the tunnel has confirmed low-latency operation. For a Split Tunnel this is after a low rate of split-tunnel traffic has been achieved. For a Peer Tunnel this is when the low-rate set-rate transaction has been successfully completed or the Set-Rate transaction state has entered the Peer Unreachable state.

A TelqoLatencyClient may maintain a similar state variable for its transport as a whole. This state variable may take one of the following values:

(i) Unforced—when in this state there is no effort being expended to force a low-latency condition.

(ii) ForceInitiated—when a forced low-latency state has been commanded but one or more of the tunnels remains in the ForceInitiated state; and (iii) ForceConfirmed—when all of the tunnels are in a ForceConfirmed state.

The TelqoLatencyClient may maintain a state machine for probe transactions, where the Probe Transaction State, for example, takes on one of the following states:

(1) Idle—there is no probe transaction currently underway. A transition from Idle to Awaiting Reply occurs when a Probe Request is transmitted; and (2) AwaitingReply—a probe transaction was initiated and the TelqoLatencyClient is awaiting the probe reply, and if no reply is received, the timeout (ProbeTransactionTimeout) can be a large timeout (e.g., default=3000 ms).

A TelqoPeerClient may maintain a state machine for its Peer Tunnel summarizing the status of Set-Rate transactions to the tunnel's peer, where the Set-Rate Transaction State, for example, takes on one of the following states:

(1) Idle—there is no probe transaction currently underway. A transition from Idle to Awaiting Reply ordinarily only occurs on when the Set-Rate Transaction State is Idle and a Set-Rate Request is transmitted to the peer;

(2) AwaitingReply—a Set-Rate Transaction was initiated and the TelqoPeerClient is awaiting the set-rate reply. Should no reply come, the timeout (SetRateTransactionTimeout) is a large timeout (default=3000 ms); and (3) Peer Unreachable—when a Set-Rate Transaction has been attempted and failed after multiple timeouts. When in this state, Set-Rate Transactions are initiated at a relatively low, background rate.

A TelqoPeerServer server may maintain a state machine for its Peer Tunnel summarizing whether the respective tunnel requires a peer initiated Set-Rate Transaction, where the state machine, for example, takes on one of the following states:

(1) Not Needed—a tunnel is in this state when either the tunnel is within an Over-Engineered TelqoPeerServer server or when a Set-Rate transaction has been received since tunnel initialization or since the previous time the peer's incarnation number changed; and (2) Trans Needed—a tunnel is in this state after the tunnel has completed initialization or the peer's incarnation number has changed up until it receives its first Set-Rate Request packet. While in this state, the TelqoPeerServer server periodically sends Initiate Set-Rate Transaction Request packets.

Figure 13:
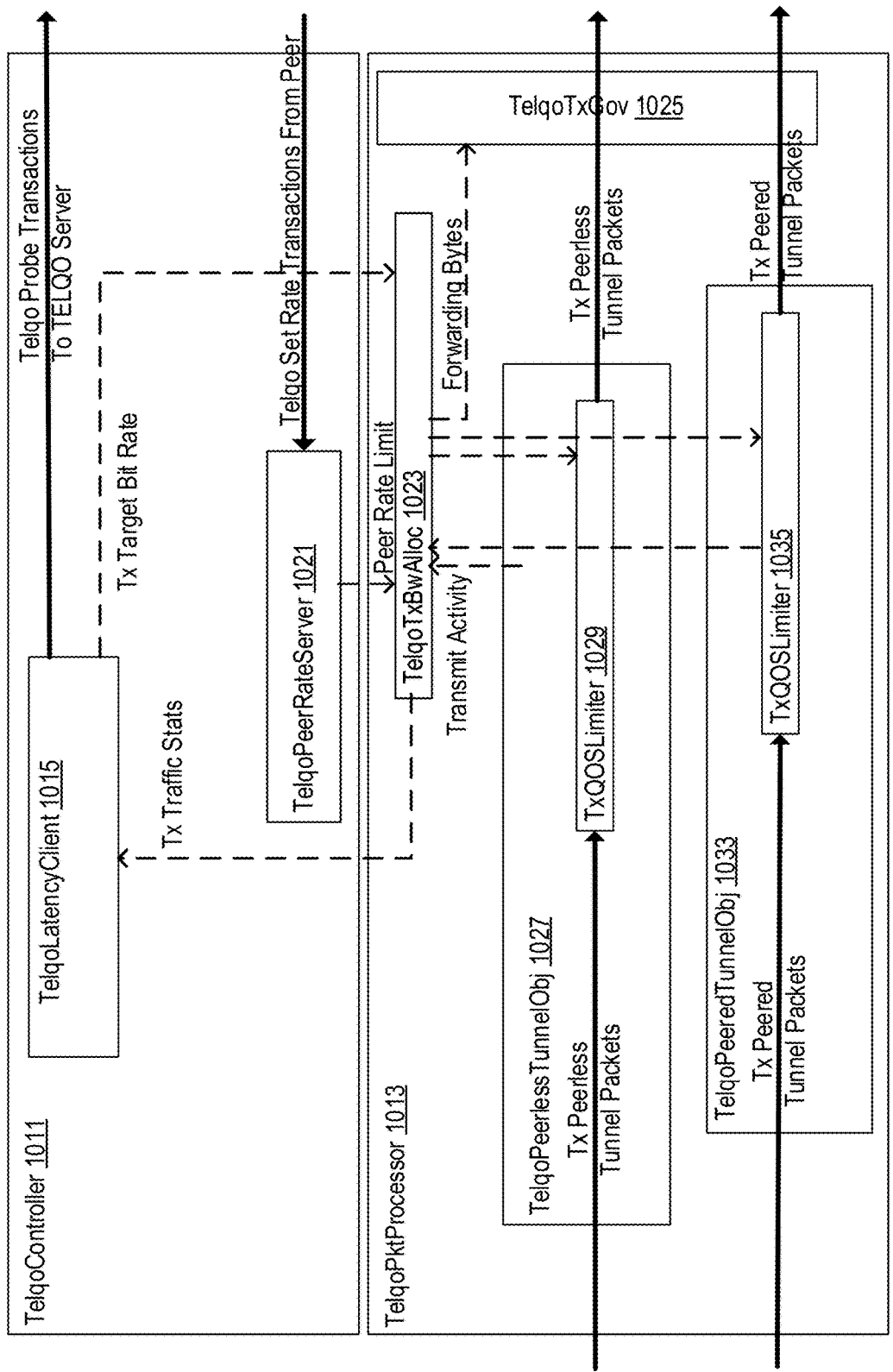
FIG. 13 illustrates a block diagram depicting an example process configuration for the generation of a target data transmit rate, based on network latency measurements, utilizing the TelqoController and TelqoPktProcessor of FIG. 10, in accordance with example embodiments.

FIG. 13 illustrates a block diagram depicting an example process configuration for the generation of a target data transmit rate, based on network latency measurements, utilizing a TelqoController 1011 and TelqoPktProcessor 1013, in accordance with example embodiments.

As illustrated in the example of FIG. 13, a TelqoLatencyClient 1015 initiates latency measurement transactions with a TELQO server to measure transmit one-way latency and maintain clock synchronization. TelqoLatencyClient 1015 also receives transmit traffic utilization information from the TelqoTxBwAlloc object 1023. This information may guide the TelqoLatencyClient 1015 regarding how frequently latency measurements are needed to help control transmission across the broadband connection. It may also guide the TelqoLatencyClient regarding when it is appropriate to increase the Tx Target Bit Rate. Based on the latency measurement and the transmit utilization information, TelqoLatencyClient 1015 generates and passes a Tx Target Bit Rate to the TelqoTxBwAlloc object 1023.

In the example of FIG. 13, The TelqoTxBwAlloc object 1023 receives a Tx Target Bit Rate from the TelqoLatencyClient 1015. TelqoTxBwAlloc object 1023 also monitors the transmit activity of each of the TxQOSLimiter objects 1029 and 1035 within respective TelqoPeerlessTunnelObj 1027 and TelqoPeeredTunnelObj 1033, and object 1023. Based on the monitoring, TelQoTxBwAlloc object 1023 provides the overall transmit utilization information back to the TelqoLatencyClient 1015. Further, TelqoTxBwAlloc object 1023 allocates bandwidth among the TxQOSLimiter objects 1029, 1035 by allocating "forwarding bytes" periodically, with precise timing (e.g., based on the Tx Target Bit Rate received from TelqoLatencyClient 1015 and received peer transmit rate limits) to each TxQOSLimiter and to the TelqoTxGov objects 1025, 1029, and 1035. In some implementations, TelqoTxBwAlloc object 1023 may optionally receive a Peer Transmit Rate Limit from each TelqoPeerRateServer object 1021.

In implementations, there may be one TelqoPeerlessTunnelObj object 1027 per peerless tunnel. In implementations, there may be one TelqoPeeredTunnelObj object 1033 per peer. In implementations, there may be one TelqoPeerRateServer object 1021 per peered tunnel.

In implementations, the resulting transmit rate aggregated from the TxQOSLimiter objects should be such that the broadband connection is not overloaded so that the prioritization of packets by the TxQOSLimiter results in acceptable latency for, e.g., real-time and interactive data. That is, the resulting overall transmit rate should be such that the queue of packets in the broadband modem awaiting transmission across the broadband connection remains: (i) lightly loaded enough that high-priority packets go through without much delay but (ii) heavily loaded enough so that bulk transmission traffic use nearly all of the transport's capacity. Further, this overall transmit rate should accommodate for changes in available network bandwidth capacity and some level of network jitter.

The TelqoLatencyClient 1015 may include a TelqoTargetTxRateController (not shown), via which the TelqoLatencyClient controls the target transmit rate. The TelqoTargetTxRateController may comprise two main outputs, a target transmit rate, and a command line back to the TelqoLatencyClient to initiate a latency measurement probe transactions (not shown). The TelqoTargetTxRateController may control the target rates to control throughput limits based on certain information at its disposal. The TelqoTargetTxRateController can obtain notifications of packet transmissions, and time-stamped transmitted packet and byte counts by priority level, from the TelqoTxBwAlloc object. The notification of packet transmission, for example, may be used to detect an idle/lightly loaded connection going active. The TelqoTargetTxRateController may also receive the one-way latency measurement data.

Figure 14:
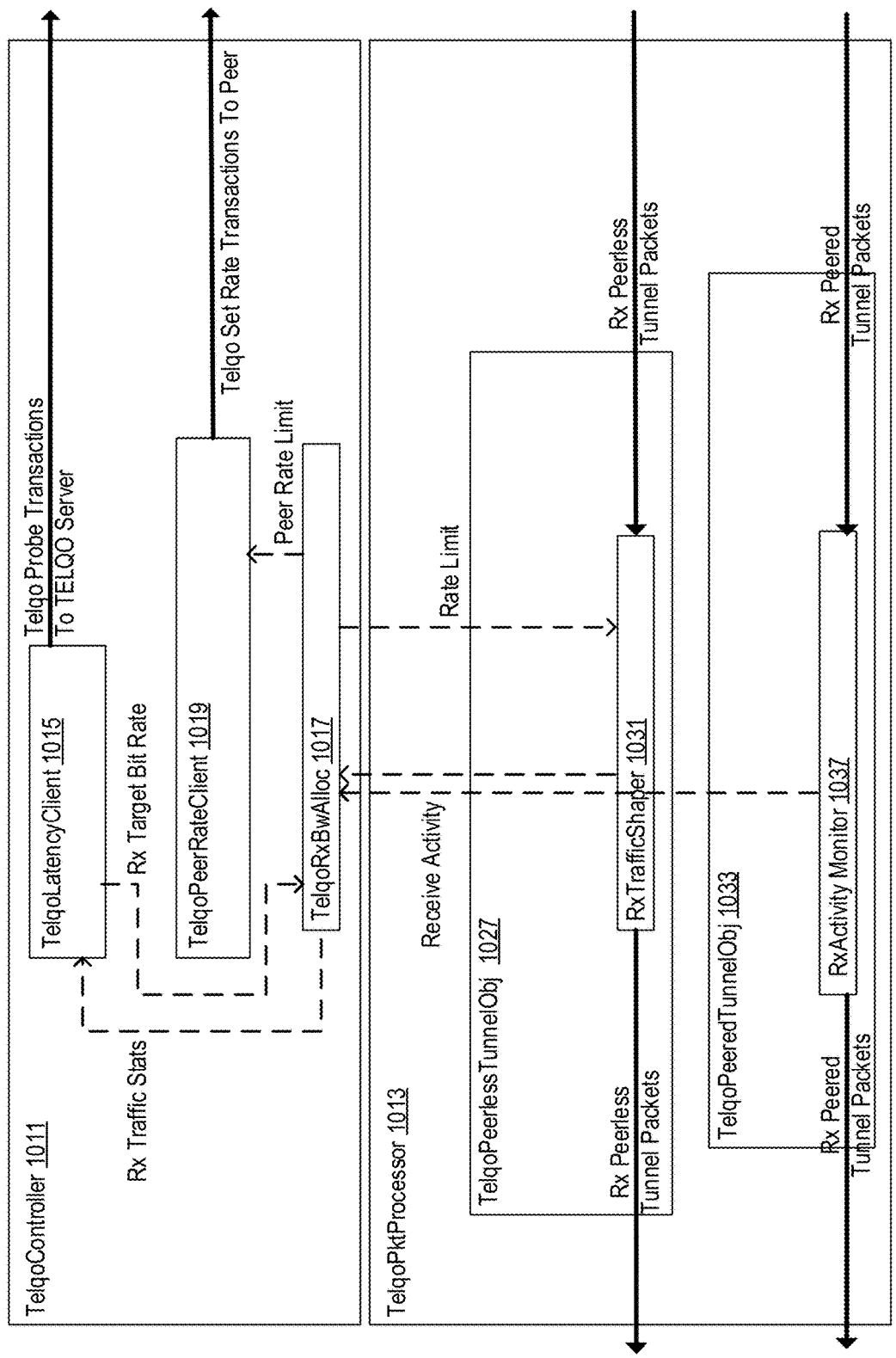
FIG. 14 illustrates a block diagram depicting an example process configuration for the generation of a target data receive rate, based on network latency measurements, utilizing the TelqoController and TelqoPktProcessor of FIG. 10, in accordance with example embodiments.

FIG. 14 illustrates a block diagram depicting an example process configuration for the generation of a target data receive rate, based on network latency measurements, utilizing a TelqoController 1011 and TelqoPktProcessor 1013, in accordance with example embodiments.

As illustrated in the example of FIG. 14, a TelqoLatencyClient 1015 initiates latency measurement transactions with a TELQO server to measure receive one-way latency and maintain clock synchronization. Additionally, TelqoLatencyClient 1015 monitors the overall receive activity provided by the TelqoRxBwAlloc object 1017, and TelqoLatencyClient 1015 produces and passes a Target Receive Rate to the TelqoRxBwAlloc object 1017. As with the target transmit rate, the TelqoLatencyClient 1015 may control the target receive rate via a TelqoTargetRxRateController (not shown). The TelqoTargetRxRateController may function substantially as does the TelqoTargetTxRateController employed for generating the target transmit rate, but instead works with receive objects rather than transmit objects.

In the example of FIG. 14, the TelqoRxBwAlloc object 1017 receives a Target Receive Rate from the TelqoLatencyClient 1015, monitors tunnel receive activity via the RxTrafficShaper object(s) 1031 and RxActivityMonitor object(s) 1037, and allocates bandwidth among the RxTrafficShaper object(s) 1031 and TelqoPeerRateClient object(s)

1019 by adjusting each tunnel's Receive Rate Limit (e.g., based on a target receive rate received from the TelqoLatencyClient, and the receive activity information received from the RxTrafficShaper and RxActivityMonitor modules). In implementations, there may be one TelqoPeerRateClient object 1019 per peered tunnel.

The receive rates may be controlled by the peer receive rate limit provided to the TelqoPeerRateClient and the receive rate limit provided to the RxTrafficShaper. For the peered tunnel, the rate of receive traffic may be controlled via a set rate transaction between the TelqoPeerRateClient and the Telqo peer from which the receive traffic is received over the tunnel (e.g., initiated via a set rate request transmitted to the peer). For the peerless tunnel, the RxTrafficShaper module may regulate the receive traffic, based on the receive rate limit provided by the TelqoRxBwAlloc via one or more traffic shaping mechanisms, including insertion of extra. target latency amounts, adjustment of window sizing, control of new connection establishment and packet dropping.

In implementations, the resulting receive rate aggregated across the tunnels should be such that the broadband connection is not overloaded so that low-latency packets (e.g., real-time, light interactive and to a lesser degree heavy interactive) obtain low latency and low jitter across the broadband connection. That is, the resulting set of Receive Rate Limits should be such that the queue of packets in the modem (e.g., broadband equivalent of a DSLAM) awaiting transmission across the broadband networks remains: (i) lightly loaded enough that high-priority packets go through without much delay; (ii) but heavily loaded enough so that bulk transmission traffic uses nearly all of the transport's capacity. This can happen while the network has changing available bandwidth and some level of network jitter. Further, the receive rate limits should accommodate for changes in available network bandwidth capacity and some level of network jitter.

In implementations, the TelqoRxBwAlloc object 1017 uses a moving average receive rate to produce the overall receive activity information used as guidance for latency measurements and target receive rate increases, and as indicating whether there is real-time data traffic activity over the broadband connection.

As previously discussed, with respect to a peerless tunnel, because there is no peer, there is no way to directly control the receive rate of broadband traffic over the peerless tunnel by means of the direct control of the transmit rate by which a peer transmits such traffic. According to example embodiments, therefore, the rate by which broadband data traffic is received over a peerless tunnel is indirectly controlled via a TELQO Receive Traffic Shaper (RTS) (e.g., the RxTrafficShaper module 1031). The TELQO RTS is configured to control receive throughput, provided that all significant low-priority traffic has a flow control mechanism, and that the flow control mechanism reduces flow in response to increased delay and/or packet loss (which is the case for almost all popularly used applications). There are, however, two cases which might be exceptions—one exception being web browsing, which utilizes multiple parallel TCP connections, and the second being UDP-based teleconferencing and video chat applications. The TELQO functionality is configured to deal with such applications (e.g., web browsing) by means of flow control measures that involve adjusting the receive window size and pacing connection establishment.

According to example embodiments, the TELQO RTS is IP flow aware (e.g., IP protocol; source/destination address and port), whereby the RTS appropriately adjusts delays and packet drops for each flow according to its priority. The RTS classifies each flow by priority, such as one of: (1) Light-No-Delay (e.g., TELQO probe packets); (2) Real-Time (e.g., VOIP); (3) Light-Interactive (e.g., DNS lookup); (4) Heavy-Interactive (e.g., web browsing); and (5) Bulk-Transfer. By way of example, Light-No-Delay and Real-Time packets are always passed thru without delay or intentional packet drop. The classifier may be configured, on a per-tunnel basis, to avoid Real-Time classification of flows on a per-subnet basis, which would typically be done for guest-WiFi subnets to keep their real-time traffic from interfering with more important flows. When there is no Real-Time traffic flowing, flow control is initially performed on the remaining traffic by priority queuing the traffic up to a maximum latency (e.g., default=2300 ins), as limited by the throughput limit. Random packet dropping can be employed on a packet removed from a priority queue as it is about to be forwarded; depending on how long it was queued. The random drop, for example; occurs with increasing intensity (e.g., linearly from 0 to 100%) as the throughput limited priority queue induced latency exceeds a predetermined baseline threshold (e.g., default=1000 ms) and moves to the maximum latency. Further, when Real-Time data traffic is actively flowing over the broadband connection. Bulk-Transfer and Heavy-Interactive traffic may be subjected to a fixed delay (e.g., default=200 ms for Bulk-Transfer, and default-50 ms for Heavy-Interactive), prior to being processed. This ensures that TCP packet loss induced shrinking of the transmit window has a dramatic effect on TCP throughput. PEP Terrestrial Backbone Protocol (TBP) traffic is delayed as needed, but is never dropped intentionally, as the flow control of the TBP protocol is latency based.

LIERD Adjustments to Transmit and Receive Rates

As noted above, in various embodiments, as outbound or inbound latency increases in the network, the transmit and receive rate limiters for controlling traffic flow in the network may be respectively adjusted to reduce latency and maintain QOS priorities. For example, when operating over broadband connections with sudden downshifts in the available capacity (e.g, upstream 4G data connection), transmit bit rates may need to be dynamically adjusted in response to large jumps in measured outbound latencies. Although stepwise adjustment to the transmit rate or receive rate could be applied using fixed rate-size changes (e.g., in steps of 2.5%, 5%, or 10%), such changes are not tuned to the actual changes in network capacity. In such stepwise implementations, if the sudden downshift in network capacity exceeds the stepwise reduction, data may still pile up quickly in the network before target bit rates are brought down in fixed, stepwise decrements to match the available network capacity. As such, embodiments described herein are directed to more effectively adjusting the transmit/receive rates by implementing a LIERD algorithm, further described below, which may be used to dynamically adjust target bit rates to match available network capacity.

Figure 15:
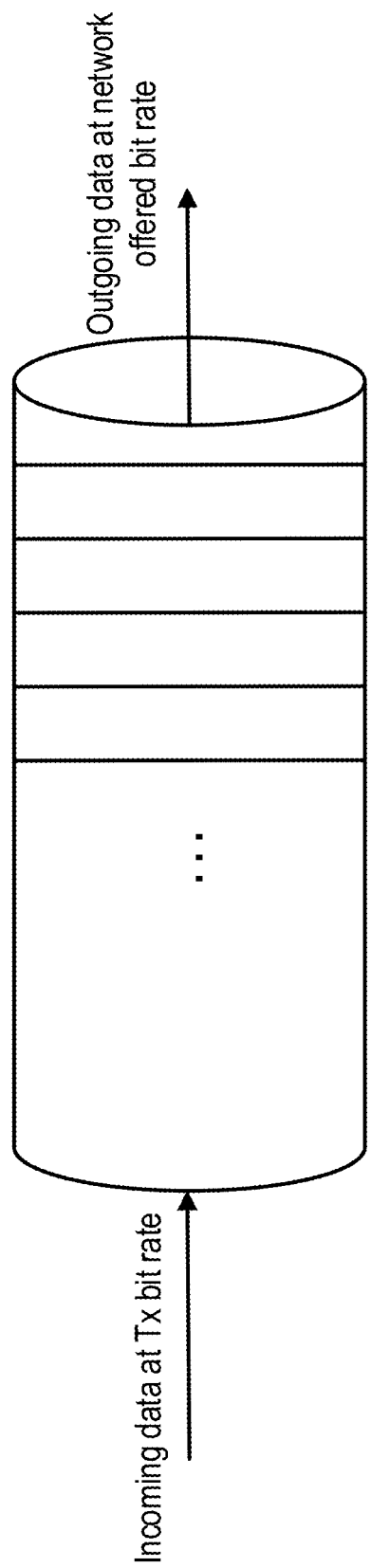
FIG. 15 conceptually illustrates a first-in-first-out output buffer of a modem, in accordance with example embodiments.

Before describing the LIERD algorithm, it is instructive to describe some of the principles underlying it. When one way latency has been increasing and a throughput reduction is necessary to prevent pile up of traffic, a good indicator of the rate reduction that is needed is the latency increase over a previous number of latency measurements. By way of example, consider a FIFO output buffer of a transport modem, illustrated by FIG. 15. Assuming, for example, that the incoming transmit bit rate of the modem is currently 1.0 Mbps and that the outgoing data rate in the network is 1.0 Mbps, the modem is operating at full network capacity.

However, if the incoming transmit bit rate suddenly increases by 10% (e.g., to 1.1 Mbps) for one second, this will result in an extra 10% of 1.0 Mbps traffic being buffered by the modem over that second (e.g., 100,000 bits). Those buffered 100,000 bits will take 0.1 seconds (i.e., 100 ms) to be transmitted, indicating a latency increase of 100 ms. Similarly, if the outgoing data rate in the network were to suddenly decrease from 1.0 Mbps to 0.9 Mbps for a second, this would also cause the latency to increase by 100 ms (assuming the incoming transmit bit rate is not adjusted).

As such, if the incoming transmit rate is not changed and there is a sudden increase in outbound latency, this indicates that there has been a sudden decrease in available network capacity and that the transmit rate needs to be decreased. Similarly, on the receiving side, if the incoming receive rate is not changed and there is a sudden increase in inbound latency, this indicates that there has been a sudden decrease in available network capacity and that the receive rate needs to be decreased.

Figure 16:
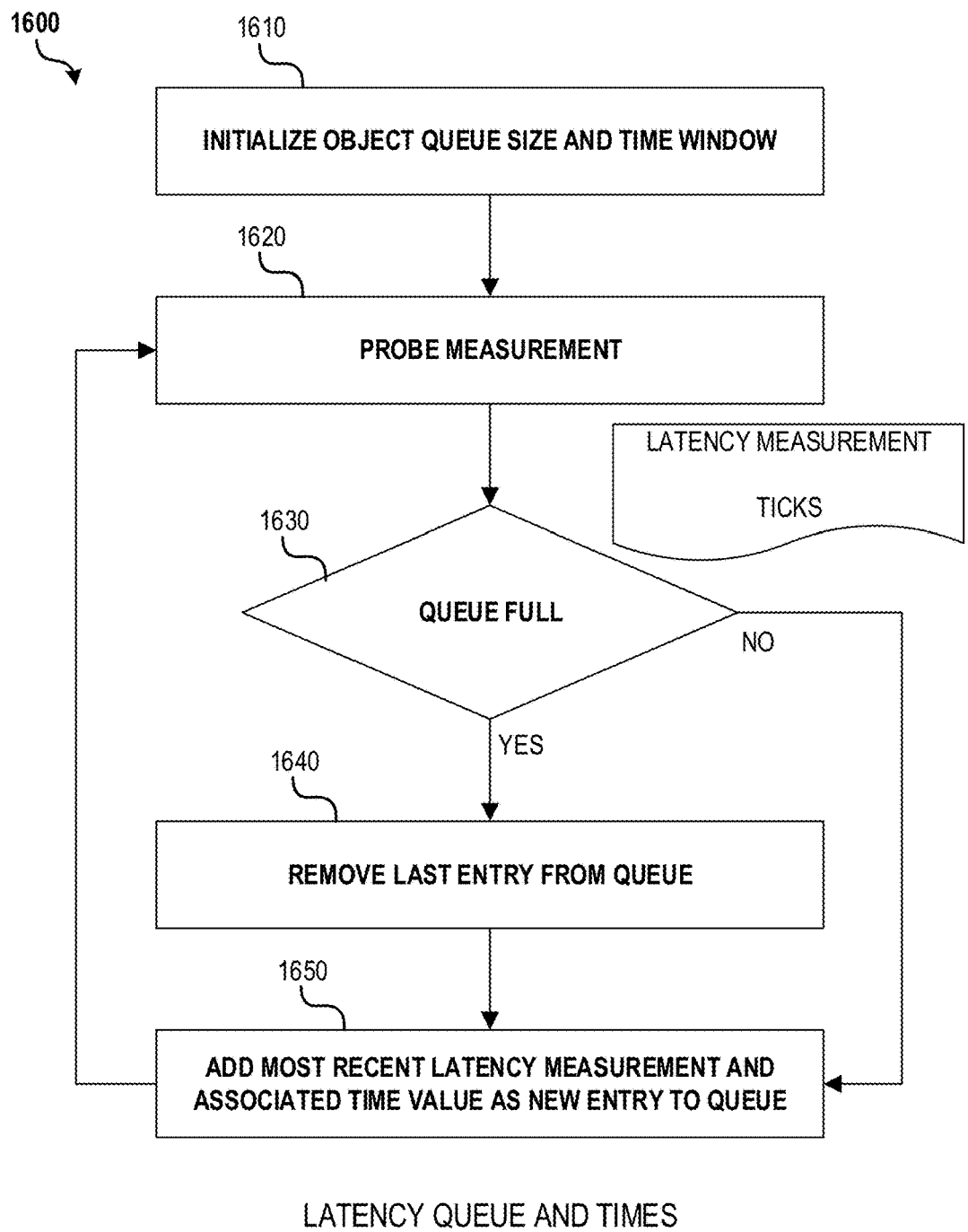
FIG. 16 illustrates an example method of creating and updating an object having a fixed length queue of size "n" that holds a most recent number of "n" latency values and their corresponding times of measurement, in accordance with example embodiments.
Figure 16:
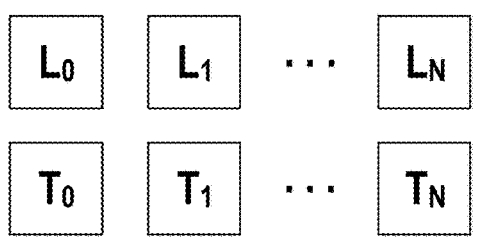

In various embodiments, a LIERD algorithm may be implemented using an object (e.g., a "TelqoLierd" object) having a fixed length queue of size "n" that holds a most recent number of "n" latency values (e.g., in ms) and their corresponding times of measurement (e.g., in system clock ticks). When it is time to adjust a target transmit or receive rate, only latency measurements that are within this queue may be considered. FIG. 16 illustrates an example method of 1600 of creating and updating such an object. It should be noted that method 1600 may be equally applied for creating an object for transmit rate reductions or an object for receive rate reductions.

At operation 1610, the object may be created and initialized by assigning it a queue size (e.g., passing a value of "n") and a configurable minimum value (e.g., "TelqoLierdMinDurMsThresh") and configurable maximum value (e.g., "TelqoLierdMaxDurMsThresh") of a time window that occurs prior to a target rate reduction. As further discussed below, the time window may be used to select the latency measurements for which an estimated overload percent is calculated during a LIERD operation. In implementations, the length of the time window and the queue size may be tuned by considering factors such as the value of the recency of the latency measurements (e.g., more recent measurements may be more representative of the current bandwidth status of network) and the value of the sample size of latency measurements (e.g., more measurements may improve the accuracy of the estimated overload percent).

At operation 1620, after a successful probe measurement, a measured latency (e.g., outbound or inbound) and its time of measurement (e.g., in system clock ticks) may be passed to the object for insertion. For example, an outbound or inbound TelqoRateChangeSm object may perform an insert operation into the queue of the TelqoLierd object, after every successful TELQO probe operation, by passing in a measured outbound latency value in ms and its time of measurement in ticks.

At decision 1630, it is determined if the queue is full (e.g., equal to "n"). If the queue is full, at operation 1640 the oldest entry in the queue (i.e., latency measurement and associated time) is removed. At operation 1650, the passed measured latency and associated time (e.g., tick value) is added as a new entry. In various embodiments, each entry of the queue may be a struct variable type holding a measured latency value and associated tick value. In other implementations, other variable types may be utilized. As illustrated, method 1600 may be iteratively repeated to update the queue as new probe measurements come in.

Figure 17:
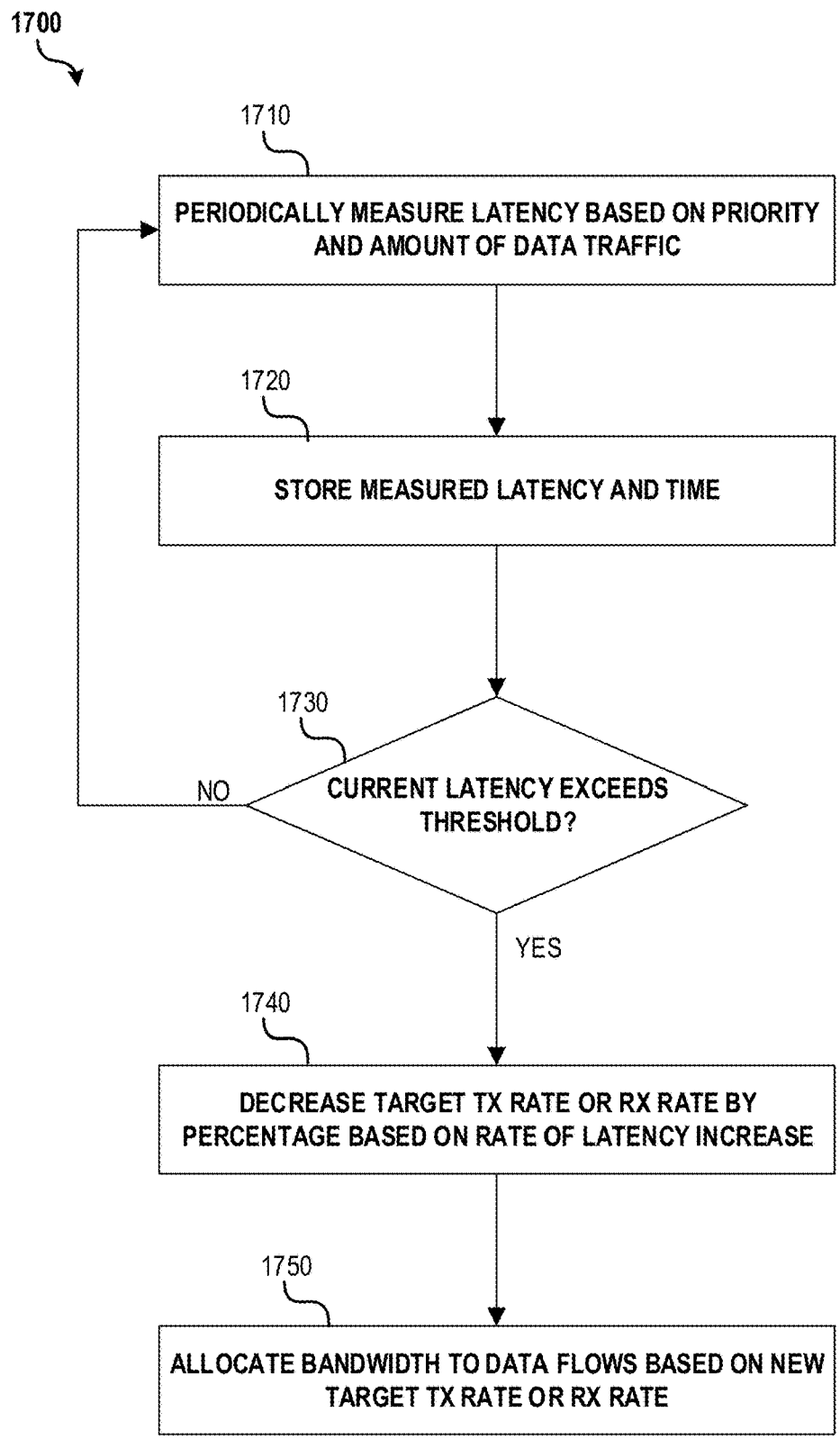
FIG. 17 is an operational flow diagram illustrating an example method that may implement a LIERD algorithm in accordance with example embodiments to adjust a target transmit or receive rate by a percentage based on measured rate of latency increase.

FIG. 17 is an operational flow diagram illustrating an example method 1700 that may implement a LIERD algorithm in accordance with example embodiments to adjust a target transmit or receive rate by a percentage based on measured rate of latency increase. At operation 1710, inbound and/or outbound latency measurements may be periodically made. Although for relatively short time intervals, the frequency of latency measurements may be constant, the frequency with which these periodic latency measurements are made may be adjusted over time as the type of traffic and amount of traffic flowing over the network changes.

By way of example, consider the measurement of outbound latencies on the transmit side. As discussed above, outbound latency may be measured as a byproduct of clock synchronization probe transactions. For example, assuming clock synchronization between a client and server, outbound latency of a packet may be measured based on a difference between the clock time of the client when the packet is transmitted by the client and the clock time of the server when the packet is received by the server. This timing information may be transmitted in a field of a packet transmitted as part of a probe request or probe reply as discussed above. With regard to the frequency of latency measurements, for example, a TelqoLatencyClient 1015 may increase the frequency of one-way latency measurements when either real-time data traffic (e.g., VOIP data) is flowing, or when the overall data traffic being offered for transmission flows fast enough to nearly saturate the target transmit rate. According to one embodiment, a TelqoTxBwAlloc 1023 may provide guidance to a TelqoLatencyClient regarding the required latency measurement frequency. For example, such guidance provided by the TelqoTxBwAlloc may reflect a plurality of different potential modes, each mode reflecting a different desired frequency of measurement depending on current traffic conditions. For example, an aggressive mode may trigger measurements at a relatively high frequency (e.g., on the order of once every 200 ms), which may be suitable when real-time traffic is flowing. A light mode may trigger latency measurements at a relatively low frequency (e.g., on the order of once a second), for example, when traffic is flowing but there is no real-time traffic and the offered load is nowhere near the throughput limit. An idle mode may be utilized in instances where no latency measurements are required beyond what is required for maintaining clock synchronization, for example, when there is little traffic.

At operation 1720, the latency measurements may be stored along with a time of when the latency measurement was made. For example, as discussed above with reference to method 1600, an object having a fixed length queue of size "n" that holds a most recent number of n latency values (e.g., in ms) and their corresponding times of measurement (e.g., in system clock ticks) may be used to store the most recent latency measurements. As further described below, the stored latency measurements and associated times may be implemented in a LIERD algorithm that decreases a target transmit or receive rate by a percentage based on the rate of latency increase.

At decision 1730, it is determined if a most recently measured latency exceeds a threshold. In addition to showing that the measured latency exceeds a certain delay in ms, the threshold may provide an indication that the latency is increasing at a particular rate. For example, the threshold may be based on a moving average (e.g., simple moving average, exponential moving average, etc.) of previous latency measurements plus a constant, configurable value above that moving average.

In particular implementations, an object (e.g., a "TelqoRateChangeSm" object), when determining whether a LIERD algorithm should be invoked for transmit rate or receive rate reduction, may check the difference between the current latency measurement and a current short EMA (exponential moving average) latency to determine how high the current latency is over the current short EMA latency. If the current latency is higher than the current short EMA latency by more than a predetermined amount (e.g., 80 ms), then it may be an indication that the latency has been increasing recently but it has not been long enough to push up the short EMA latency. In implementations, a short EMA latency may be calculated over a set of 3, 4, 5, or more latency measurements. In other implementations the most recently measured latency may be compared with a simple moving average (SMA) of latency measurements, and if the current latency is higher than SMA by a predetermined amount, then a LIERD algorithm may be invoked.

If the most recently measured latency exceeds the threshold, at operation 1740 a target transmit rate may be decreased by a percentage based on a rate of outbound latency increase and/or a target receive rate may be decreased by a percentage based on a rate of inbound latency increase. The determination of such a decrease may be implemented by way of a LIERD algorithm, example embodiments of which are further described below with reference to FIGS. 18-19.

At operation 1750, based on the reduced target transmit or receive rates, network bandwidth may be allocated to one or more traffic flows. For example, on the transmit side, bandwidth may be allocated among a plurality of traffic flows, based on QOS rules, such that the aggregate transmit rate is at the newly reduced target transmit rate.

Figure 18:
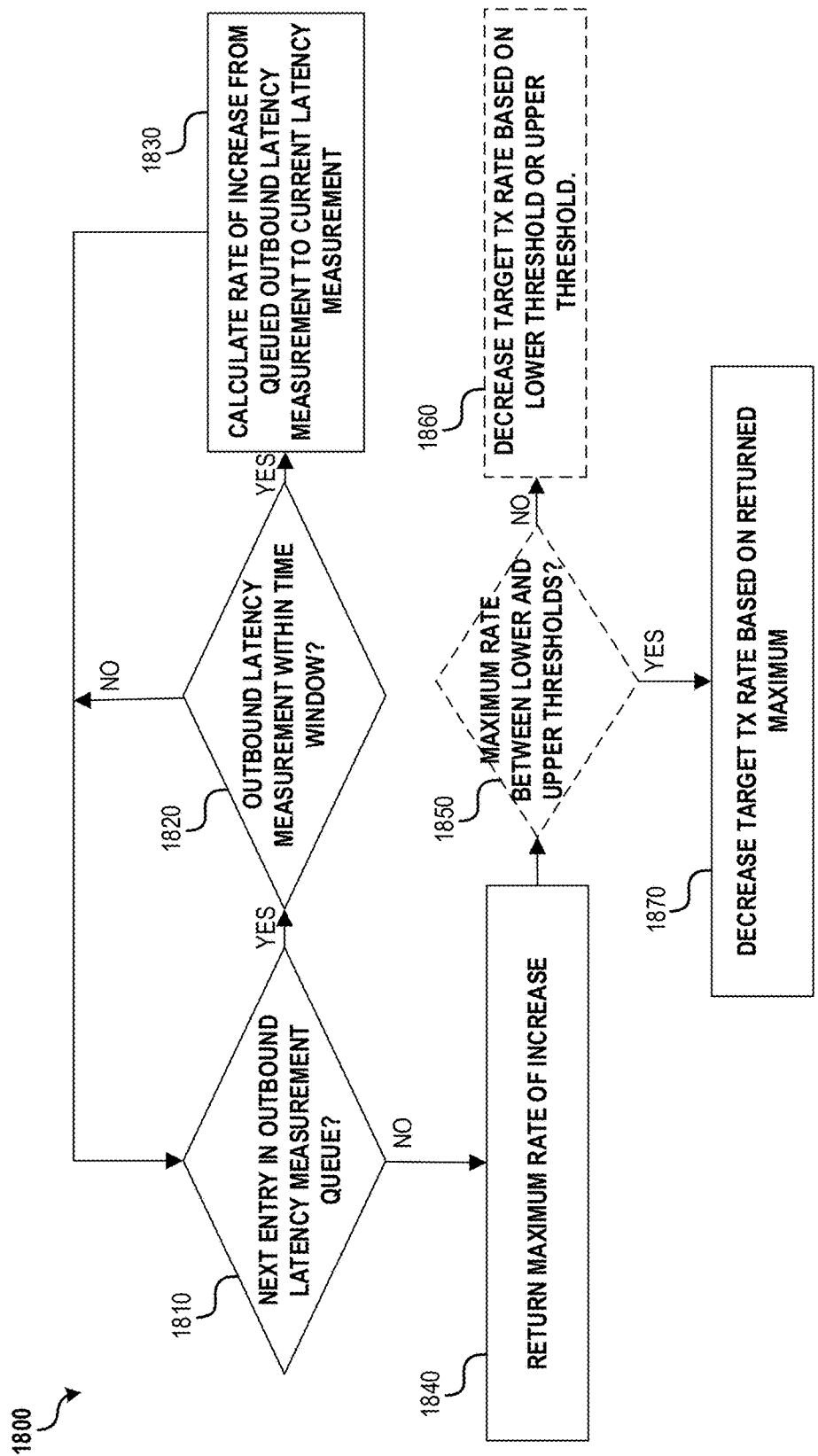
FIG. 18 is an operational flow diagram illustrating an example method of decreasing a target transmit rate based on a measured outbound latency increase in accordance with embodiments.

FIG. 18 is an operational flow diagram illustrating an example method 1800 of decreasing a target transmit rate based on a measured outbound latency increase in accordance with embodiments. For example method, 1800 may be implemented in response to detecting an outbound latency that exceeds a predetermined threshold that is indicative of an increasing latency rate (e.g., by performing operation 1730). As further described below, to determine a percentage for decreasing a target transmit rate, a highest "pile-up" rate or "estimated overload percentage" (i.e., rate of increase in latency over a given time interval) over a short time period may be determined prior to performing the transmit target rate reduction. In various implementations, method 1800 may be implemented by traversing a queue of most recent outbound latency measurements (e.g., a queue as described above with reference to method 1600). For example, the queue may traversed starting from the most recent latency measurement entry.

At decision 1810, it is determined if there is an entry in the outbound latency measurement queue. If there is, at decision 1820 it is determined if the outbound latency measurement of the queue entry occurred within a particular time window based on the time associated with the outbound latency measurement in the queue entry. By way of example, the outbound latency measurement of the queue entry may be determined to have occurred within the particular time window if it satisfies Equation (12):

$$(\text{curTicks}-\text{prevLatMeasureTicks})>\text{TelqoLierdMinDurMsThresh and }(\text{curTicks}-\text{prevLatMeasureTicks})<\text{TelqoLierdMaxDurMsThresh} \quad (12)$$

Where curTicks is the current time, prevLatMeasureTicks is the time associated with the queued outbound latency measurement, TelqoLierdMinDurMsThresh is a minimum threshold time (e.g., 500 ms), and TelqoLierdMaxDurMsThresh is a maximum threshold time (e.g., 10000 ms).

If the measurement falls within the time window, at operation 1830 the rate of increase of latency from the previous outbound latency measurement to the current outbound latency measurement (i.e., an estimated "overload percentage" or "pile-up rate") is calculated. In implementations, this estimated overload percentage may be represented as:

$$100*(L_0-L_N)/(T_0-T_N) \quad (13)$$

Where $L_0$ is the current probe latency measurement, $L_N$ is the previous probe latency measurement associated with the queued entry, $T_0$ is the time of the current probe latency measurement, and $T_N$ is the time of the previous probe latency measurement associated with the queued entry.

By way of example, consider the case where outbound latency measurements are made at a rate of 1/second with the most recent five measurements, from most recent to oldest, being: $L_1$—231 ms, $L_2$—218 ms, $L_3$—185 ms, $L_4$—70 ms, $L_5$—15 ms, with the associated times of measurements in ticks being: $T_1$—373227, $T_2$—372932, $T_3$—372518, $T_4$—371925, $T_5$—369414. In this example, if the current latency measurement is 260 ms ($L_0$) and the current time in ticks is 373553 ($T_0$), a sample calculation for the overload percentage using $L_4$ and $T_4$ yields: P=100* (260−70)/(373553−371925)=11.67%. This translates to 190 ms (i.e., 260−70) of increase in latency in the network over 1628 milliseconds (i.e, 373553−371925) for the current transmit rate and the now decreased network rate.

It should be noted that although in the examples described above, the rate of increase in latency was calculated as an estimated overload percentage, in other implementations, the calculated parameter may be left as a decimal factor (e.g., no multiplication by 100).

At operation 1840, the maximum rate of change (i.e., maximum estimated overload percentage) from operations 1810-1830 is returned. In some implementations, if no estimate can be produced (say, due to the past latency measurements not falling within the time window), a value may be returned that signals that no transmit rate adjustment is to be made at the current time or that causes the transmit rate to be reduced by a predetermined lower threshold or margin (e.g., 5% rate reduction).

At optional decision 1850, it may be determined if the returned maximum rate of changes lies between a lower threshold and upper threshold. For example, in some implementations, there may be a minimum margin or threshold specifying a minimum by which the transmit rate must be decreased if the LIERD algorithm is triggered. Additionally, in some implementations there may be an upper limit or threshold specifying a maximum by which the transmit rate may be decreased if the LIERD algorithm is triggered. The setting of this upper limit may be used to prevent an immediate, drastic reduction in the operating bit rate of the network. In one particular implementation, the lower and upper thresholds may respectively be 2% and 50%.

If the returned maximum falls below the minimum threshold or exceeds the upper threshold, then at optional operation 1860, the target transmit rate may be decreased by an amount depending on the lower threshold (if returned maximum falls below lower threshold) or upper threshold (if returned maximum is above upper threshold). Otherwise, at operation 1850, based on the returned maximum rate of change, the target transmit rate may be decreased by a corresponding percentage. For example, if the maximum rate of change is 10%, a transmit rate limiter of a router may limit the transmit rate by an additional 10%.

Accordingly, in this implementation, the maximum of all the estimated overload percentage values, considering all the latency measurements over the time window, gives the highest rate of increase in latency in the time period between the current time and the measurement period of the queue (e.g., 5 seconds in the example discussed above). This provides an estimate of the percentage of reduction in transmit rate (i.e., estimated overload percent) required to bring down the outbound latency and match the new network capacity.

Figure 19:
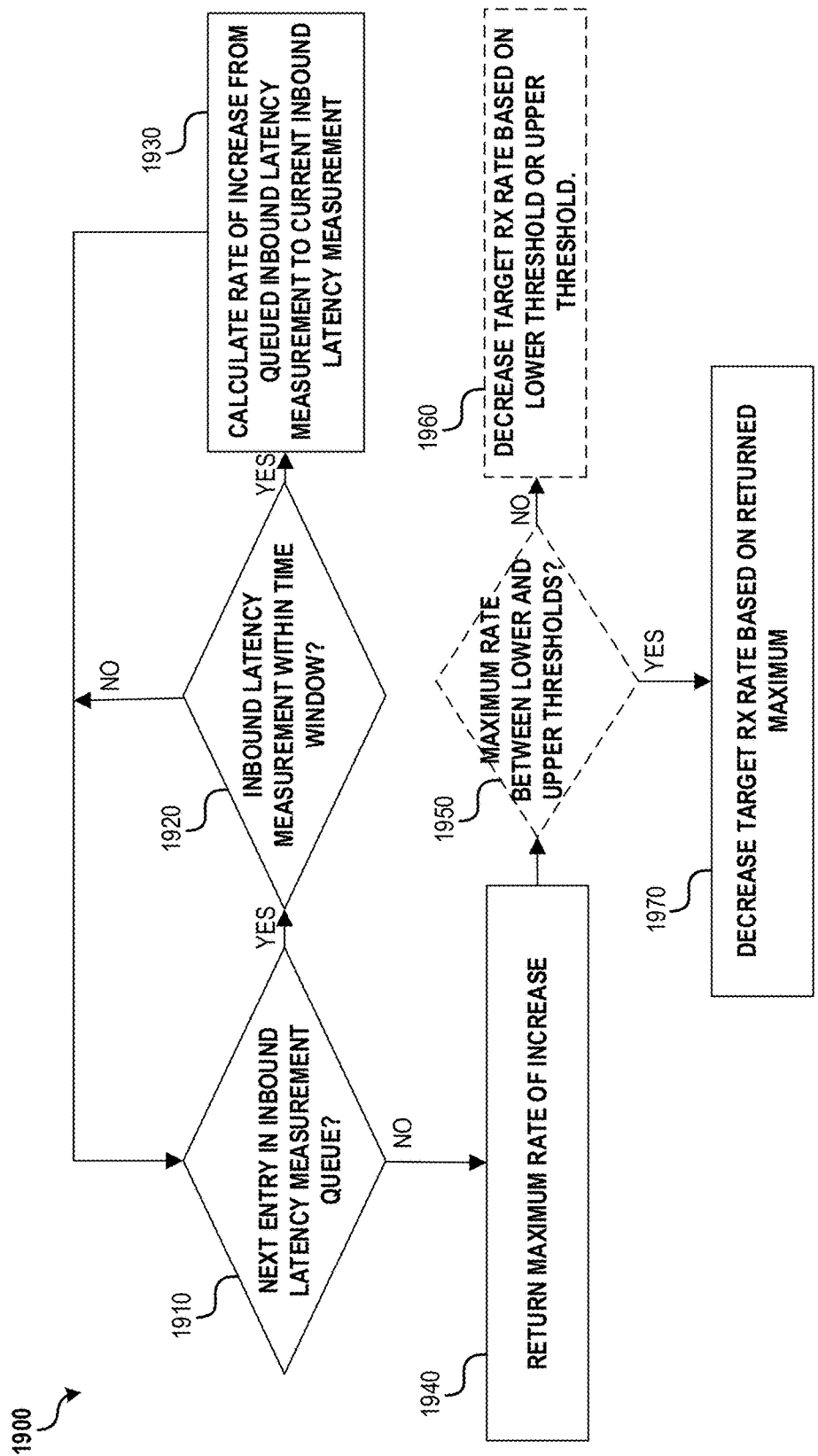
FIG. 19 is an operational flow diagram illustrating an example method of decreasing a target receive rate based on a measured inbound latency increase in accordance with embodiments.

FIG. 19 is an operational flow diagram illustrating an example method 1900 of decreasing a target receive rate based on a measured inbound latency increase in accordance with embodiments. For example, method 1900 may be implemented in response to detecting an inbound latency that exceeds a predetermined threshold that is indicative of an increasing latency rate (e.g., by performing operation 1730). For simplicity of discussion, it should be noted that each of the process operations of method 1900 may be implemented similarly to the process operations of method 1800, except using inbound latency measurements. For example, method 1900 may be implemented by traversing a queue of most recent inbound latency measurements (operations 1910-1930), returning a maximum estimated overload percentage based on the queue of most recent inbound latency measurements (operation 1940), and decreasing a target receive rate based on the determined maximum (operation 1970). Also, similar to example operations 1850-1860 of method 1900, a lower bound and upper bound may be placed on the decrease in the target receive rate (operations 1950-1960).

In one particular implementation, the following exemplary set of configuration parameters may be utilized in a LIERD algorithm:

TelqoLierdVariableTransportExtraBasisPoints: (e.g., default of 200)—When calculating the final basis points for transmit rate reduction (e.g., 200 basis points corresponding to a 2% transmit rate reduction), a transmit TelqoRateChangeSm object may use the maximum of (the maximum estimated overload percent in basis points+this parameter's value) and the non-LIERD basis points calculated based on default values for transmit rate reduction.

TelqoLierdVariableTransportMaxDecBasisPoints: (e.g. default of 5000)—The transmit TelqoRateChangeSm object may use the basis points for transmit rate reduction (e.g., 5000 basis points corresponding to a 50% transmit rate reduction) as calculated by the LIERD algorithm when it is less than this upper bound. If the basis points as calculated by the LIERD algorithm is over this upper bound, the upper bound may be used for target rate reduction.

TelqoLierdThreshMs (e.g., default of 80 ms)—A transmit TelqoRateChangeSm object, when determining whether the LIERD algorithm should be invoked for transmit rate reduction, may check the difference between the current outbound latency and the current short EMA (Exponential moving average) latency to see how high the current outbound latency is over the current short EMA latency. If the current outbound latency is at least higher than the current short EMA latency by this parameter's value, then it is an early indication that the outbound latency has been increasing recently but it has not been long enough to push up the short EMA latency (which may be calculated over a set of four latency measurements).

TelqoLierdIsEnabled (e.g., default of 1)—Setting this parameter to '1' enables the LIERD algorithm for the transmit TelqoRateChangeSm object and '0' disables it.

TelqoLierdIsRx (e.g., default of 0)—Setting this parameter to '1' enables the LIERD algorithm for the receive TelqoRateChangeSm object and '0' disables it.

TelqoLierdMinDurMsThresh (e.g., default of 500 ms)—The LIERD algorithm may calculate the estimated overload percent using only the latency measurements that fall within a time window prior to a target rate reduction. This parameter gives the lower limit of the time window.

TelqoLierdMaxDurMsThresh (e.g., default of 10,000 ms)—The LIERD algorithm may calculate the estimated overload percent using only the latency measurements that fall within a time window prior to a target rate reduction. This parameter gives the upper limit of the time window.

TELQORATECHANGESM_LIERD_DEFAULT_LAT_COUNT 10–(compile time constant used by the LIERD algorithm to set size "n" of queue).

Figure 20:
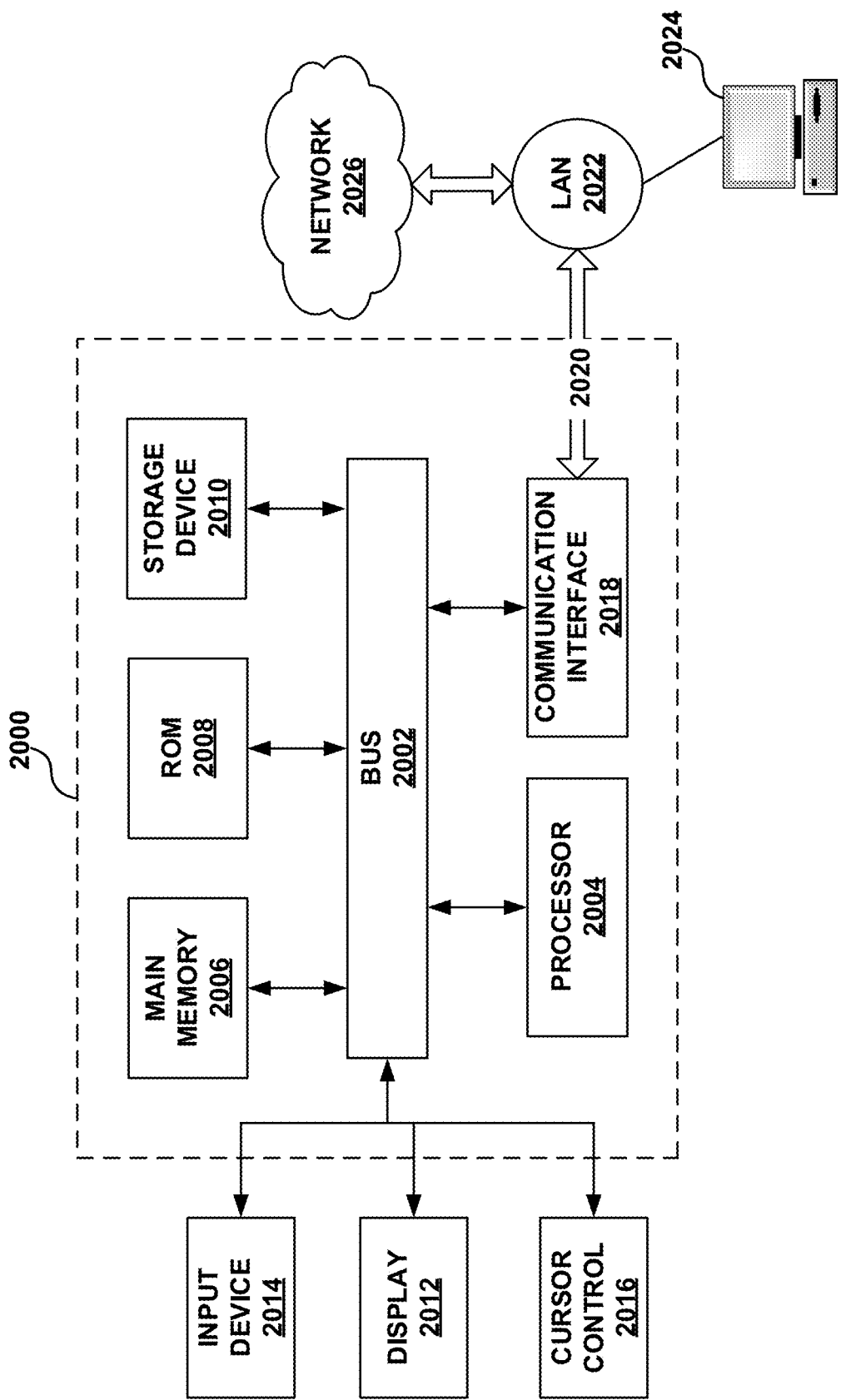
FIG. 20 illustrates a computer system upon which example embodiments according to the present disclosure can be implemented.

FIG. 20 illustrates a computer system 2000 upon which example embodiments according to the present disclosure can be implemented. Computer system 2000 can include a bus 2002 or other communication mechanism for communicating information, and a processor 2004 coupled to bus 2002 for processing information. Computer system 2000 may also include main memory 2006, such as a random access memory (RAM) or other dynamic storage device, coupled to bus 2002 for storing information and instructions to be executed by processor 2004. Main memory 2006 can also be used for storing temporary variables or other intermediate information during execution of instructions to be executed by processor 2004. Computer system 2000 may further include a read only memory (ROM) 2008 or other static storage device coupled to bus 2002 for storing static information and instructions for processor 2004. A storage device 2010, such as a magnetic disk or optical disk, may additionally be coupled to bus 2002 for storing information and instructions.

Computer system 2000 can be coupled via bus 2002 to a display 2012, such as a cathode ray tube (CRT), liquid crystal display (LCD), active matrix display, light emitting diode (LED)/organic LED (OLED) display, digital light processing (DLP) display, or plasma display, for displaying information to a computer user. An input device 2014, such as a keyboard including alphanumeric and other keys, may be coupled to bus 2002 for communicating information and command selections to processor 2004. Another type of user input device is cursor control 2016, such as a mouse, a trackball, or cursor direction keys for communicating direction information and command selections to processor 2004 and for controlling cursor movement on display 2012.

According to some embodiments of the disclosure, applying a LIERD algorithm, whereby a percentage rate reduction of a rate limiter is based on the rate of increase in inbound latency or outbound latency measured over a predetermined period of time, may be provided by computer system 2000 in response to processor 2004 executing an arrangement of instructions contained in main memory 2006. Such instructions can be read into main memory 2006 from another computer-readable medium, such as storage device 2010. Execution of the arrangement of instructions contained in main memory 2006 causes processor 2004 to perform one or more processes described herein. One or more processors in a multi-processing arrangement may also be employed to execute the instructions contained in main memory 2006. In alternative embodiments, hard-wired circuitry is used in place of or in combination with software instructions to implement various embodiments. Thus, embodiments described in the present disclosure are not limited to any specific combination of hardware circuitry and software.

Computer system 2000 may also include a communication interface 2018 coupled to bus 2002. Communication interface 2018 can provide a two-way data communication coupling to a network link 2020 connected to a local network 2022. By way of example, communication interface 2018 may be a digital subscriber line (DSL) card or modem, an integrated services digital network (ISDN) card, a cable modem, or a telephone modem to provide a data communication connection to a corresponding type of telephone line. As another example, communication interface 2018 may be a local area network (LAN) card (e.g. for Ethernet™ or an Asynchronous Transfer Model (ATM) network) to provide a data communication connection to a compatible LAN. Wireless links can also be implemented. In any such implementation, communication interface 2018 sends and receives electrical, electromagnetic, or optical signals that carry digital data streams representing various types of information. Further, communication interface 2018 may include peripheral interface devices, such as a Universal Serial Bus (USB) interface, a PCMCIA (Personal Computer Memory Card International Association) interface, etc.

Network link 2020 typically provides data communication through one or more networks to other data devices. By way of example, network link 2020 can provide a connection through local network 2022 to a host computer 2024, which has connectivity to a network 2026 (e.g. a wide area network (WAN) or the global packet data communication network now commonly referred to as the "Internet") or to data equipment operated by service provider. Local network 2022 and network 2026 may both use electrical, electromagnetic, or optical signals to convey information and instructions. The signals through the various networks and the signals on network link 2020 and through communication interface 2018, which communicate digital data with computer system 2000, are example forms of carrier waves bearing the information and instructions.

Computer system 2000 may send messages and receive data, including program code, through the network(s), network link 2020, and communication interface 2018. In the Internet example, a server (not shown) might transmit requested code belonging to an application program for implementing an embodiment of the present disclosure through network 2026, local network 2022 and communication interface 2018. Processor 2004 executes the transmitted code while being received and/or store the code in storage device 2010, or other non-volatile storage for later execution. In this manner, computer system 2000 obtains application code in the form of a carrier wave.

The term "computer-readable medium" as used herein refers to any medium that participates in providing instructions to processor 2004 for execution. Such a medium may take many forms, including but not limited to non-volatile media, volatile media, and transmission media. Non-volatile media include, for example, optical or magnetic disks, such as storage device 2010. Volatile media may include dynamic memory, such as main memory 2006. Transmission media may include coaxial cables, copper wire and fiber optics, including the wires that comprise bus 2002. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 21:
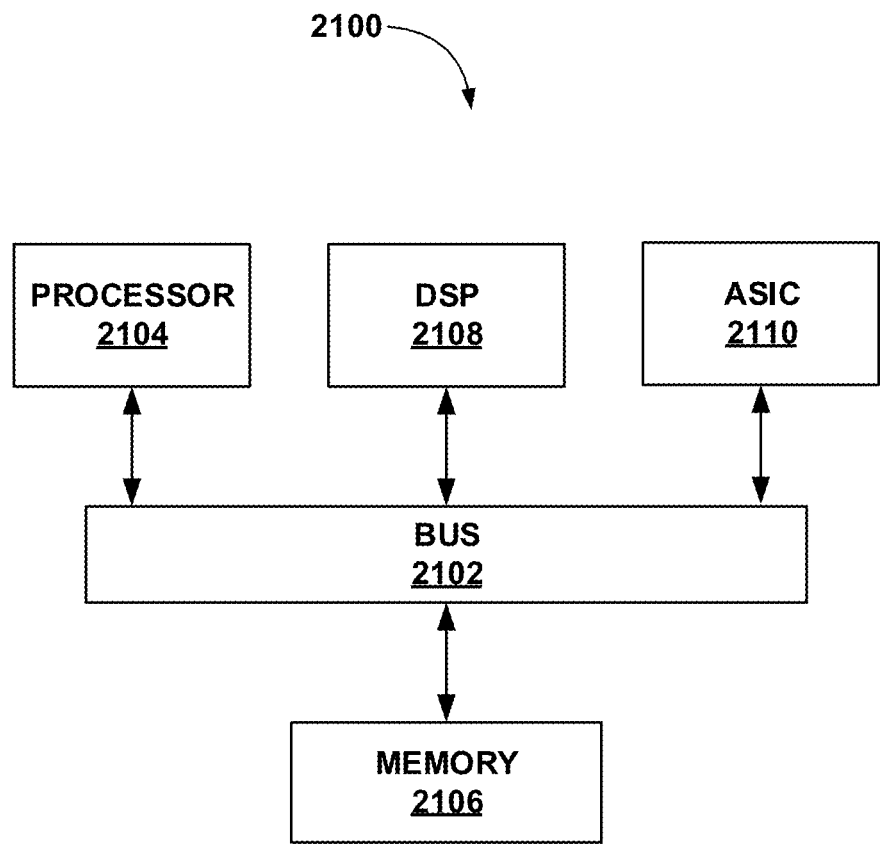
FIG. 21 illustrates a chip set in which embodiments of the disclosure may be implemented.

FIG. 21 illustrates a chip set 2100 in which embodiments of the disclosure may be implemented. Chip set 2100 can include, for instance, processor and memory components described with respect to FIG. 21 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 2100 includes a communication mechanism such as a bus 2102 for passing information among the components of the chip set 2100. A processor 2104 has connectivity to bus 2102 to execute instructions and process information stored in a memory 2106. Processor 2104 includes one or more processing cores with each core configured to perform independently. A multi-core processor enables multiprocessing within a single physical package. Examples of a multi-core processor include two, four, eight, or greater numbers of processing cores. Alternatively or in addition, processor 2104 includes one or more microprocessors configured in tandem via bus 2102 to enable independent execution of instructions, pipelining, and multithreading. Processor 2104 may also be accompanied with one or more specialized components to perform certain processing functions and tasks such as one or more digital signal processors (DSP) 2108, and/or one or more application-specific integrated circuits (ASIC) 2110. DSP 2108 can typically be configured to process real-world signals (e.g., sound) in real time independently of processor 2104. Similarly, ASIC 2110 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 2104 and accompanying components have connectivity to the memory 2106 via bus 2102. Memory 2106 includes both dynamic memory (e.g., RAM) and static memory (e.g., ROM) for storing executable instructions that, when executed by processor 2104, DSP 2108, and/or ASIC 2110, perform the process of example embodiments as described herein. Memory 2106 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method, comprising:
    periodically measuring outbound latency of communications over a network from a first networked device to a second networked device, wherein one or more outbound latency measurements are made;
    storing the one or more outbound latency measurements and a time corresponding to each of the one or more outbound latency measurements;
    determining a rate of outbound latency increase based on a most recent outbound latency measurement and the stored one or more outbound latency measurements and the corresponding times, wherein determining the rate of outbound latency increase comprises calculating an increase in outbound latency over time from one of the stored one or more outbound latency measurements to the most recent outbound latency measurement;
    determining a proportion by which to decrease a target transmission rate of the first networked device based on at least the determined rate of outbound latency increase; and
    decreasing the target transmission rate of the first networked device by the determined proportion.

2. The method of claim 1, further comprising: adjusting, based on the decreased target transmission rate, bandwidth allocation at the first networked device to a plurality of traffic streams having different priorities of service.

3. The method of claim 1, further comprising: determining that the most recent outbound latency measurement exceeds a threshold; and in response to determining that the most recent outbound latency measurement exceeds the threshold, performing the operation of determining the proportion by which to decrease the target transmission rate of the first networked device.

4. The method of claim 3, wherein the threshold is based on a moving average of a plurality of outbound latency measurements made before the most recent outbound latency measurement.

5. The method of claim 1, further comprising: creating an object having a queue of predetermined size for storing a plurality of most recent outbound latency measurements and a time corresponding to each of the plurality of most recent outbound latency measurements, wherein the one or more outbound latency measurements are stored in the queue.

6. The method of claim 5, further comprising: updating the object based on a new outbound latency measurement, wherein updating the object comprises:
   determining if the object's queue is full;
   if the object's queue is full, removing an entry from the queue corresponding to an oldest outbound latency measurement stored in the queue; and
   adding the new outbound latency measurement and its associated time as a new entry into the queue.

7. The method of claim 5, wherein determining the proportion by which to decrease the target transmission rate of the first networked device based on at least the determined rate of outbound latency increase, comprises:
   for each of a plurality of entries of the object's queue, calculating a rate of outbound latency increase from the outbound latency measurement of the entry to the most recent outbound latency measurement; and
   returning a maximum of the calculated rates of outbound latency increase.

8. The method of claim 7, wherein the rate of outbound latency increase is calculated for each of the plurality of entries using: $(L_0-L_N)/(T_0-T_N)$, where $L_0$ is the most recent outbound latency measurement, $L_N$ is the outbound latency measurement associated with the queued entry, $T_0$ is the time of the most recent outbound latency measurement, and $T_N$ is the time of the outbound latency measurement associated with the queued entry.

9. The method of claim 1, wherein periodically measuring outbound latency of communications over a network from the first networked device to the second networked device, comprises:
   synchronizing a system clock of the first networked device with a system clock of the second networked device;
   determining, using the system clock of the first networked device, when a data packet was transmitted by the first networked device to the second networked device; and
   determining, using the system clock of the second networked device, when the data packet was received by the second networked device.

10. The method of claim 2, wherein the first networked device is a router communicatively coupled to a broadband modem, the router configured to forward packets to the modem for transmission over the network.

11. The method of claim 10, wherein the router is communicatively coupled to the second networked device over a tunnel.

12. A system, comprising:
   a first networked device;
   a processor; and
   a non-transitory computer-readable operatively coupled to the processor, and having instructions stored therein that when executed by the processor causes the system to:
      periodically measure outbound latency of communications over a network from the first networked device to a second networked device, wherein one or more outbound latency measurements are made;
      store the one or more outbound latency measurements and a time corresponding to each of the one or more outbound latency measurements;
      determine a rate of outbound latency increase based on a most recent outbound latency measurement and the stored one or more outbound latency measurements and the corresponding times, wherein determining the rate of outbound latency increase comprises calculating an increase in outbound latency over time from one of the stored one or more outbound latency measurements to the most recent outbound latency measurement;
      determine a proportion by which to decrease a target transmission rate of the first networked device based on at least the determined rate of outbound latency increase; and
      decrease the target transmission rate of the first networked device by the determined proportion.

13. The system of claim 12, wherein the instructions, when executed by the processor, further cause the system to: adjust, based on the decreased target transmission rate, bandwidth allocation at the first networked device to a plurality of traffic streams having different priorities of service.

14. The system of claim 12, wherein the instructions, when executed by the processor, further cause the system to: determine that the most recent outbound latency measurement exceeds a threshold; and in response to determining that the most recent outbound latency measurement exceeds the threshold, performing the operation of determining the proportion by which to decrease the target transmission rate of the first networked device, wherein the threshold is based on a moving average of a plurality of outbound latency measurements made before the most recent outbound latency measurement.

15. The system of claim 12, wherein the instructions, when executed by the processor, further cause the system to: create an object having a queue of predetermined size for storing a plurality of most recent outbound latency measurements and a time corresponding to each of the plurality of most recent outbound latency measurements, wherein the one or more outbound latency measurements are stored in the queue.

16. The system of claim 15, wherein the instructions, when executed by the processor, further cause the system to: update the object based on a new outbound latency measurement, wherein updating the object comprises:
   determining if the object's queue is full;
   if the object's queue is full, removing an entry from the queue corresponding to an oldest outbound latency measurement stored in the queue; and
   adding the new outbound latency measurement and its associated time as a new entry into the queue.

17. The system of claim 15, wherein determining the proportion by which to decrease the target transmission rate of the first networked device based on at least the determined rate of outbound latency increase, comprises:
   for each of a plurality of entries of the object's queue, calculating a rate of outbound latency increase from the outbound latency measurement of the entry to the most recent outbound latency measurement; and
   returning a maximum of the calculated rates of outbound latency increase.

18. The system of claim 17, wherein rate of outbound latency increase is calculated for each of the plurality of entries using: $(L_0-L_N)/(T_0-T_N)$, where $L_0$ is the most recent outbound latency measurement, $L_N$ is the outbound latency measurement associated with the queued entry, $T_0$ is the time of the most recent outbound latency measurement, and $T_N$ is the time of the outbound latency measurement associated with the queued entry.

19. A method, comprising:
   periodically measuring inbound latency of communications over a network to a first networked device from a second networked device, wherein one or more inbound latency measurements are made;

storing the one or more inbound latency measurements and a time corresponding to each of the one or more inbound latency measurements;

determining a rate of inbound latency increase based on a most recent inbound latency measurement and the stored one or more inbound latency measurements and the corresponding times, wherein determining the rate of inbound latency increase comprises calculating an increase in inbound latency over time from one of the stored one or more inbound latency measurements to the most recent inbound latency measurement;

determining a proportion by which to decrease a target receive rate of the first networked device based on at least the determined rate of inbound latency increase; and decreasing the target receive rate of the first networked device by the determined proportion.

* * * * *